MULTICHANNEL COMMUNICATION SYSTEM

Filed Jan. 14, 1949 14 Sheets-Sheet 1

INVENTOR
WILSON P. BOOTHROYD
BY
Brown, Denk & Synnestvedt
AGENTS

INVENTOR
WILSON P. BOOTHROYD
BY
Brown, Denk & Synnestvedt
AGENTS

INVENTOR
WILSON P. BOOTHROYD
BY
Brown, Denk & Synnestvedt
AGENTS

INVENTOR
WILSON P. BOOTHROYD
BY
Brown, Denk & Synnestvedt
AGENTS

INVENTOR
WILSON P. BOOTHROYD
BY
Brown, Denk & Synnestvedt
AGENTS

June 1, 1954 W. P. BOOTHROYD 2,680,151

MULTICHANNEL COMMUNICATION SYSTEM

Filed Jan. 14, 1949 14 Sheets-Sheet 6

INVENTOR
WILSON P. BOOTHROYD
BY
Brown, Denk & Synnestvedt
AGENTS

INVENTOR
WILSON P. BOOTHROYD
BY
Brown, Jenk & Synnestvedt
AGENTS

MULTICHANNEL COMMUNICATION SYSTEM

Filed Jan. 14, 1949 14 Sheets-Sheet 8

INVENTOR
WILSON P. BOOTHROYD
BY
Brown, Denk & Synnestvedt
AGENTS

June 1, 1954 W. P. BOOTHROYD 2,680,151

MULTICHANNEL COMMUNICATION SYSTEM

Filed Jan. 14, 1949 14 Sheets-Sheet 9

INVENTOR
WILSON P. BOOTHROYD
BY
Brown, Denk & Synnestvedt
AGENTS

June 1, 1954 W. P. BOOTHROYD 2,680,151

MULTICHANNEL COMMUNICATION SYSTEM

Filed Jan. 14, 1949 14 Sheets-Sheet 10

INVENTOR
WILSON P. BOOTHROYD
BY
Brown, Denk & Synnestvedt
AGENTS

June 1, 1954 W. P. BOOTHROYD 2,680,151

MULTICHANNEL COMMUNICATION SYSTEM

Filed Jan. 14, 1949 14 Sheets-Sheet 11

INVENTOR
WILSON P. BOOTHROYD
BY
Brown, Denk & Synnestvedt
AGENTS

June 1, 1954 W. P. BOOTHROYD 2,680,151

MULTICHANNEL COMMUNICATION SYSTEM

Filed Jan. 14, 1949 14 Sheets-Sheet 12

INVENTOR
WILSON P. BOOTHROYD
BY
Brown, Denk & Synnestvedt
AGENTS

June 1, 1954 W. P. BOOTHROYD 2,680,151

MULTICHANNEL COMMUNICATION SYSTEM

Filed Jan. 14, 1949 14 Sheets-Sheet 13

INVENTOR
WILSON P. BOOTHROYD
BY
Brown, Denk & Synnestvedt
AGENTS

FIG. 14a
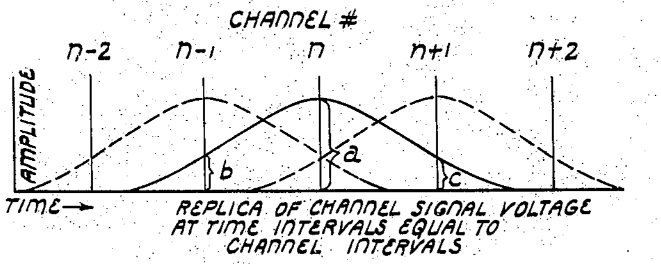
FIG. 14b
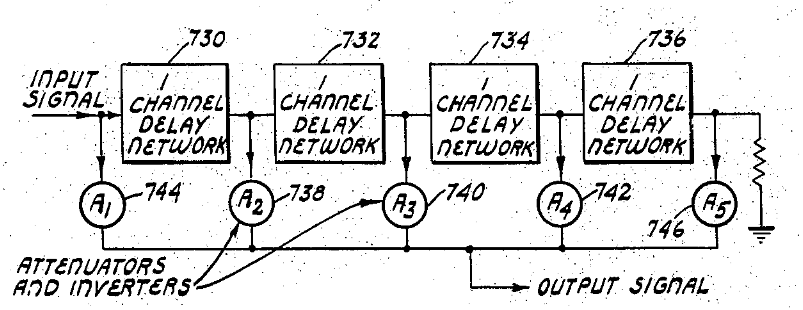
FIG. 14c
TABLE OF OUTPUT VOLTAGES
| TIME | OUTPUT |
|---|---|
| $n$ | $bA_2 + aA_3 + cA_4 =$ DESIRED SIGNAL |
| $n-1$ | $bA_1 + aA_2 + cA_3 = 0$ |
| $n+1$ | $bA_3 + aA_4 + cA_5 = 0$ |
| $n-2$ | $aA_1 + cA_2 = 0$ |
| $n+2$ | $aA_4 + cA_5 = 0$ |
| $n-3$ | $cA_1 =$ RESIDUAL INTERFERENCE |
| $n+3$ | $bA_5 =$ RESIDUAL INTERFERENCE |
| $n-4$ | 0 |
| $n+4$ | 0 |
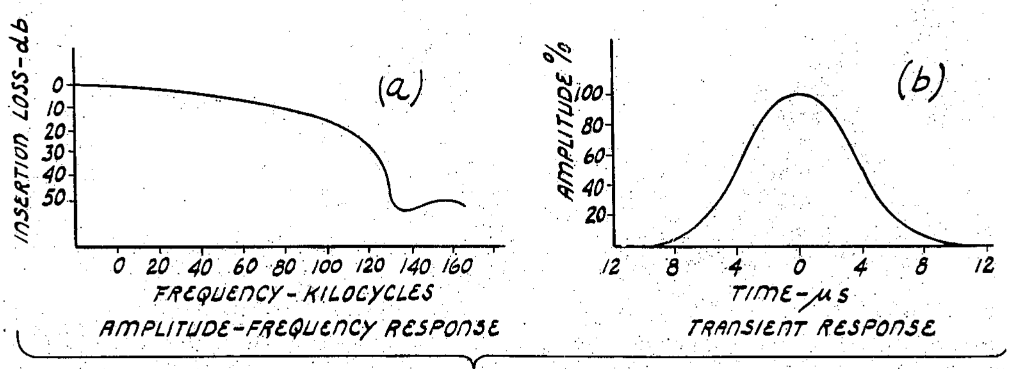
FIG. 15.
INVENTOR
WILSON P. BOOTHROYD
BY
Brown, Denk & Synnestvedt
AGENTS Patented June 1, 1954 2,680,151

UNITED STATES PATENT OFFICE 2,680,151

MULTICHANNEL COMMUNICATION SYSTEM

Wilson P. Boothroyd, Huntingdon Valley, Pa., assignor to Philco Corporation, Philadelphia, Pa., a corporation of Pennsylvania Application January 14, 1949, Serial No. 70,951

25 Claims. (Cl. 179—15)

The present invention relates to multi-channel communication systems of the pulse-amplitude-modulation type.

The present application discloses subject matter which is described and claimed in a copending United States patent application of E. M. Creamer, Jr., Serial No. 70,952, filed January 14, 1949, as well as in a further copending United States patent application of W. P. Boothroyd and E. M. Creamer, Jr., Serial No. 70,953, filed January 14, 1949.

The two broad classes of multi-channel communication systems now in general use are (1) those in which the frequency bands representing the individual signal channels may occupy adjacent portions of a substantially continuous spectrum, and (2) those in which the entire frequency spectrum utilized is cyclically made available to each of the signal channels for a small time interval. The first of the above classes is commonly known as "frequency-division multiplex," while the latter is similarly referred to as "time-division multiplex."

The so-called frequency-division multiplex system of communication is widely employed, for example, where a number of telephone conversations or telegraph messages are to be carried over a single cable. It is also suitable for use where such signals are to be transmitted by certain types of radio relay networks. In this latter application, it has the advantage of operating with a desirably low bandwidth. At the same time, it possesses the disadvantage in its present form of being unable to load many other types of relay equipments to their maximum capacity. This is especially true where these relays are designed primarily for the transmission of television or other wide-band signals.

The time-division multiplex system of communication is actually a method of pulse transmission and may be subclassified in accordance with the manner in which the pulses are modulated. These sub-classes generally include (*a*) varying the pulse amplitude, and (*b*) varying the pulse position, that is, changing the time of occurrence of either the leading or trailing edge of the pulse, or both.

The pulse-amplitude-modulation method, in which the various intelligence signal channels differ from one another in amplitude, has been frequently employed and possesses the advantage of operating with adequate linearity. Heretofore, however, the excessively high bandwidth required was a factor in limiting the extent of its use. The pulse-position-modulation method, on the other hand, has the advantage of being relatively unaffected by attenuation in the transmission path, but requires a wider frequency band for successful operation.

It is desirable in certain types of multi-channel communication systems, especially those making use of cables or relatively small radio relay stations, to have available, for low-frequency applications alone, a relatively inexpensive multiplexing system in which a minimum bandwidth is required. However, this same relay apparatus should at the same time be usable with other modulators which are primarily designed for television, FM programs, and other high-frequency applications. In other words, the terminal equipment should be capable of use without major alterations in conjunction with either type of modulating apparatus.

Although one of the principal features of the frequency-division-multiplexing method is its relatively narrow bandwidth, nevertheless it has been found that an amplitude-modulated-multiplexing system can be devised which not only equals the frequency-division method with respect to bandwidth economy, but which in addition possesses adequate linearity response. This system, to be later described, operates over a portion of the spectrum which is a practical equivalent of that required by a single-sideband frequency-division-multiplexing system, and at the same time presents no linearity problems when the amplitude-modulated multiplexed signal is employed to frequency-modulate a carrier wave for transmission. It has also been found that such an amplitude-modulated system provides an adequate signal-to-noise ratio, and substantially minimizes crosstalk between channels in comparison with other time-division-multiplex systems employing pulse modulation.

One of the operating principles of pulse communication systems is that if an intelligence signal be sampled at regular intervals, the resulting signal will still retain substantially all of the useful information present in the original signal, provided that the sampling frequency is at a rate equal to at least twice the highest useful frequency in the original signal. In other words, the intelligence may be reproduced substantially in its original form if the sampling period is equal to approximately one-half the period of the highest frequency-component of the original wave. For example, in the case of an audio wave which has been passed through a filter having a cut-off frequency of approximately 3,500 cycles, then substantially all of the audio information in the wave is present in a series of samples of the wave taken at an 8 kilocycle rate.

This sampling principle has been utilized in designing the pulse-amplitude-modulated time-sharing-multiplex system described in the present application. In one embodiment of the invention, samples from a plurality of audio-frequency channels are combined into an asymmetrical composite signal comprising a train of amplitude-modulated pulses. This system is arranged not only to give adequate linearity, but in addition to be readily adaptable for use either in connection with high-frequency relaying apparatus or with relay networks employing pulse transmission only. Furthermore, the multiplexed signal may frequency-modulate a carrier wave directly, or may modulate a sub-carrier wave.

In a physical embodiment of the system to be described, thirty separate and independent audio frequency channels are time-multiplexed into a 150 kilocycle frequency band. One of these channels transmits an indexing tone for synchronizing purposes, and is also used as an order line. The remaining twenty-nine channels are available for any desired form of audible communication, such as ordinary telephone conversation, or for telegraphy.

Each audio channel is designed with a frequency passband of between 300 and 3,300 cycles per second, and thus has an audio fidelity corresponding to that of a typical telephone system. The passband of the order line is from 300 to 2,500 cycles per second, with the indexing (or synchronizing) signal occupying a portion of the remaining space in this channel. The thirty audio signals respectively occupying the thirty audio frequency channels are combined into a pulse - amplitude - modulated time - multiplexed composite signal, which may then be applied either to modulate the carrier wave of a transmitter, or else sent out directly over a single cable. At the receiver, the composite multiplexed signal is resolved into its audio-frequency components. Inasmuch as the thirty channel system requires a bandwidth of only approximately 150 kilocycles, or less, it compares favorably in this respect with any other known system of multi-channel communication of either the frequency-division or the time-division species.

One object of the present invention, therefore, is to provide an improved intelligence-communication system of the pulse-amplitude-modulation type.

Another object of the invention is to provide a communication system of the pulse-amplitude-modulation type in which the frequency band required for transmission is approximately equal to the normal spectrum of the intelligence signal.

A further object of the invention is to provide a multiplex signaling system which is suitable for use in conjunction with various types of radio relay networks, such as those designed for pulse transmission alone or those designed principally for the relaying of television and other wide-band signals.

A still further object of the invention is to provide an improved form of multi-channel communication system in which an adequate signal-to-noise ratio is maintained, and in which crosstalk between channels is reduced to a minimum.

Other objects and features of the invention will be apparent from the following description of a preferred embodiment and from the drawings, in which.

Figure 1:
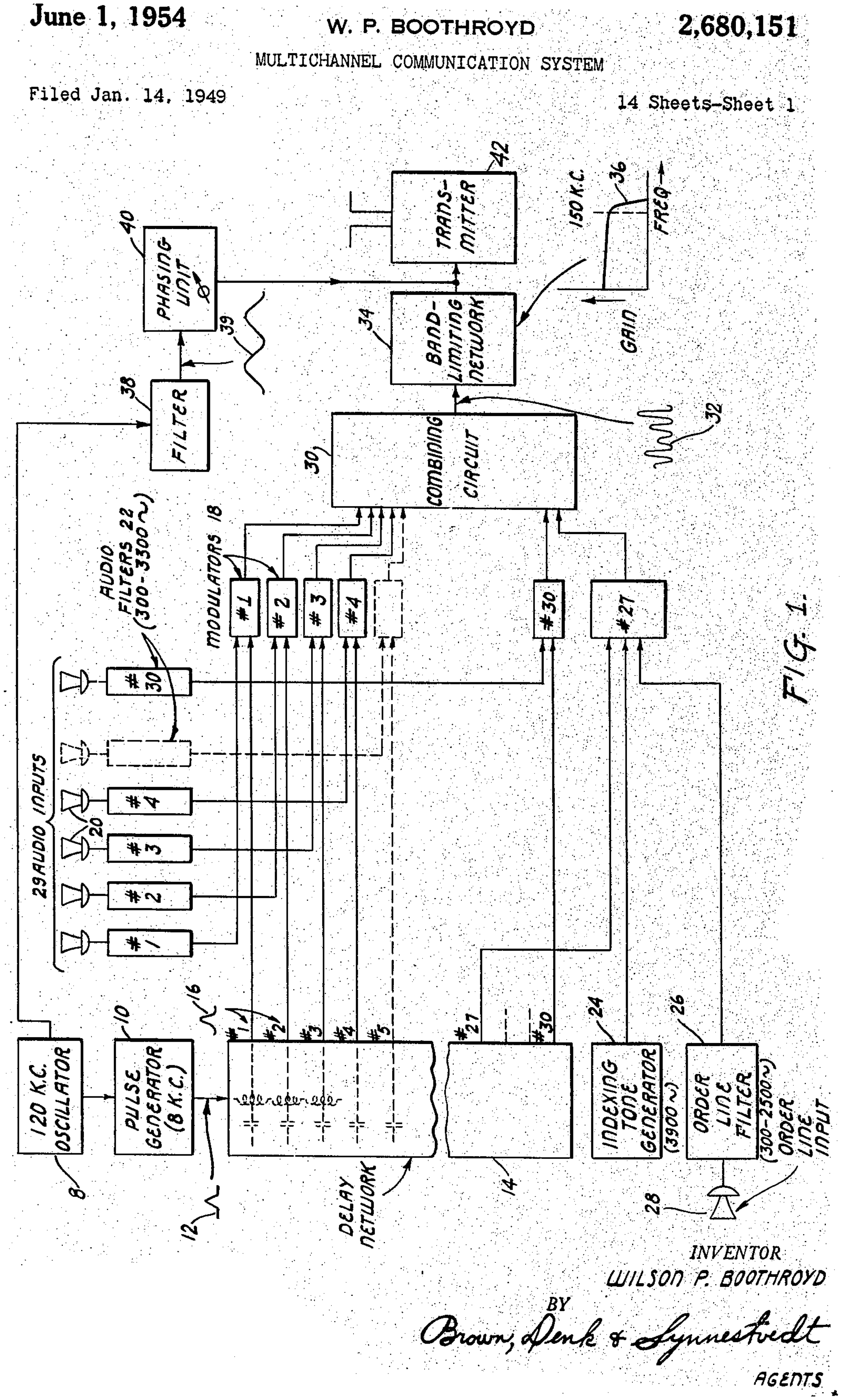
Fig. 1 is a block diagram of a preferred form of multiplex communication transmitter system in accordance with the present invention.
Figures 2, 6:
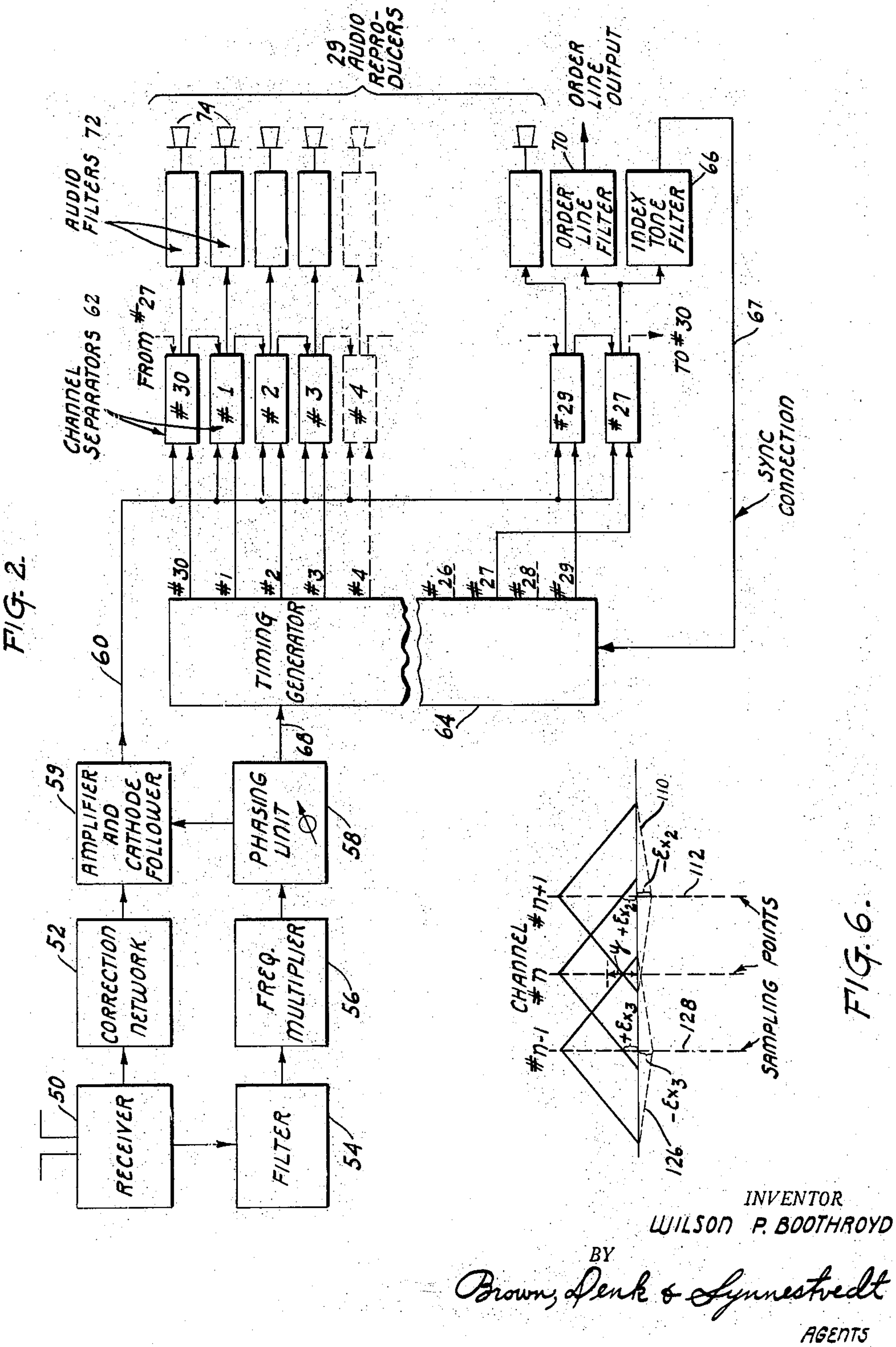
Fig. 2 is a block diagram of a preferred form of multiplex receiving system in accordance with the present invention.
Figure 3A:
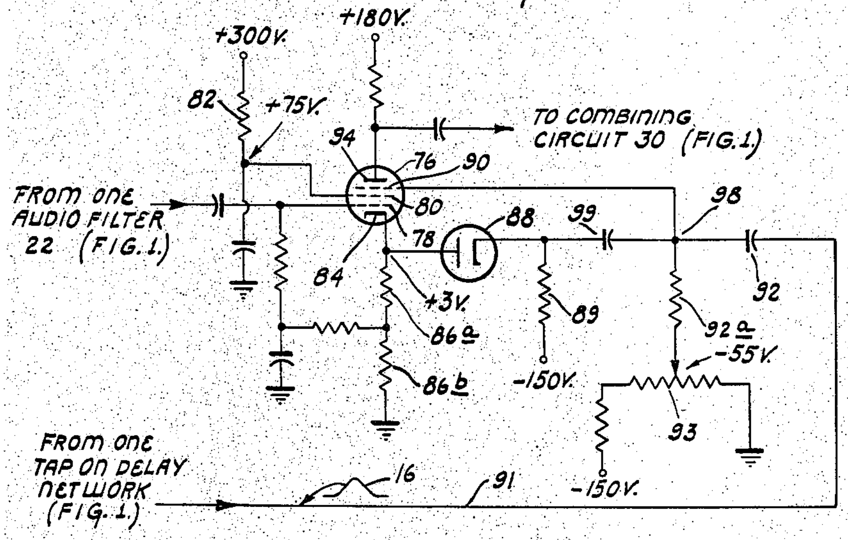
Figure 3B:
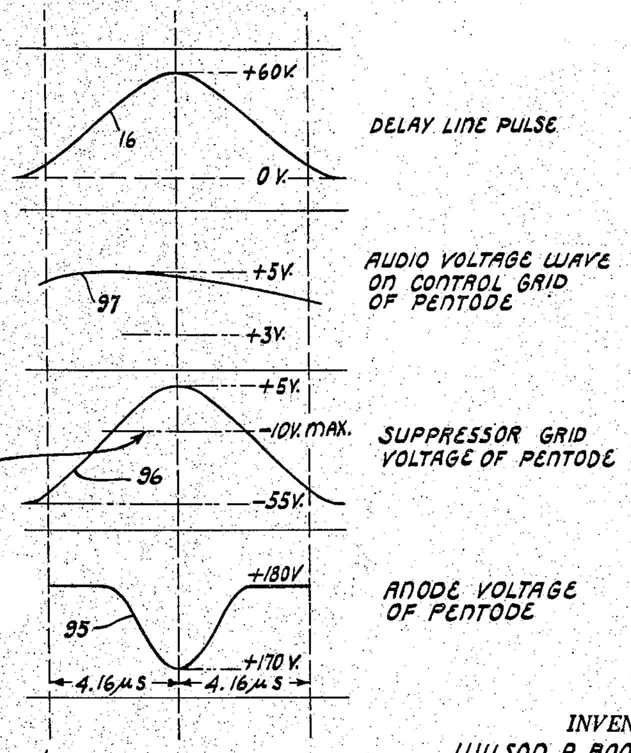
Figure 3D:
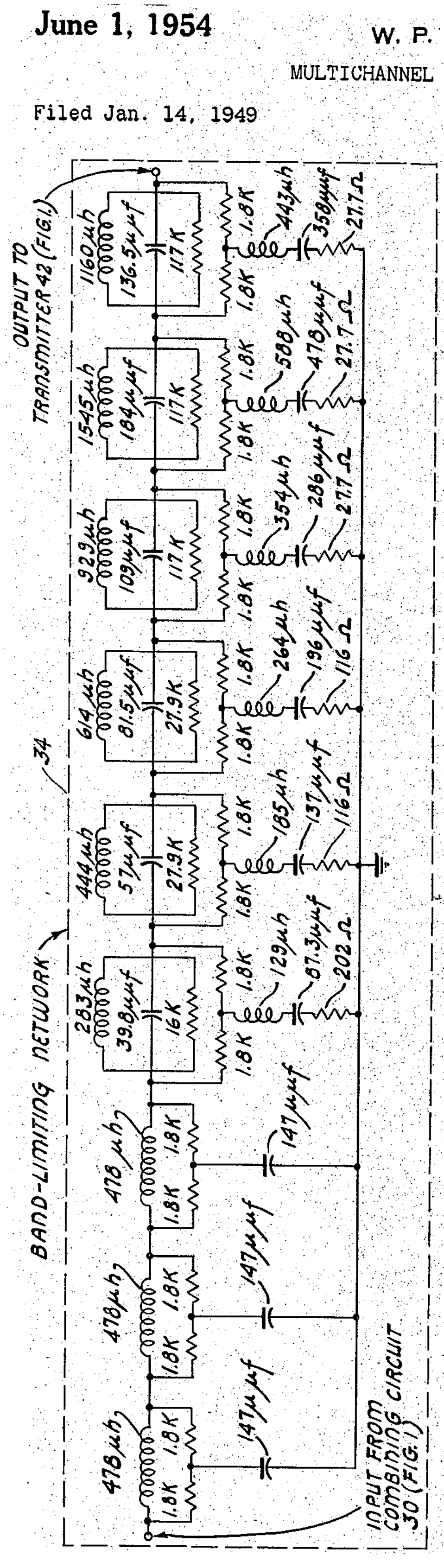
Figure 3E:
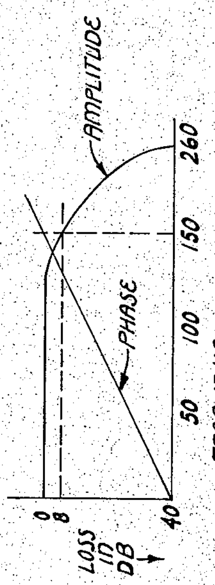
Figure 3C:
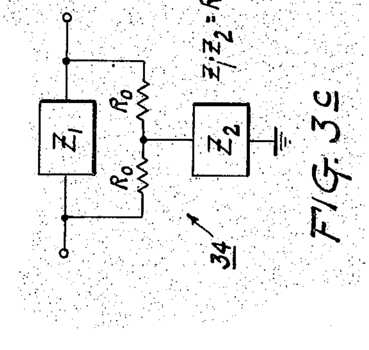
Figure 4:
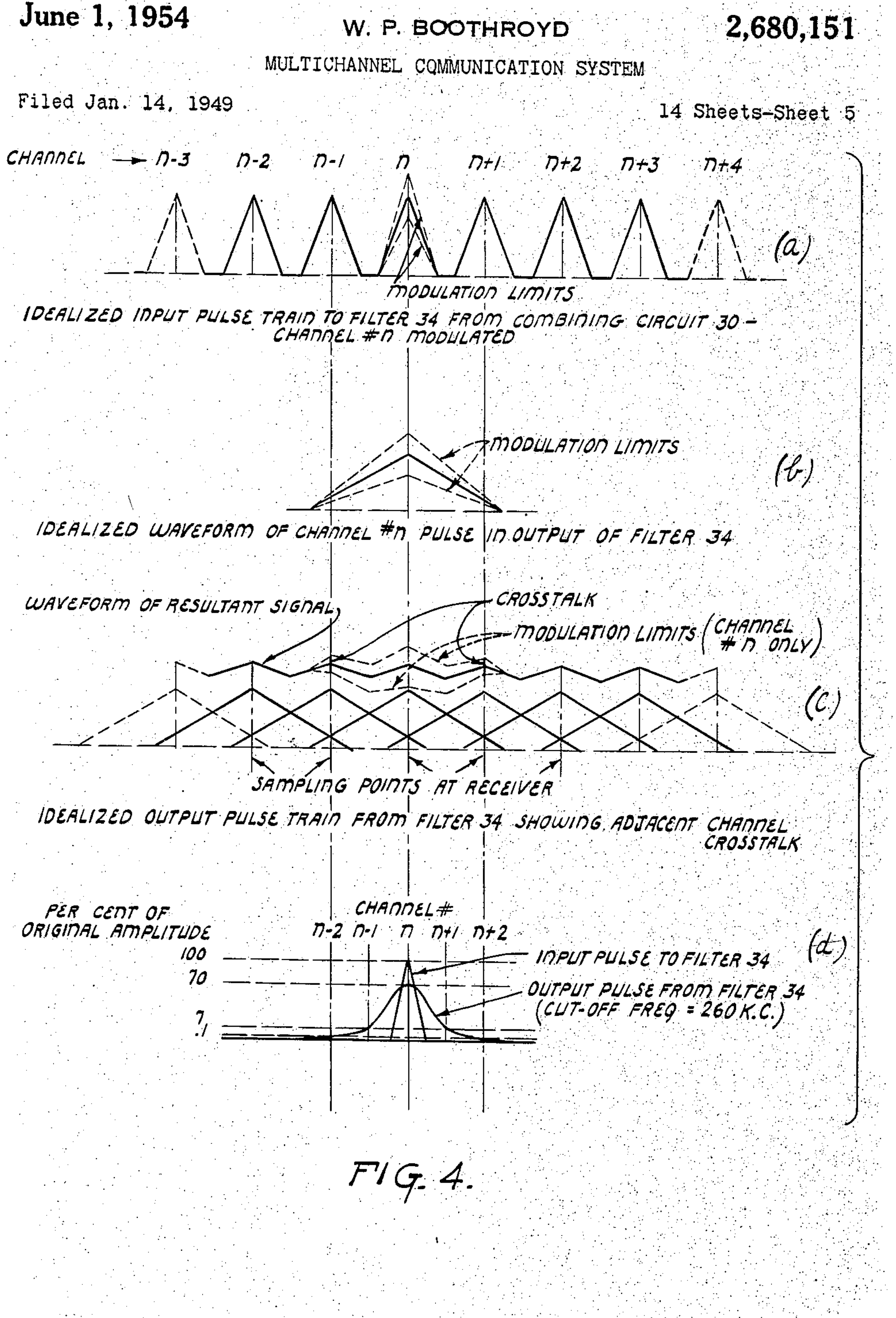
Figure 5:
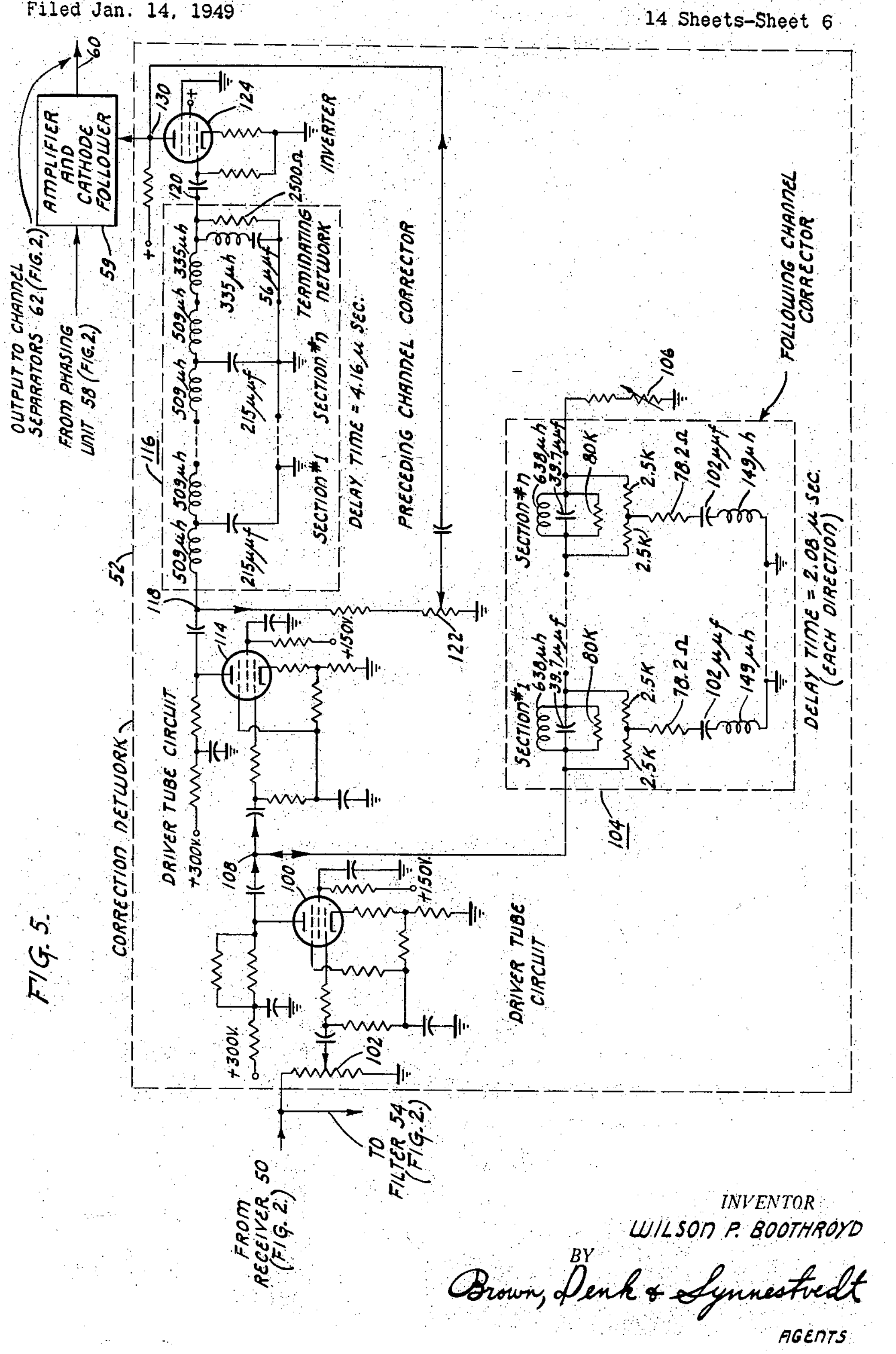
Figure 7:
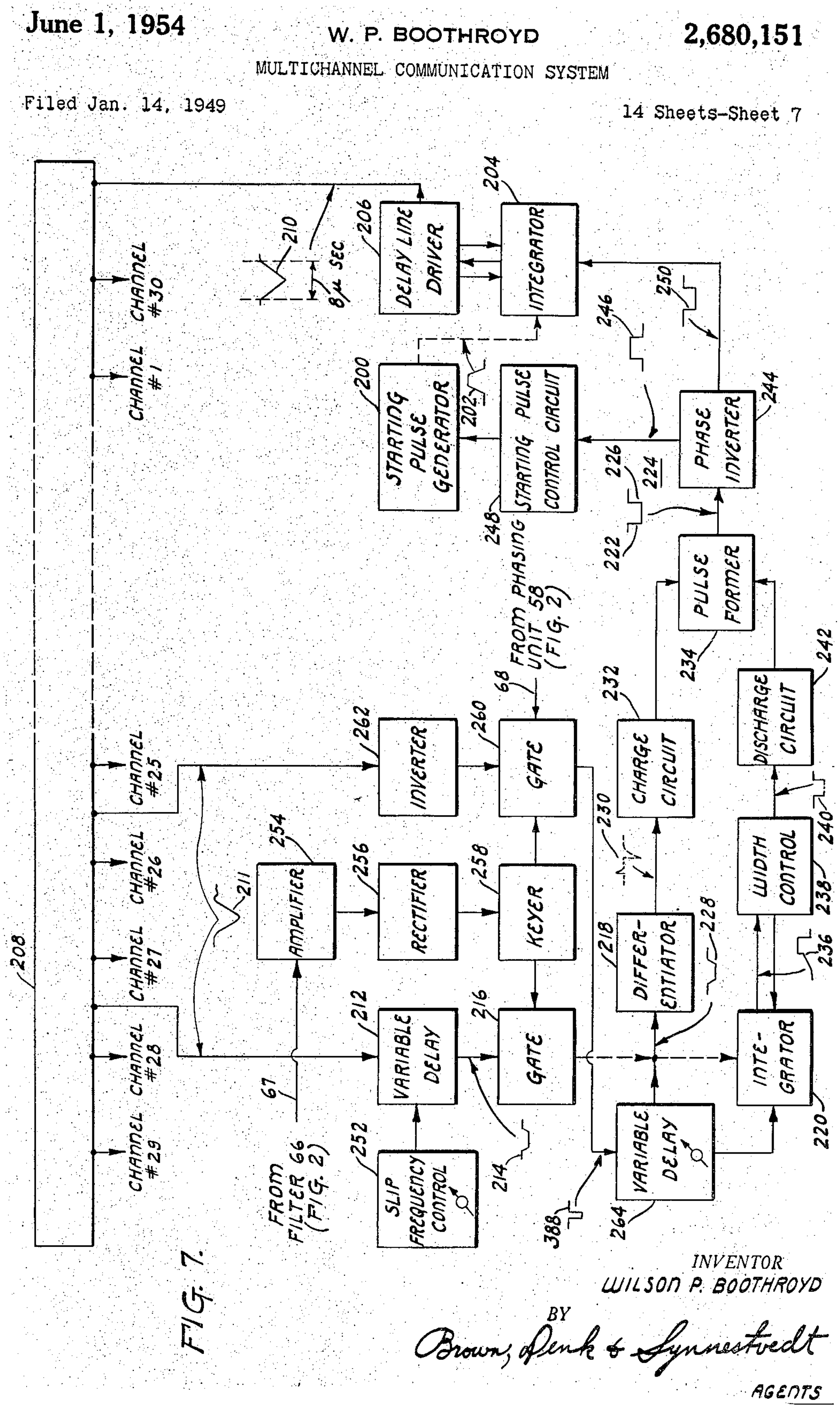
Figure 8A:
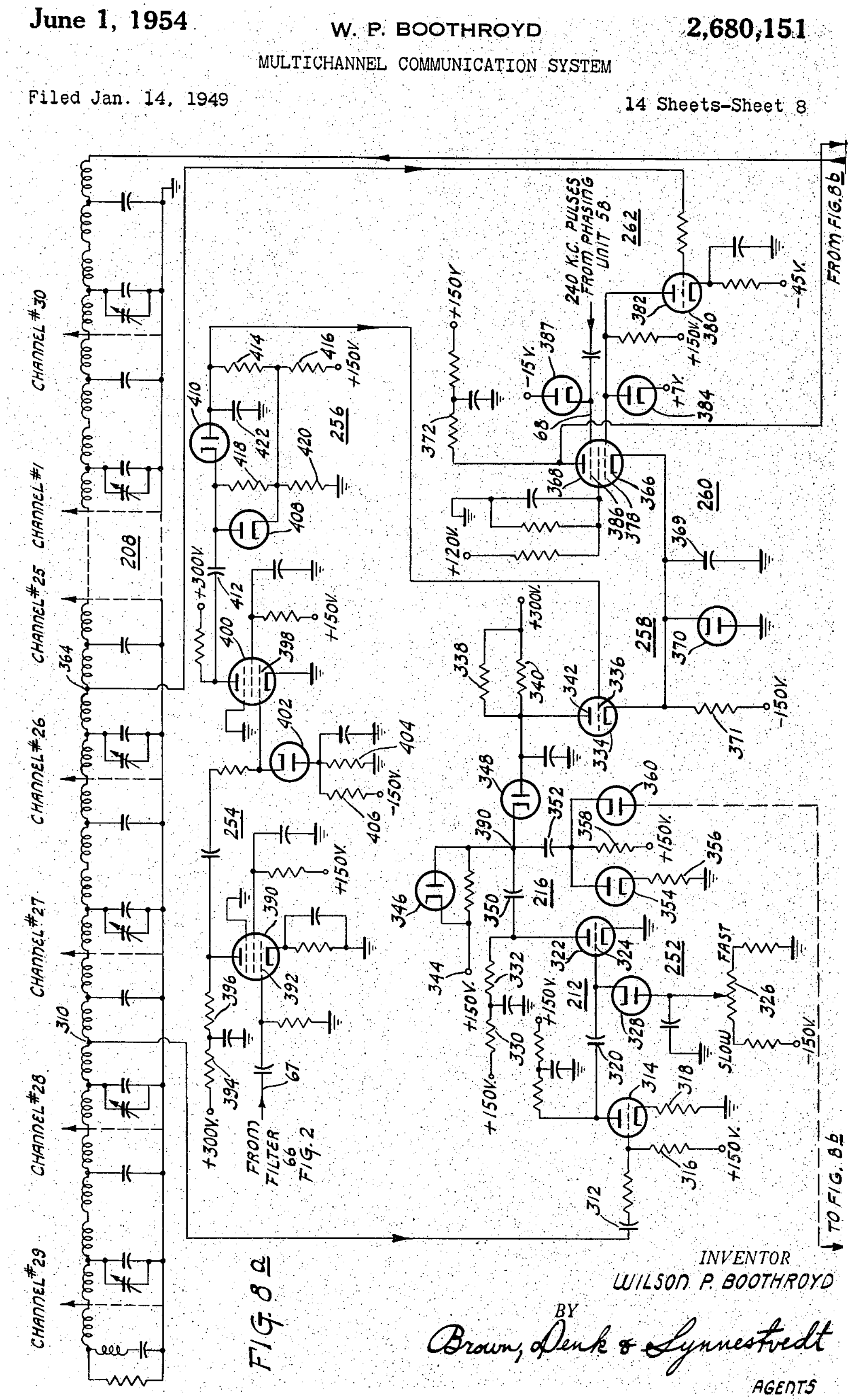
Figure 8B:
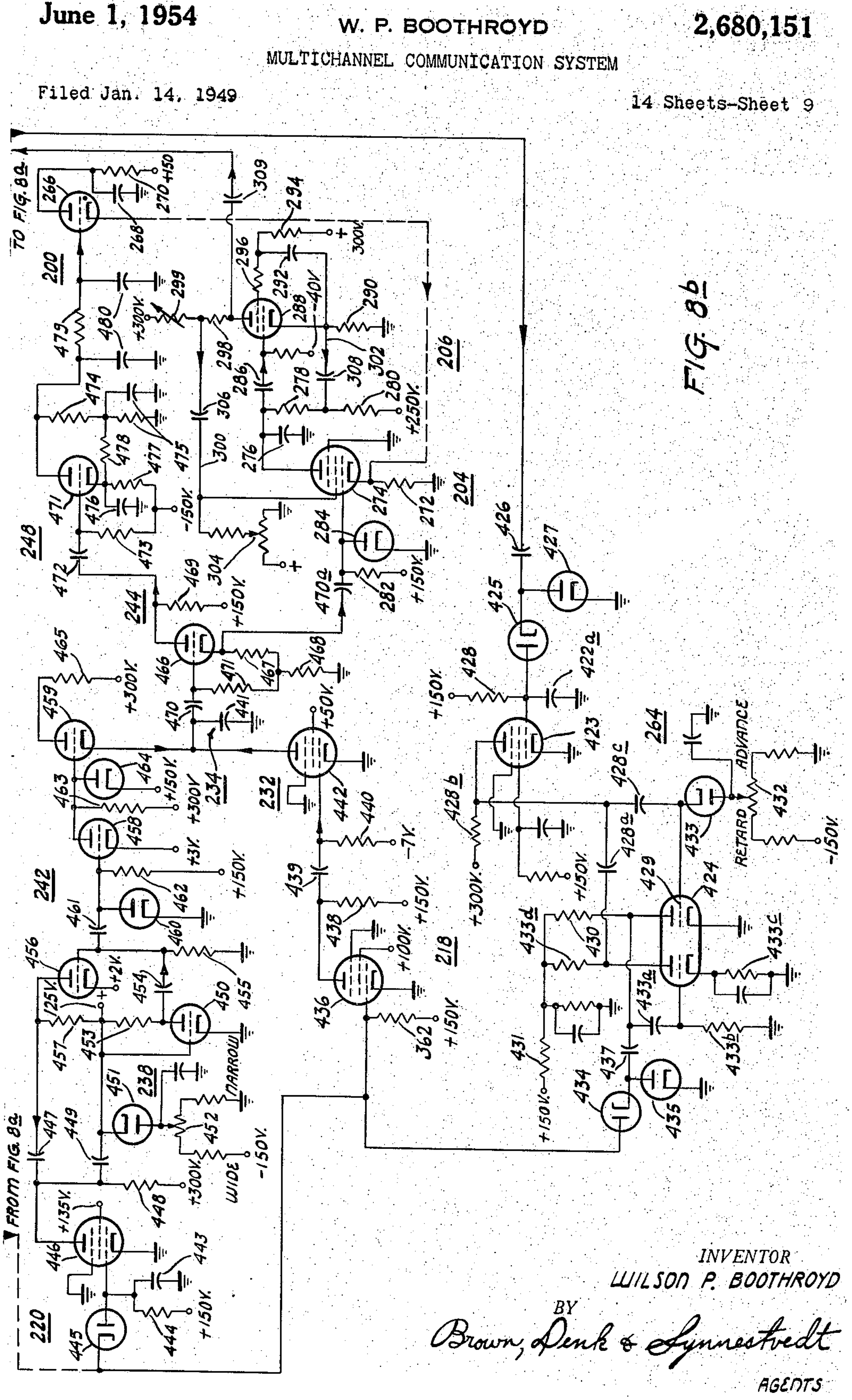
Figure 9:
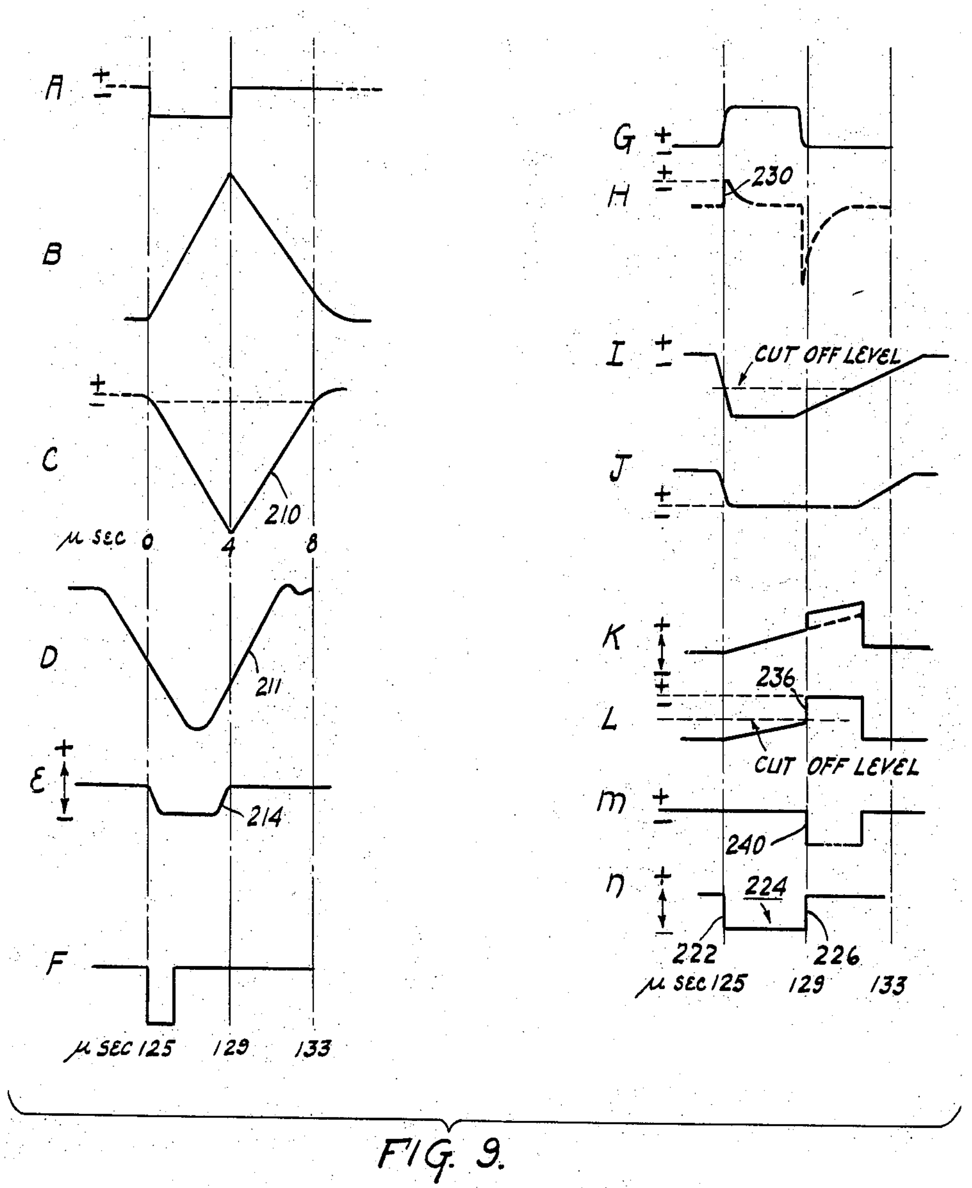
Figure 10:
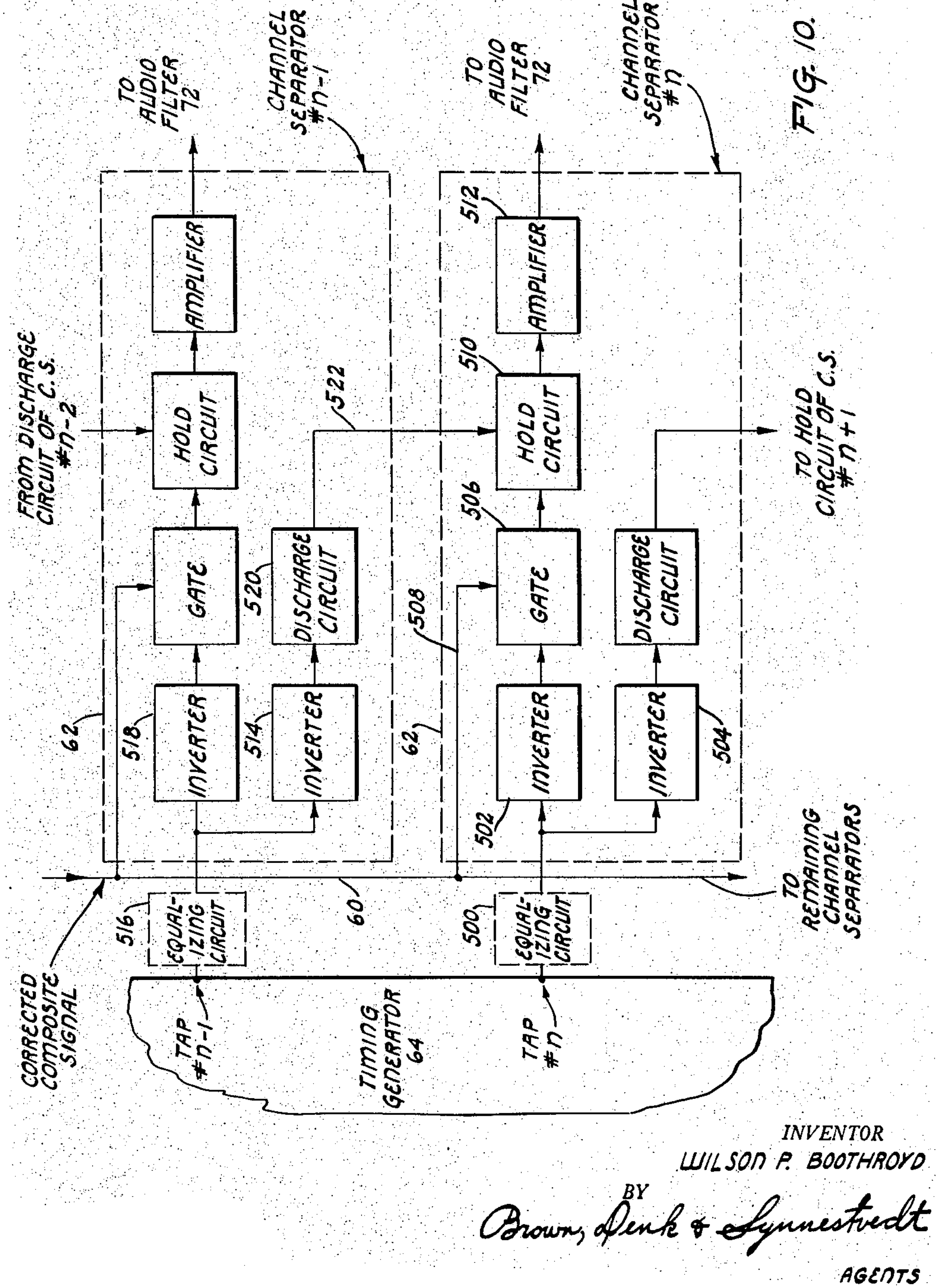
Figure 11:
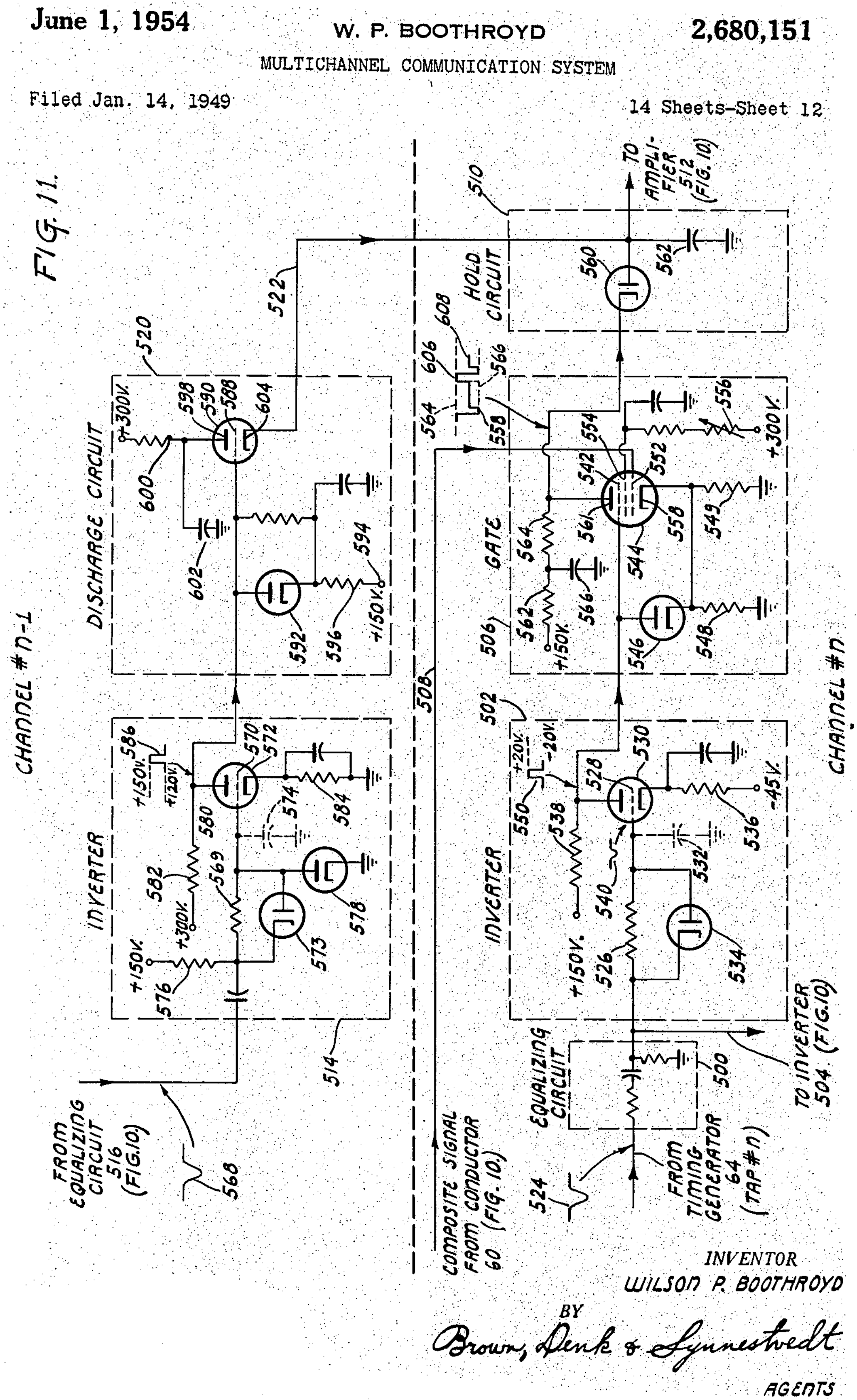
Figure 12A:
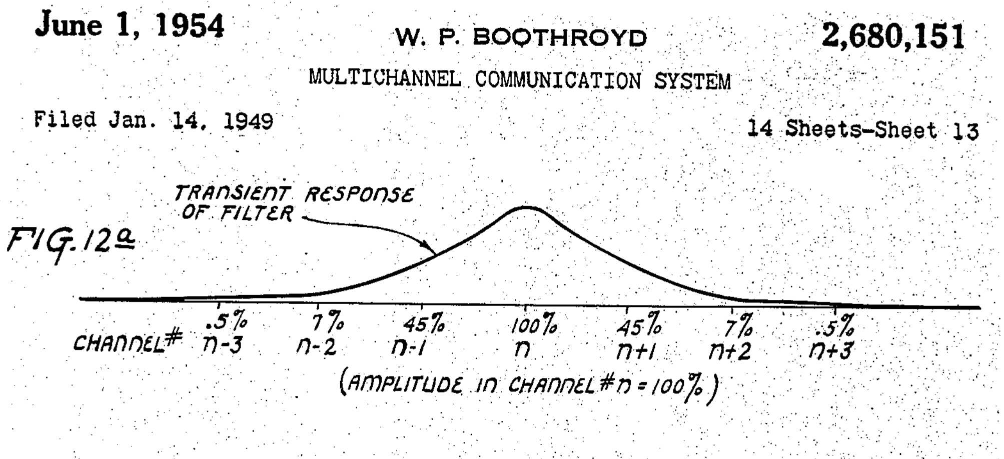
Figure 12B:
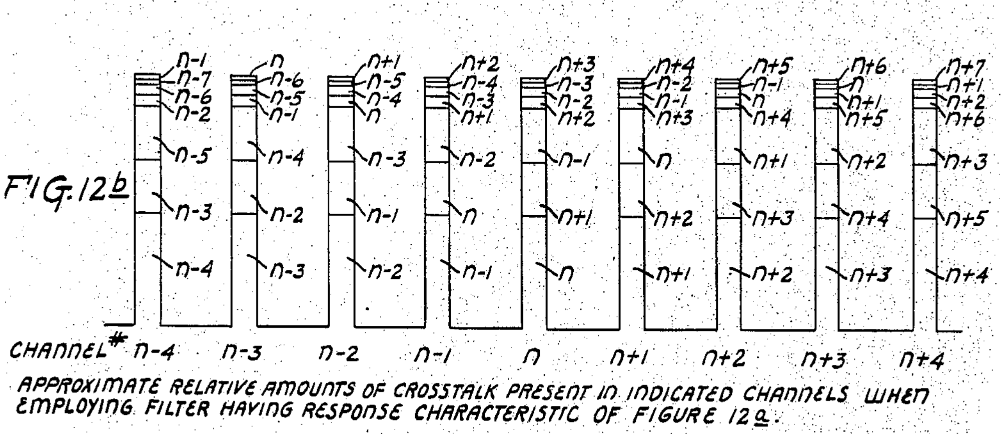
Figure 13:
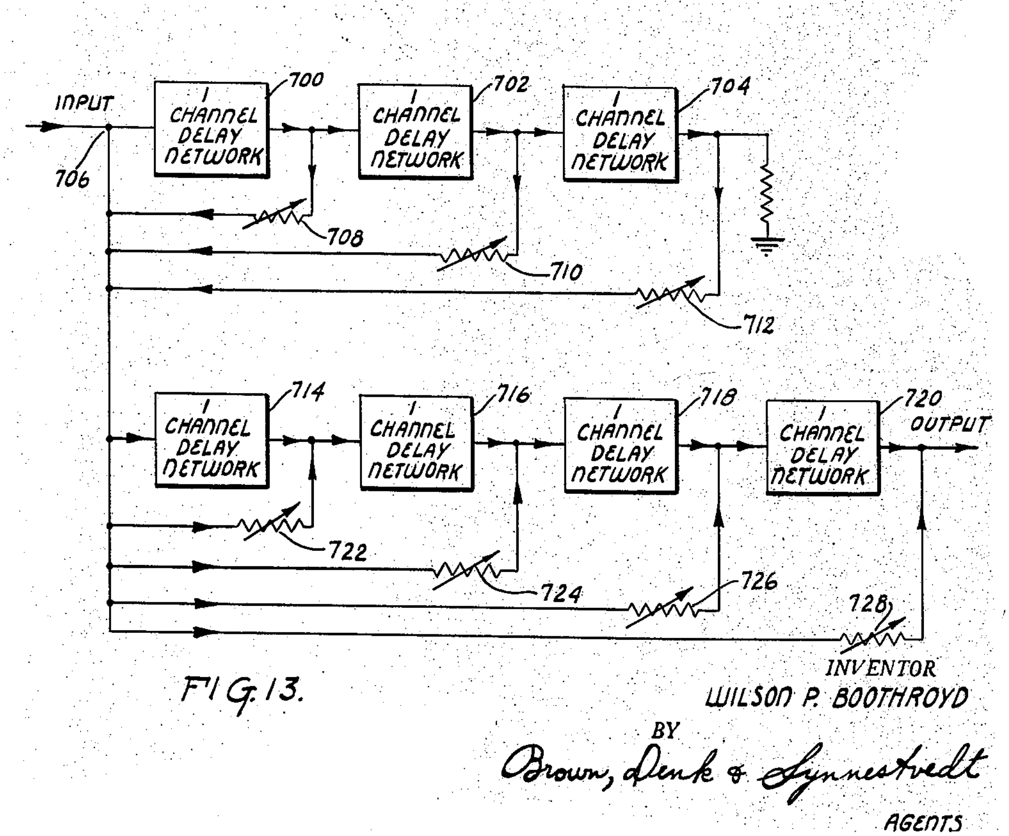

Fig. 3*a* is a circuit diagram of one form of modulator included in the transmitting system of Fig. 1;

Fig. 3*b* is a set of waveforms helpful in explaining the operation of the modulator of Fig. 3*a*;

Fig. 3*c* illustrates the general characteristics of one form of band-limiting network in Fig. 1;

Fig. 3*d* illustrates the circuit of a preferred type of filter which is adapted to perform the function of the band-limiting network of Fig. 3*c*;

Fig. 3*e* is a graph of loss vs. frequency for one particular type of such a band-limiting network;

Fig. 4 is a set of idealized waveforms which are helpful in explaining the operation of the filter of Fig. 3*d*;

Fig. 5 illustrates the circuit details of one form of correction network included in the receiving system of Fig. 2;

Fig. 6 illustrates graphically in an idealized manner the operation of the crosstalk-correcting network of Fig. 5;

Fig. 7 is a block diagram of the timing generator included in the receiver of Fig. 2;

Fig. 8 shows the circuit components of Fig. 7;

Fig. 9 is a set of waveforms which are helpful in explaining the operation of the system of Fig. 8;

Fig. 10 is a block diagram of two of the channel separators included in the receiver of Fig. 2;

Fig. 11 illustrates the circuit components of Fig. 10;

Fig. 12*a* illustrates the response characteristic of another band-limiting network of the type shown in Fig. 3*c*;

Fig. 12*b* illustrates the approximate relative amounts of crosstalk present in adjacent channels when employing a filter having the response characteristic of Fig. 12*a*;

Fig. 13 illustrates a preferred form of multi-channel correction network designed to eliminate the crosstalk shown in Fig. 12*b*;

Fig. 14*a* is a graph showing possible channel signal voltages, at time intervals equal to the channel intervals, for a filter having the characteristics of Fig. 3*e*;

Fig. 14*b* is a block diagram of a corrector network for substantially eliminating the crosstalk shown in Fig. 14*a*;

Fig. 14*c* is a table of output voltages from the corrector network of Fig. 14*b* at the time intervals shown in Fig. 14*a*; and Figs. 15*a* and 15*b* are graphs of amplitude vs. frequency and amplitude vs. time, respectively, for a modified form of the filter network of Fig. 3*d*.

In accordance with a principal feature of the present invention, each intelligence channel is sampled at a rate dependent upon the highest intelligence frequency contained in the signal in that channel. This sampling process detects the instantaneous amplitude of the signal in each channel, and, by sampling the channels in sequence, the channel information is made available for interleaving into a composite multiplexed signal.

In a preferred embodiment, the apparatus for carrying out the above process includes a pulse generator feeding an artificial delay line. The pulse from the generator is preferably of triangular waveform, and has a recurrence frequency equal to the desired sampling frequency, which may for example be 8 kilocycles. The delay line is provided with a plurality of output terminals equal in number to the number of intelligence signal channels. In the embodiment being described, the delay line is designed with thirty equally-spaced taps giving approximately a 4.16 microsecond delay therebetween. A low-pass filter is incorporated in the input section of the delay line, this filter acting to remove the high-harmonic components of the triangular input pulses. At all of the output terminals of the delay line, therefore, there are available properly-timed sampling waves of the same shape and containing substantially no high-frequency energy. One type of apparatus particularly suited for producing a sampling wave of the above nature is described and claimed in applicant's copending application Serial No. 14,691, filed March 13, 1948.

As described above, the delay line input pulse, passing the various output taps in sequence, becomes a timing wave for the purpose of sampling the respective intelligence channels. This sampling is preferably accomplished by gating a normally non-conductive electron tube incorporated in each intelligence channel of the system. The intelligence signal in each channel is continuously applied to its respective gating tube, and the latter is rendered conductive only upon the application thereto of one particular timing or gating pulse from the delay line. The output of each gating tube is consequently a signal having an amplitude representative of the amplitude of the intelligence signal at the instant when sampling occurs.

The respective outputs of these gating tubes are combined in timed sequence to form a composite multiplexed signal which may then be transmitted directly or employed to either amplitude-modulate or frequency-modulate a carrier wave for transmission by any suitable form of translating device.

It has been found that the bandwidth necessary for the satisfactory reproduction of the intelligence contained in each of the signal channels may be minimized without introducing excessive crosstalk or distortion in the reproduced signal by employing, just before the transmitter, a filter having a relatively low cut-off. The underlying principle in this arrangement is that it is unnecessary to transmit all of the harmonics and all of the sidebands present in the combined output of the gating devices. For example, in the illustration given in which each channel of a thirty channel system is sampled at an 8 kilocycle rate, substantially all of the intelligence may be retained in the signal if the 8 kilocycle sampling wave is transmitted with its harmonics (up to about the fifteenth), each of which is modulated with a group of sidebands extending about 3.3 kilocycles to each side thereof (assuming that the highest intelligence signal frequency is 3,300 cycles). It has further been found that distortion may be almost completely avoided if both sidebands of each useful harmonic of this 8 kilocycle wave are passed with substantially equal amplitude.

Accordingly, the output filter is designed to cut off at approximately 150 kilocycles, the response being fairly uniform up to this point with a rapid attenuation thereafter so as to be down 40 db at 260 kilocycles. Such an attenuation of the higher frequencies, however, causes a widening, or spreading, of the signal energy in each channel, and hence the system includes means for overcoming the difficulties arising from this condition.

Inasmuch as the present disclosure employs amplitude modulation, it is necessary that at the relay receiver the received signal be sampled at each precise instant when its amplitude is representative of the intelligence being conveyed. Furthermore, no cross-modulation between channels is permissible at the time when sampling occurs. In order to insure that these conditions prevail, means are provided for reducing substantially to zero the energy in the adjacent signal channels at the instant when the sampling of any one particular channel takes place.

The means for accomplishing this result include in a preferred embodiment a so-called correction network to which the multiplexed signal at the receiver is applied. By properly adjusting both the time delay and the phase displacement of each particular portion of the multiplexed wave by the use of this correcting network, it is possible to substantially cancel any energy resulting from signals previously transmitted and remaining in any one portion of the wave at the time when the wave portion representing the next succeeding intelligence channel appears at the input terminals of the network. Hence, no carry-over or residual energy remains to cause distortion of the intelligence signal, or crosstalk.

It has also been found that an unmodulated reference wave, having a frequency equal to the sampling frequency multiplied by the number of intelligence channels, may be used at the receiver to provide a reference level, or base, on which the amplitude-modulated intelligence signal may be superimposed. This permits the demodulation of the signal to be more readily accomplished without crosstalk. It has also been found that this reference wave may be derived by transmitting a sub-harmonic of the reference frequency (falling within the passband of the output filter system) and then frequency-multiplying the received sub-harmonic signal to obtain the desired wave.

It will thus be recognized that the present disclosure provides a pulse-amplitude-modulated multi-channel communication system which employs a time-multiplexed signal derived by sampling in sequence a plurality of intelligence signals, the multiplexed signal being modulated in amplitude in accordance with the intelligence signal level at the time of sampling. It will be further noted that the transmitted signal contains no frequency higher than that ordinarily present in an equivalent single-side-band frequency-division system.

*Transmitter*

Referring now to Fig. 1 of the drawings, there is shown a schematic block diagram of a preferred form of pulse-amplitude-modulated multiplex transmitting system in accordance with the present invention. This system includes a 120 kilocycle oscillator 8 operating in timed relation with a pulse generator 10. The latter produces a series of uniform and uniformly spaced triangular pulses having a constant repetition rate.

While the pulse generator 10 may be of any suitable type known in the art, one particularly appropriate design is described and claimed in the copending application Serial No. 14,691, referred to above.

The repetition rate of the pulses produced by the generator 10 is 8 kilocycles. In other words, the peak of each pulse is spaced in time from the peak of the immediately preceding pulse by an interval of 125 microseconds. Furthermore, for reasons which will later become apparent, each triangular pulse has an effective width at its base which is no greater than 8 microseconds.

These pulses from the generator 10, which may have a waveform such as shown in the drawing by the reference numeral 12, are applied to the input terminal of a delay network 14. This network 14 may be of any form known in the art, such, for example, as a plurality of series-connected inductors and shunt-connected capacitors arranged to form individual sections or units. Network 14 is provided with 30 equally-spaced output taps chosen so that the time delay for each section of the network is approximately 4.16 microseconds. The total delay interval for the entire network is thus 4.16·30, or 125 microseconds, and is substantially equal to the period of the pulses 12. Such delay networks are known in the art, but one type of delay network which is particularly suited for this purpose is shown in the copending application Serial No. 14,691.

In order that the delay network 14 may remove the high-frequency components present in the pulse output of the generator 10, a low-pass filter is incorporated therein. This filter is designed to have a cut-off frequency of, for example, 200 kilocycles. It may take the form of a number of extra L-C sections located at the input end of the delay network. Accordingly, the pulses 12, which appear successively at the output taps #1–#30 of the network 14, have a waveform in which the sharp peak of each pulse is rounded off, as shown by the reference numeral 16.

The characteristic impedance of the delay network 14 is of course determined by the particular values of the inductors and capacitors making up the assembly. It has been found in practice that a characteristic impedance of 2500 ohms will produce satisfactory results, and a suitable terminating impedance of this value is used.

One important characteristic of the delay network 14 is that it does not introduce any appreciable change in the waveform of the pulses 16 as they travel therealong. After the output pulses 12 from the generator 10 have passed through the first few sections of the delay network 14 (which constitute the low-pass filter), and have arrived at the first output tap of the network with the shape shown at 16, no significant change occurs in the waveform of the pulses until after they pass the last output terminal #30.

Summarizing the above, a pulse 12 applied to the input terminal of the network 14 appears at the output taps #1–#30 with the waveform 16 successively at times spaced approximately 4.16 microseconds apart. The wave retains substantially this same shape at each output terminal of the network.

As previously mentioned, the transmitting system of Fig. 1 is designed to multiplex thirty audio channels on a time-sharing basis. This is accomplished by sampling the intelligence signal in each channel at a rate equal to at least twice the highest frequency contained therein. This sampling process detects the instantaneous amplitude of the intelligence signal at the instant when sampling occurs, and, since the channels are sampled in sequence, the channel information is available for intermixing into a composite multiplexed signal.

As the pulse 16 passes the various output taps of the network 14 in sequence, it becomes a timing wave for the purpose of sampling the respective intelligence channels. The embodiment of the invention illustrated includes thirty such channels, although this number was arbitrarily chosen and thus is merely exemplary. One of these channels transmits an indexing tone for synchronizing purposes and is also used as an order line. The remaining twenty-nine channels are available for audio communication.

Each of the thirty output taps or terminals of the delay network 14 is connected to one of thirty modulators 18. Twenty-nine of these modulators also receive signals from twenty-nine audio input channels, each of which includes a microphone 20 or other source of audio frequency signals. In order that all frequencies outside the 300 to 3,300 cycle range may be eliminated from the output of the microphones 20, a filter 22 is provided in each audio channel. The output of each filter 22, therefore, is an audio signal having no frequency higher than approximately 3,300 cycles per second.

Each of these audio signals is applied to its respective modulator 18, which also receives a timing signal, in the manner above described, from one output tap on the delay network 14. Inasmuch as the highest audio frequency is limited by the filters 22 to a value of approximately 3,300 cycles per second, it will be seen that the 8 kilocycle wave 16 will sample the audio information in each channel at a rate equal to at least twice the highest audio frequency. Furthermore, the amplitude of the 8 kilocycle energy appearing at the output of any particular one of the modulators 18 will depend upon the instantaneous value of the audio signal applied to that particular modulator at the instant when a sampling pulse is also applied thereto. Thus the signal in each audio channel may be transmitted without any appreciable loss of the information contained therein.

The single remaining modulator #27 receives both an indexing tone at a frequency of 3,900 cycles from a generator 24 and also the output of an order line filter 26. Inasmuch as the order line information in the embodiment described does not require as high a frequency range as that of the remaining audio inputs, the order line filter 26 (which is connected to a microphone 28), has a frequency passband of from 300 to 2,500 cycles. Since the highest frequency applied to the indexing tone and order line modulator is 3,900 cycles per second, the intelligence in channel #27 will still be sampled at least twice per cycle by the 8 kilocycle timing wave 16.

Although any one of the modulators 18 might have been selected to receive the combined output of the indexing tone generator 24 and the order line filter 26, in the present embodiment channel #27 was selected for this purpose. Thus, each one of the thirty modulators 18 is connected to receive a "triggering" pulse in timed sequence from one of the thirty taps on the delay network 14.

The respective outputs of the modulators 18, representing thirty channels of amplitude-modulated pulses, are then combined into a single multiplexed signal by the combining circuit 30. The signal in the output of the circuit 30 may have a waveform such as represented by the reference numeral 32. This wave 32 is a composite multiplexed signal composed of thirty phase-delayed pulses derived from each one of the 8 kilocycle timing pulses 16, or 240,000 amplitude-modulated pulses per second. Each thirtieth pulse in this wave represents the intelligence of one particular channel.

One of the principal features of the present invention resides in the ability of the disclosed apparatus to operate with a bandwidth which is approximately equal to the normal spectrum of the multiplexed signal. It has been found that the transmitted intelligence will be reproduced with negligible distortion if the 8 kilocycle sampling wave is transmitted with a substantial number of its harmonics, each of these harmonics having sidebands extending a distance on each side thereof equal approximately to the highest channel frequency. It has furthermore been found that an unmodulated reference wave representing the 240 kilocycle sampling frequency is desirable at the receiver in order to aid in the demodulation of the multiplexed signal.

According to this feature of the present invention, therefore, a transmission bandwidth of only approximately 150 kilocycles is required. Although this permits transmission of an appreciable number of the harmonics in the 8 kilocycle sampling wave, it does not permit transmission of the unmodulated 240 kilocycle wave. However, if a subharmonic of this 240 kilocycle frequency is derived at the transmitter (such as 120 kilocycles, for example), it may be added to the transmitted signal and then restored to its original form at the receiver by utilizing a suitable frequency-doubling circuit.

In order that the multiplexed signal may be transmitted within the above-mentioned 150 kilocycle passband, the composite signal 32 is applied to a band-limiting network 34 which in effect consists of a low-pass filter having a response which drops only gradually up to 150 kilocycles but then falls off sharply until it is down substantially 40 db at 260 kilocycles. This band-limiting apparatus permits transmission of the 8 kilocycle sampling wave with a number of its harmonics (up to at least the fifteenth), and, furthermore, passes the two sidebands of each of these harmonics with substantially equal amplitude. However, it is recognized that the cut-off of the band-limiting network 34, such as shown by the response curve 36 in Fig. 1, will introduce considerable crosstalk into the signal 32 unless it is compensated for. The means for producing such a compensation are an essential portion of the invention, and will be fully described in connection with a description of the receiving apparatus, as set forth below.

A portion of the output of the oscillator 8 is applied to a 120 kilocycle filter 38, which may also, if necessary, include suitable clipping and amplifying means for producing an output wave 39 of constant amplitude. Any necessary phasing of the wave 39 may be brought about by a phasing unit 40. The output of the unit 40 is combined in properly timed relation with the output of the band-limiting network 34, and the resulting wave is employed to modulate either a transmitter 42 or any other type of translating device. However, it should be understood that the wave representing the combined outputs of the band-limiting network 34 and the phasing unit 40 may also be transmitted by a cable or other form of wire-transmission medium.

*Receiver*

In Fig. 2 is illustrated a block diagram of one form of multiplex receiving system in accordance with the present invention. The receiving system of Fig. 2 is particularly suited to reproduce the intelligence present in a multiplexed signal transmitted by a system such as illustrated in Fig. 1.

Broadly set forth, the incoming signal is detected by a receiver and applied to a network which is effective to correct or compensate for the spreading of the signal channel energy introduced by the band-limiting circuit of the transmitter. A 120 kilocycle wave is also derived from the received signal, doubled in frequency, phased, and combined with the signal output of the correcting network. This combined signal is then amplified and applied to each of thirty channel separators which also receive gating pulses from a timing generator the operation of which is indexed with the operation of the timing generator at the transmitter by means of a control voltage derived from the energy in the indexing tone channel. The signal output of each channel separator is filtered and applied to a suitable transducer so that the intelligence contained in the signal may be reproduced.

Referring now to the particular elements of Fig. 2, the signal is first detected by a receiver 50 which may be of conventional design. The output of this receiver 50 may be a series of amplitude-modulated pulses having a waveform similar to that representing the combined outputs of the band-limiting network 34 and the phasing unit 40 of the transmitter illustrated in Fig. 1. This output from the receiver 50, however, is not truly representative of the multiplexed intelligence signal output of the combining circuit 30 in Fig. 1 due to the fact that, as previously mentioned, considerable spreading of the signal channel energies is introduced into the transmitted signal by the cut-off of the filter incorporated in the limiting network 34. Consequently, the receiver of Fig. 2 includes a correction network 52 to which the output of the receiver 50 is applied.

The filter network 34 of Fig. 1 preferably has a response characteristic which, while sloping only slightly out to a frequency of approximately 150 kilocycles, nevertheless is not completely flat over this portion of the spectrum. Although it may be down only approximately 8 db at 150 kilocycles, even this relatively slight slope is enough to produce crosstalk between adjacent intelligence channels. If some means were not present in the system to reduce this distortion, it would be extremely difficult to reproduce satisfactorily the audio signals or other information imparted to the system at the transmitter. However, by means of the correction network 52, any such crosstalk which may exist is reduced to a negligible value.

In one form, the correction network 52 includes first an artificial delay line which is terminated in other than its characteristic impedance. It therefore produces reflections, the phase and amplitude of which can be selectively controlled. In other words, the reflection produced by the appearance of a pulse representing one particular signal channel at the input of the delay line may be so controlled in amplitude and phase as to arrive back at the input terminals of the line with a potential which is equal and opposite to the residual voltage of that particular pulse remaining at the input terminals at the precise instant of arrival of the pulse representing the next succeeding channel. Hence, the only signal effectively present at the time of arrival of a following pulse is that which is actually present in the latter pulse itself, and no residual or carry-over voltage remains from the pulse which preceded it. A second delay line is employed to compensate for crosstalk introduced from the energy in the immediately following channel. A complete description of the details of the correction network 52 will be given in connection with a description of Fig. 5, and it is believed that the above is sufficient at this point to provide an understanding of the function of this particular component in the receiver system.

It will be appreciated from the above description that the correction network 52 acts to reduce crosstalk between adjacent channels at one precise instant in each cycle when the residual voltage of a particular pulse is cancelled by the presence of the equal and opposite voltage derived by reflection. However, it will also be clear that for each channel this cancellation occurs at only one instant. Hence, in order to derive a signal representative of the actual intelligence present in the received wave, it is necessary that the various channels be sampled at the exact moments when such crosstalk cancellations occur. It is for this purpose that the 120 kilocycle wave output of the phasing unit 40 in Fig. 1 was combined with the output of the band-limiting network 34.

Referring again to Fig. 2, there is provided a filter 54 which is connected as shown to the receiver 50 so as to produce a 120 kilocycle energy wave bearing a timed relation to the received signal. This 120 kilocycle energy from filter 54, which is unmodulated, is then passed through a frequency doubler 56 and a phasing unit 58 to produce a 240 kilocycle wave of constant amplitude, part of which is mixed with the intelligence signal output of the corrector network 52 in an amplifier and cathode follower 59. The phasing unit 58 should be adjusted so that the peaks of the 240 kilocycle wave occur at the precise instants when the correction network 52 reduces the crosstalk between the adjacent intelligence channels substantially to zero. In other words, units 54, 56 and 58 act to provide a base, or pedestal, upon which the amplitude-modulated multiplexed signal output of the correction network 52 may be superimposed. This multiplexed signal, which now possesses a reference or base voltage, is applied simultaneously over the conductor 60 to each one of thirty channel separators 62.

The receiver of Fig. 2 also includes a timing generator 64 which has functions similar to that of the pulse generator 10 in combination with the delay network 14 in Fig. 1. That is, the generator 64 provides a timing wave which is produced by pulses of an 8 kilocycle repetition frequency traversing a delay line having thirty equally-spaced output taps. The delay period between the successive output taps is identical to that provided by the delay network 14 in Fig. 1 or, in other words, about 4.16 microseconds. The details of this timing generator 64 will be set forth in connection with a description of Figs. 7, 8 and 9, and it will merely be stated at this time that the generator 64 receives both a synchronizing voltage from an indexing tone filter 66 over a conductor 67, and also a portion of the unmodulated 240 kilocycle output of the phasing unit 58 over a conductor 68.

The thirty channel separators 62, including the indexing tone and order line channel separator #27, are all supplied with the intelligence signal from the amplifier 59, and also with timing pulses from the generator 64. These latter pulses gate the channel separators 62 in such a manner that there is no output from the latter except during the occurrence of a timing pulse. However, when such a timing pulse does occur, then the output voltage from the particular separator 62 to which it is applied rises to a peak value corresponding to the amplitude of the pulse included in the intelligence signal at the instant of triggering.

Each of the channel separators 62 thus in effect selects one particular channel from the composite multiplexed signal. In order that sufficient power be available which is truly representative of the intelligence in that particular signal channel, it is desirable that the output wave from each separator be maintained at the intelligence signal level for a sufficient period of time to provide adequate energy for the reproducing apparatus. Accordingly, each of the channel separators 62 is so arranged that the timing pulse from the generator 64 acts to initiate a voltage variation which remains a constant level for an appreciable period of time, and is then returned to its original value by an action of a discharge, or restoring, voltage derived from the immediately preceding channel. In the embodiment illustrated, the voltage in each of the channel separators which is representative of the intelligence information is caused to remain constant for a time interval of about 120 microseconds, this being slightly less than the 125 microseconds period of the 8 kilocycle timing pulses. Further details of the channel separators 62 will be given in connection with a description of Figs. 10 and 11.

The output of channel separator #27 is applied not only to the indexing tone filter 66 to permit separation of the 3,900 cycle synchronizing wave, but also to a low pass (300 to 2,500 cycle) filter 70 to provide the order line intelligence picked up by the microphone 28 at the transmitter. The remaining twenty-nine channel separators are connected to twenty-nine audio filters 72, the respective outputs of which are reproduced in the twenty-nine output circuits thereof, here represented by twenty-nine audio reproducers 74.

*Modulators*

In Fig. 3*a* is shown a preferred type of circuit for accomplishing the function of each individual modulator 18 in Fig. 1. It will be appreciated that it is the purpose of each such modulator 18 to act as a gating circuit which effectively connects the output of its respective audio filter 22 to the modulator output circuit (combining circuit 30) in accordance with the application to the modulator of one of the timing pulses 16 from the delay network 14. The outputs of the respective modulators are then consolidated as shown in Fig. 1 in the combining circuit 30. It will be further appreciated that the modulator 18, or gating circuit, must be closed to the output of its associated audio filter 22 at all times except when it is opened by the application thereto of one of the timing pulses 16 from the delay network.

Accordingly, each one of the modulators 18 in Fig. 1 may include a pentode 76 (as shown in Fig. 3*a*) to the control grid 78 of which the output of an audio filter 22 is applied. The screen grid 80 of tube 76 is connected to a source of positive potential through a resistor 82. The cathode 84 of the tube is connected to ground through two series resistors 86*a* and 86*b*, and is also connected directly to the anode of a diode 88. The cathode of diode 88 is connected to a source of negative potential through the resistor 89.

The pulses 16 from the delay network 14 are applied with positive polarity to the suppressor grid 90 of the pentode 76 by means of conductor 91 and condenser 92. The bias on suppressor grid 90 is maintained at a selected negative potential in excess of cut off by having its leak resistor 92*a* connected to the arm of the potentiometer 93 which is connected between a negative potential source and ground. The output of the pentode 76 is taken directly from its plate 94, and is applied as shown to the combining circuit 30 (Fig. 1).

The audio voltage from the filter 22 in Fig. 1 is accordingly applied to one grid of the pentode 76, while the timing pulses 16 from the delay network 14 are applied to another grid of the same tube. In this manner, the pentode is gated open by the timing pulses so as to pass into its anode circuit a voltage representative of the instantaneous amplitude of the audio signal during the presence of the gating pulse. However, it has been found that the amplitude of the output signals from anode 94 will not be linearly related to the applied audio signal unless the gating voltage on its suppressor grid 92 can be made to vary as a function of variations in the audio voltage appearing on its control grid 78 and hence on its cathode 84.

The means for bringing about such a correlation in the applied tube potentials includes the diode 88. Since the voltage on the anode of this diode is substantially the same as the voltage on its cathode under normal operating conditions, because the diode is normally conducting, it will be seen that the alternating component of its anode voltage (which is the voltage on the cathode 84 of the pentode 76) will traverse condenser 89 and appear on the suppressor grid 90 substantially without change. Hence, the gating voltage of tube 76 will in effect be superimposed upon this varying cathode voltage, and thus will vary as a function of variations in the amplitude of the audio signal.

The division of current between the screen grid 80 and the anode 94 of pentode 76, at a constant suppressor grid voltage relative to the cathode, is a function of the current in the triode section of the tube. Thus some curvature is introduced into its cathode current-plate current characteristic which must be corrected if amplitude distortion of the audio signal is to be avoided. This correction is brought about by intentionally predistorting to a selected degree the grid voltage-cathode current transfer characteristic of the tube. Since this intentional distortion is in an opposite sense to the cathode current-plate current curvature, the two types of nonlinearity may be caused largely to cancel one another, resulting in a compensated overall characteristic which has substantially less undesired curvature than the uncompensated characteristic alone. While certain details of this correction circuit will now be set forth, reference is made for a complete description to the copending application of E. M. Creamer, Jr., Serial No. 70,952, filed January 14, 1949.

The circuit of Fig. 3*a* is so designed as to include cathode degeneration and thereby to provide an amplitude-modulated output in which substantially no width modulation of the pulses is present. As shown by the waveform 95 in Fig. 3*b*, the anode voltage of tube 76 remains at a level of approximately 180 volts positive when no plate current is flowing. The voltage on the screen grid 80 is approximately +75 volts. The two series resistors 86*a* and 86*b* act to hold the cathode 84 at a potential of approximately 3 volts above ground as a result of the flow of screen current. Since the suppressor grid 90 is normally maintained at a potential of −55 volts, no plate current normally flows in the tube. However, when the suppressor grid 90 reaches a voltage of −10 volts above ground as shown in curve 96, current flows to lower the tube plate voltage as shown in curve 95. The cathode current is unchanged by this transfer of screen current to the plate.

A typical portion of the signal from the audio filter 22 is shown in curve 97, and is applied to the control grid 78. This control grid 78, the screen grid 80, and the cathode 84, act together as a triode to produce an audio voltage at the cathode which varies between +1 and +5 volts under peak input conditions. This voltage is conducted through the diode 88 to the suppressor grid 90 to swing the voltage on this grid between −53 and −57 volts, approximately.

The timing pulse 16 is also shown in Figure 3*b*, and is present at the junction 98 for a period of 8.33 microseconds in each cycle of operation. The positive voltage at this junction 98 drives the suppressor grid 92 from −55 volts to +3 volts (as shown in curve 96) in the absence of an audio voltage, or to between +1 and +5 volts if an audio voltage is present. Because of the presence of this audio voltage on the cathode 84, the control grid 78, and the suppressor grid 90 of the pentode, the time at which the pulse 16 causes conductance to commence in the anode circuit of the tube is definite and independent of the audio voltage. The same is true of the time at which conductance ceases. The amount of plate current which flows at the peak period of the pulse 16 depends upon the magnitude of the audio voltage, and is such as to cause a variation in the plate voltage of the tube from a nominal value of 178 volts to approximately 177 or 179 volts.

When the timing pulse 16 begins, it cuts off the diode 88. This prevents the internal impedance of the pentode, and the impedance of its cathode resistor, from placing a load on the delay network 14.

While the resistor 89, which is returned to −150 volts, permits the discharge of condenser 92 when the cathode 84 of tube 76 swings in the negative direction after a positive excursion, nevertheless the time constant of this combination is so chosen that condenser 92 retains substantially all of its charge during the presence of the timing pulse 16. It is this charge, as varied at an audio rate through the diode 88, that forms the base, or pedestal, for the timing pulse 16.

*Band-limiting network*

In Fig. 3*c* there is shown schematically a preferred type of filter which is adapted to perform the functions of the band-limiting network 34 in Fig. 1. It will be recalled that the network 34 has a frequency-response characteristic such as shown by the curve 36 (Fig. 1), that is, substantially flat from D.-C. out to approximately the cut-off point of the filter, after which severe attenuation occurs. This feature is possessed by the "bridged-T" filter shown in Fig. 3*c* in which the impedances $Z_1$ and $Z_2$ are reciprocal networks with respect to the resistance $R_o$, so that, if $Z_1 \cdot Z_2$ equals $R_o^2$, then the filter has both image impedances equal at $R_o$ at all frequencies.

A practical circuit arrangement for the filter of Fig. 3*c*, together with values for the various components, is illustrated in Fig. 3*d*. It will be noted that the filter is made up of nine sections, or units, which combine to produce an overall response characteristic which may be as shown in Fig. 3*e*. It will be seen that the output of the filter is down only 8 db at 150 kilocycles. It should be understood, however, that other types of filter networks might be employed to produce a similar output curve, and/or that other values might be substituted for the various components in place of those given. It should be further noted that as shown in Fig. 3*e* the phase characteristic of the illustrated network is substantially linear over the passband.

It has been mentioned that one of the principal features of the disclosed system resides in its ability to operate with a bandwidth which is equivalent to that of the intelligence signal itself. Negligible distortion will appear in the signal reproduced by the disclosed apparatus if the 8 kilocycle sampling wave is transmitted with a number of its harmonics, each of which is modulated with a pair of sidebands extending a distance on each side thereof equal approximately to the highest (3.3 kilocycles) intelligence signal frequency. The band-limiting network 34, by having a substantially flat characteristic which is down only 8 db at 150 kilocycles, permits transmission of the 8 kilocycle sampling wave and all of its harmonics up to approximately the fifteenth, and, furthermore, passes the two sidebands of each of the important harmonics with substantially equal amplitude.

It will be recalled that the 8 kilocycle timing wave in each of the signal channels has the form of a series of substantially triangular pulses 16 (although rectangular or other shape pulses may be used if desired). These timing pulses 16 are utilized to sample an intelligence signal so that the latter, after sampling, is represented by a pulse of varying amplitude recurring at regular intervals. The modulating apparatus is furthermore so designed that the geometric configuration of the pulses is not appreciably changed by the modulation. Accordingly, the spectrum of the output pulse train may be considered as including: (1) the 8 kilocycle repetition frequency signal together with as many of its harmonics as are required to define the unmodulated pulse train so produced, and (2) the sidebands of each of these harmonics due to modulation.

Although the intelligence is all contained in the sidebands, it is necessary to transmit considerably higher frequencies in order to employ pulses as a conveying medium. Obviously, the fidelity with which the waveform of the original triangular pulses is reproduced depends upon the maximum transmitted frequency. As the transmission bandwidth is decreased, the base of each pulse in the train is spread over a greater time interval, until the pulses overlap. If this spreading (of any one pulse) extends far enough into an adjacent channel to reach the point at which sampling occurs, then it will result in crosstalk in that channel.

Curve (*a*) of Fig. 4 shows in an idealized manner one form of impulse train which may be applied to the band-limiting network 34 of Fig. 1 from the combining circuit 30. These pulses, which are of triangular configuration, have a 240 kilocycle repetition frequency, and are shown as being unmodulated except in the case of a single representative channel which has been designated as channel #N. When this pulse train of curve (*a*) passes through the band-limiting network 34, a new time distribution of signal voltage is obtained, without, however, causing any amplitude distortion of the modulation. For example, the modulation of channel #N as shown in curve (*a*) between the limits shown by the broken lines will be present without change in the receiver at the proper sampling instant. Expressed in a different way, the modulation at the apex of the pulse (which constitutes the sampling point) in curve (*b*) is proportional to the modulation shown in curve (*a*). By removing the high-frequency components of the pulse, however, its base is spread out sufficiently to extend into the center (or sampling point) of each of the two adjacent channels $\#N+1$ and $\#N-1$.

Referring now to cure (*c*) of Fig. 4, the manner in which the spread-out pulse in each signal channel introduces crosstalk into the two adjoining channels is illustrated. The waveform of the resultant signal, which in this case constitutes a numerical addition of the energies present from three channel signals, is shown, of course, as having a greater amplitude than would normally be the case were there no overlapping of channel energies. Hence, the resulttant signal waveform of curve (*c*), as employed to modulate the transmitter 42 of Fig. 1, would not be capable of providing for the accurate reproduction of the intelligence signal without the provision of suitable means for equalizing, or compensating for, the crosstalk introduced by the spread-out pulses shown in curve (*c*).

Summarizing the above, therefore, it will be seen that the amplitude of the resultant signal in curve (*c*) of Fig. 4, at the times when the signal is sampled at the receiver (indicated by the vertical broken lines) is the resultant of three separate signals, that is, the actual signal of that particular channel plus two signals respectively from the two channels adjacent thereto. The latter two signals are present, as shown in curve (*c*), in predictable amounts. In accordance with the present invention, means are provided for utilizing correcting voltages of predetermined values for providing the cancellation, or neutralization, of this adjacent channel energy.

In Figs. 1, 3 and 4 a transmitting system has been described through which intelligence may be transmitted by means of a signal having a bandwidth equivalent to that of the intelligence itself. In the particular example illustrated, thirty channels are transmitted, each of which includes both sidebands of a 3.3 kilocycle audio wave, this transmission being accomplished in a frequency band of approximately 150 kilocycles. However, this mode of transmission will not permit a recovery of the intelligence at the receiver unless means are included for overcoming the effects of an overlapping of the signal channels in the manner illustrated in curve (*c*) of Fig. 4. This means has already been mentioned in connection with the description of Fig. 2 as constituting the crosstalk correcting network 52.

*Corrector*

Fig. 5 shows the details of this correction network. It is assumed in the following description that each channel pulse received by the receiver 50 is spread out at its base (as a result of passage through the filter 34) so as to extend beyond the mid-point (or sampling point) of the pulse in each adjoining channel. In other words, referring now to Fig. 4d, the pulse of channel #N, for example, is spread out as shown so as to extend both into channel #$N-1$, which precedes it, and also into the following channel #$N+1$. As shown in this latter figure (the amplitude of the pulse as it enters the filter 34 being taken as 100%) the amplitude of the output pulse from the filter will be 70% at the sampling, or mid-point, of channel #N, this reduction in amplitude being due to the attenuation of the high-frequency components of the pulse in the filter. Moreover, the pulse extends both into channel #$N-1$ and also into channel #$N+1$ with a calculated amplitude of 7% of its original value. Since it has been found in practice that the level of crosstalk audibility is very low (in some cases about .2%), it is obvious that this voltage introduced into channels #$N-1$ and #$N+1$ will be objectionable. In a similar manner, the pulse voltage of channel #N extends into both channels #$N-2$ and #$N+2$ with a voltage of approximately 0.1% of its original value. This, however, is below the threshold of audibility, and hence produces no serious crosstalk problem. It is the purpose of the correction network 52 to remove this crosstalk in channels #$N-1$ and #$N+1$, so that the receiver output voltage based on the resultant transmitted signal, as shown in curve (c) of Fig. 4, will be truly representative of the intelligence imparted to the system at the transmitter.

It will be clear that if the pulse in each of the signal channels can be prevented from introducing energy into both the channel immediately preceding it and also into the channel immediately following it at the respective instants when the signals in these two channels are sampled, then the crosstalk between channels will be eliminated. Inasmuch as the channels are alike insofar as their overlapping is concerned (as shown in curve (c) of Fig. 4) it is only necessary to describe the manner in which the pulse of one representative channel is prevented from introducing crosstalk into the two channels on each side thereof. It should be borne in mind, however, that throughout the description of Fig. 5 it is assumed that output characteristic of the band-limiting filter 34 is as shown in Fig. 3e, and that the crosstalk introduced by a pulse into the neighboring channels twice removed therefrom is below the level of audibility. A condition where the crosstalk into channels twice removed from the channel under consideration has a value above the level of audibility will be fully considered hereinafter in connection with a description of Figures 12 and 13, and hence will not be discussed at the present time.

In Fig. 6 is illustrated graphically the manner in which an idealized pulse of the single channel #N, selected from the pulse train of Fig. 4, introduces a crosstalk voltage $+E_{x_2}$ into channel #$N+1$ which follows channel #N, and also a crosstalk voltage $+E_{x_3}$ into channel #$N-1$ which precedes channel #N. If it can be shown that each of these voltages can be bucked out, or neutralized, at the exact instants when the channels #$N-1$ and #$N+1$ are sampled to obtain an indication of the intelligence therein, then it will be apparent that the same neutralization will be possible for each of the other channels, and that all crosstalk can accordingly be eliminated. It is recognized, however, that this is an idealized situation, inasmuch as the signal in channel #N is not originally free of crosstalk during actual operation. Thus the induced crosstalk voltage from this channel #N into channels #$N-1$ and #$N+1$ is based not only upon the true signal in channel #N, but in addition upon whatever crosstalk voltage is present in that channel along with the signal. Expressed in a different manner, it is appreciated that no one channel in the output of receiver 50 can be isolated and said to be truly representative of the intelligence signal. However, an assumption of this nature simplifies a description of the basic operation of the system, and the actual crosstalk conditions present in normal operation will be fully considered hereinafter in connection with the multi-channel correction network illustrated in Figs. 12, 13 and 14.

Accordingly, in Fig. 5 is shown an idealized system for developing a correcting voltage $-E_{x_2}$ which is both equal in amplitude and opposite in polarity to the crosstalk voltage $+E_{x_2}$ in channel #$N+1$. This correcting voltage $-E_{x_2}$ is caused to be present at the precise instant when channel #N+1 is sampled. In a similar manner, correction network 52 also produces a further correcting voltage $-E_{x_3}$ which is both equal in amplitude and opposite in polarity to the crosstalk voltage $+E_{x_3}$ introduced into channel #$N-1$ from channel #N. This correcting voltage $-E_{x_3}$ is present at the precise instant when sampling of channel #$N-1$, occurs, and thus acts to "cancel" the crosstalk voltage $+E_{x_3}$ which would otherwise cause distortion of the intelligence signal in channel #$N-1$.

While Fig. 6 is intended to illustrate graphically the manner in which the crosstalk voltage of any one particular channel can be neutralized by equal and opposite voltages developed at the instants of sampling the two channels on each side of the selected channel, nevertheless it will be apparent, as the description of Fig. 5 proceeds, that the showing of Fig. 6 is not illustrative of the precise signal relationships between the mentioned channels. With this condition in mind, therefore, the operation of the circuit of Fig. 5 will now be set forth.

It will be seen, by referring to Fig. 2 for the moment, that the correction network 52 receives the composite multiplexed signal from the receiver 50, and delivers an output to the amplifier and cathode follower circuit 59. A portion of the output of the 120 kilocycle filter 54 is doubled in frequency, phased, and then combined in the amplifier 59 with the output of the correction network 52. Accordingly, a connection is provided in Fig. 5 between the receiver 50 and the control grid of a pentode 100 through a gain control resistor 102. The function of the pentode 100 is to drive a delay network 104. This network 104 consists of a plurality of sections or units, the number of which is sufficient to provide a time delay in each direction of 2.08 microseconds. Furthermore, the network 104 is not terminated in its characteristic impedance but instead in an adjustable resistor 106, the value of which is so selected as to produce reflections from the far end of the network 104 back toward the input terminal 108. The value of resistor 106 is still further selected so that both the amplitude and the polarity of the reflected pulse will be such that it arrives back at point 108 (after a total time delay of 4.16 microseconds) with a predetermined amplitude and with its polarity reversed. Since the network 104 is thus designed to have a delay interval of 4.16 microseconds, it provides a time delay equal to the assigned or available width of each one of the channels included in the multiplexed signal. Consequently, a signal pulse appearing at point 108 in the output circuit of the pentode 100 will pass in both directions through the delay network 104, and will again appear at the point 108 displaced in time by precisely the assigned width of one channel. Expressed in still another manner, a pulse appearing at the point 108 which represents channel #N, for example, will again appear at this same point with reduced amplitude and reversed polarity at the same instant when a pulse representing channel $\#N+1$ also appears at this point 108.

The pulse representing channel $\#N+1$ therefore appears at point 108 concurrently with the appearance at this same point of the delayed and attenuated pulse representing channel #N. Since the crosstalk voltage appearing in channel $\#N+1$ has been designated as $+E_{x_2}$, the resistor 106 is so adjusted that the amplitude of the reflected pulse 110 (see Fig. 6) is selected to be $-E_{x_2}$ at the instant 112 when the pulse representing channel $\#N+1$ is sampled. Inasmuch as the total time delay in both directions through the delay network 104 is equal to the width of one of the channels in the multiplexed signal, the reflected pulse, after passing through the network 104, arrives back at the point 108 at the precise moment when a pulse appears at this point representing the following signal channel with its crosstalk. Cancellation of the crosstalk will therefore be brought about in the manner illustrated graphically in Fig. 6. In this connection, however, it should be borne in mind that the waveforms of Fig. 6 are shown in an idealized manner in order to correspond with the waveforms of Fig. 4*c*. Moreover, the shape of the reflected pulse 110 is not critical as long as its voltage $-E_{x_2}$ at the sampling time 112 is equal and opposite to the crosstalk voltage $+E_{x_2}$.

It has been previously stated that no one channel can be isolated from the remainder of the multiplexed signal output of receiver 50 in such a manner that it does not contain a certain amount of crosstalk voltage. In Fig. 6, however, this originally present crosstalk voltage in channel #N has been disregarded for the purpose of simplifying the description. It is apparent, however, that the amplitude of the signal in channel #N will be increased from that illustrated by a factor of $Y$, representing the sum of the crosstalk voltages introduced into channel #N from both channels $\#N-1$ and $\#N+1$. The manner in which the interrelated crosstalk voltages are eliminated from the system will be set forth, as above mentioned, in detail in connection with a description of Figs. 12, 13 and 14 which follows below. For the present, however, it is believed that the operation of the system will be more readily understood if this voltage $Y$ which is present in channel #N is not taken into consideration.

As a result of the operation of delay network 104, no crosstalk is introduced from the pulse in any particular channel into the pulse voltage of the immediately following channel at the time when the latter voltage is sampled in order to obtain the intelligence therefrom. It now remains to provide means for eliminating the crosstalk introduced from the pulse of a particular channel into the pulse voltage of the immediately preceding channel. To bring this about, the partly corrected pulse at point 108 is applied to the control grid of a further pentode 114. The function of the pentode 114 is to drive a further delay network 116 in the same manner that the pentode 100 acts to drive the first-mentioned delay network 104.

The network 116 is designed to have a delay interval in one direction of 4.16 microseconds. In other words, it provides a time delay in one direction equal to the time delay provided in both directions by the delay network 104. A signal pulse applied to the input terminal 118 of the delay network 116, therefore, will arrive at the output terminal 120 of the network displaced in time by the width of one signal channel.

The pulse representing channel $\#N-1$ will accordingly appear at point 120 concurrently with the appearance of the pulse representing channel #N at point 118, the latter point representing the input terminal of the network 116. The latter pulse at point 118 is applied through the gain control resistor 122 to the anode of an inverter tube 124. The output of the delay network 116 is applied as shown to the control electrode of this same tube 124. The resistor 122 is intended to be so adjusted that the amplitude of the crosstalk voltage $+E_{x3}$ present in channel $\#N-1$ is exactly equal to the output of the delay network 116 (which is represented in Fig. 6 by the broken line 126) at the sampling time 128. Expressed in a different way, the output of the delay network 116 at the sampling instant 128 is a voltage $-E_{x3}$ which is equal in amplitude and opposite in polarity to the crosstalk voltage $+E_{x3}$ which is applied from the point 118 through the gain control resistor 122 to the anode of the inverter tube 124. It will accordingly be seen that the inverter tube 124, in combination with the delay network 116 and the by-pass connection through resistor 122, acts to provide a correction of the crosstalk introduced from channel #N into channel $\#N-1$. Proper adjustment of resistor 122 may be accomplished by observing the effects of such adjustment on the output of the receiver. Once adjusted, however, no further manipulation will normally be necessary as long as the remaining portions of the circuit remain unchanged. Incidentally, the showing of the pulses in Fig. 6 is not intended to represent actual amplitudes or waveforms of these pulses, and is merely given as mentioned above as an aid in describing the operation of the circuit of Fig. 5.

At point 130 therefore, there appears an output pulse for application to the amplifier and cathode follower 59 which is truly representative of the intelligence in one particular signal channel, since no crosstalk appears therein either from the channel which precedes it or the channel which follows it. Consequently, inter-channel interference which would otherwise be brought about by use of the band-limiting network 34 in the transmitter of Fig. 1 is eliminated, and a signal output obtained for application to the channel separators 62 (Fig. 2) which contains the information present in the audio input to the microphones 20 in Fig. 1 and which is suitable for reproduction by the reproducers 74 in Fig. 2.

It will be noted that the delay network 104 in Fig. 5 is of the "bridged-T" type as used in the band-limiting network 34 of Fig. 3*b*. It might again be mentioned that although specific values have been given on the drawing for the circuit elements of the "bridged-T" network sections of the delay network 104, nevertheless, these values are merely illustrative, and it is recognized that other values may be substituted therefor as may be desirable or necessary to produce the results set forth.

It is considered desirable that the transient response of the band-limiting network 34 of Fig. 3*d* be symmetrical. If such is the case, it is obvious that the amounts of crosstalk introduced into both the immediately preceding channel and also into the immediately following channel will be equal. Thus the problem of correcting for such crosstalk is simplified. As will be brought out in a description of the multi-channel correction network of Fig. 12, proper adjustment of the resistors 106 and 122 is necessary if crosstalk in all channels is to be completely eliminated. The fact that the transient response is symmetrical facilitates such a correction and furthermore provides a higher signal-to-noise ratio, since it is apparent that the greater the crosstalk voltage the more difficult is the correction therefor. It will be recognized, moreover, that it is possible to construct a filter with such a narrow passband that the crosstalk introduced into adjacent channels is too great to be effectively bucked out. It will also be recognized by those skilled in the art that the problem of damping is extremely important in connection with the band-limiting network 34, and that a network which possesses a reasonably high damping effect will produce an output pulse having the shortest decay time consistent with freedom from oscillation or "ringing." This of course is advantageous, since it reduces the amount of compensation required in order to bring about complete crosstalk elimination.

It has been mentioned in connection with Figs. 1 and 2 that the system of the present invention incorporates a 120 kilocycle wave of uniform amplitude which is added to the multiplexed signal at the transmitter. The 120 kilocycle energy which is developed at the receiver in synchronism with the transmitted wave is passed through frequency doubler 56 and phasing unit 58 to produce a 240 kilocycle wave of uniform amplitude and proper phase. Part of this 240 kilocycle wave is then mixed with the intelligence signal output of the correction network 52. The phasing unit is so adjusted that the peaks of the 240 kilocycle wave occur at the precise instants when the correction network 52 reduces the crosstalk between the adjacent intelligence signal channels substantially to zero, or, in other words, at the points 112 and 128 in Fig. 6. It will be readily recognized, however, that any submultiple of 240 kilocycles may be used in place of the 120 kilocycle signal actually employed in the circuit of Figs. 1 and 2. For example, this wave may have a frequency of 60 kilocycles. In such an event, it is quadrupled at the receiver instead of doubled. The importance of this "reinsertion" of a constant amplitude signal at sampling frequency cannot be over-emphasized, inasmuch as it provides for the ready recovery of the intelligence from the output of the correction network 52 by making this information available only at the one precise sampling instant in the time interval of each channel. As shown in Fig. 6, for example, any shifting in the position of the sampling points 112 and 128 will obviously result in a failure of the reflected neutralization voltages to bring about a complete cancellation of the crosstalk in their respective channels, inasmuch as the amplitude of these reflections is intended to be equal and opposite to the crosstalk voltages only at the exact sampling times. Hence, it is extremely important that a reference, or base, wave of unvarying frequency be available so that effective sampling at these proper times may be brought about. The manner in which this reference voltage is utilized to provide a "pedestal" for the receiver timing pulses is fully described in connection with Figs. 7, 8 and 9.

*Receiver timing generator*

In Fig. 7 is shown a block diagram of the elements forming the timing generator 64 of Fig. 2. These elements of Fig. 7 may generally be divided into two groups, one of these groups constituting the timing pulse generating portion of the apparatus, and the other of the groups constituting the control, or synchronizing, portion. The former is generally similar to the pulse generator 10 of Fig. 1 in combination with the delay network 14, and will be described first.

The reference numeral 200 in Fig. 7 indicates a self-excited oscillator, or pulse generator, capable of generating spaced pulses at some suitable rate such, for example, as 400 cycles per second. Generator 200 serves as the starting element of the system and is not used in normal operation. Neither the wave shape nor the duration of the pulses generated by the oscillator 200 is critical, and any of many well known circuits providing such a pulse output may be utilized. In general, however, these pulses should be of approximately rectangular shape, and have a duration in the neighborhood of 4 microseconds.

The pulse output of the generator 200, which may be as represented by the reference numeral 202, is applied to an integrator 204 which serves to alter the waveform of the pulses 202 so that they will be of substantially triangular configuration. This integrator, or triangular pulse generator 204 operates in such a manner that the rising portion of each pulse in its output is of a duration corresponding to the full duration of the applied pulse 202. In a similar manner, the falling portion of each of the output pulses from the integrator also has a time duration corresponding to that of the applied pulse, so that the total output pulse width is approximately 8 microseconds.

Inasmuch as the generator 200 only serves to initiate the operation of the system, and is not normally employed after a condition of equilibrium has been established, the connection between this generator and the integrator 204 has been shown in broken lines, in the drawing.

For reasons which will later appear, it is unnecessary that the waveform of the pulses from the integrator 204 have exactly linear slopes when the generator 200 is operative to initiate an operating period. It might be mentioned, however, that the integrator 204 does incorporate elements which, during the major portion of this operating period, serve to linearize both the rising and falling edges of the triangular pulse output by means of inverse feedback from a delay line driver circuit 206 to which the pulses are applied. It is sufficient at the present time, however, to mention that this delay line driver circuit 206 provides a low-impedance output suitable for application to the input of the delay line proper 208.

Delay line 208 may be similar to the delay network 14 in the transmitter of Fig. 1. In other words, it may comprise a series of L-C units having taps therebetween. These taps are described in connection with Fig. 2, and provide timing pulses in properly-spaced sequence to gate or trigger the channel separators 62, which there-upon pass to the filters 72 a proper intelligence signal from the correction network 52.

Each of the L-C sections making up the delay line 208 provides approximately 4.16 microseconds of time delay. The line is furthermore adapted to act as a low-pass filter having a cut-off frequency of approximately 200 kilocycles, since it is desirable to remove any high-frequency components which may have entered the timing circuits.

Accordingly, an output pulse from the delay line driver 206 (which may have the waveform 210) is applied to the delay line 208, whereupon it produces a negative timing pulse at each channel output connection which is spaced in time from the timing pulse at the preceding output connection by about 4.16 microseconds. The use made of these output pulses has been fully set forth in connection with Fig. 2, and it will not be repeated here. It may be noted, however, that the wave shape of the pulse is not appreciably altered as it travels along the delay line, except that it is reduced slightly in amplitude.

When the timing pulse traversing the delay line 208 arrives at an output tap spaced 29½ sections from point at which it entered the delay line, it is applied to a variable delay circuit 212. The circuit 212 receives this negative delay line pulse, which is still of triangular configuration as shown at 211, and produces a negative output pulse 214 having a steep leading edge. The pulse 214 passes through a gate circuit 216, following which it is applied both to a differentiating circuit 218 and to an integrating circuit 220. A description of the gate circuit 216 will be set forth in connection with the discussion of the synchronizing portion of Fig. 7 which appears below. At the present time, it need only be mentioned that the gate 216 is open to allow passage therethrough of the pulses 214 when no incoming signal is being received by the receiver 50 of Fig. 2.

The reason for applying the output pulses from gate 216 to two separate circuits is that the differentiator 218 acts to produce a control variation which is suitable for forming the leading edge 222 of a pulse-forming square wave 224, from pulse former 234, while the integrating circuit 220 is effective for controlling the production of the trailing edge 226 of this same square wave 224. Referring first to the former element, the differentiator 218 acts upon the substantially square wave output 228 of the gate 216 to produce an output voltage variation having the sharp positive pip indicated by the reference numeral 230. This differentiated pulse 230 is then applied to the charging circuit 232, where the sharp pip 230 is utilized for charging an energy storage device included in the pulse-forming circuit 234.

The same wave 228 is also acted upon by the integrating circuit 220, which provides a sloping front edge for the pulse. Means are also included in the circuit 220 for controllably delaying the sharply rising portion 236 of the resulting wave, so that this rising portion 236, after being delayed in time by the width control circuit 238, will have a waveform such as indicated by the reference numeral 240. The leading edge of this pulse 240 is utilized by the discharge circuit 242 to establish the trailing edge 226 of the wave 224 by discharging an energy-storage device included in the pulse former 234. It will be noted that the width control circuit 238, by varying the instant of the occurrence of the leading edge of the pulse 240, actually controls the width of the output pulse 224 of the pulse former 234. It will subsequently be seen that this control over the width of pulse 224 is actually a control over the width of the timing pulses 210 in the output of the delay line driver 206, and is independent of their repetition rate.

The control wave 224, which is a negative square wave of approximately 4 microseconds duration, is passed through a phase inverter 244. This phase inverter 244 produces two outputs of different polarities. One of these outputs is the positive pulse 246, which is applied to a starting pulse control circuit 248. The latter acts to produce a negative D.-C. bias voltage whenever pulses are applied to it. This negative bias voltage so produced is effective to cut off the starting pulse generator 200 so that its output of pulses 202 ceases. At the same time, the negative pulse output 250 of the phase inverter 244 is applied to the integrator 204, which acts to shape the waveform of each pulse 250 so that it is suitable for application to the delay line driver 206 to in turn produce a new delay line pulse 210.

When the gate 216 is open, therefore, the action of the system just described is such that a self-sustained oscillation takes place, with the pulse 210 traversing the delay line and then being utilized by the elements 218 and 220 to control the production of a new pulse 224. The latter pulse in turn is applied to the integrator 204 to create a further delay line pulse 210, after which the cycle is repeated.

One of these pulses 202 is accordingly utilized when operation is initiated. After a very small period of time, however, a negative bias is developed from the energy contained in the circulating pulse, and this energy is utilized to terminate the production of the initiating pulses 202, and thus permit the system to operate as a self-sustained oscillator. The frequency of operation may be controlled by means of a slip frequency control circuit 252, which acts to regulate the amount of delay provided by the circuit 212 and hence the time of occurrence of the pulses 214 which pass through the gate 216.

Summarizing the above, it may be said that the apparatus of Fig. 7 (constituting the timing generator 64 of Fig. 2) acts when unsynchronized as an oscillator having a normal repetition frequency which is very close to, but not identical with, that of the pulse generator 10 in Fig. 1. The pulses produced by the generator 64 are of a triangular configuration, and constitute a timing or triggering wave which is designed to drift slightly and at a constant rate with respect to an 8 kilocycle standard when no signal is being received by the receiver 50 (Fig. 2).

When no incoming signal is being received by the system of Fig. 2, therefore, the timing generator 64 produces pulses which "slip" at a slow rate with respect to the pulses which are produced by the 8 kilocycle generator 10 in Fig. 1. That is, the phase between any set of 8 kilocycle pulses representing the output of the pulse generator 10, and a set of pulses passing through the gate 216, will change relatively slowly with time. This means that the reception of a signal by the receiver 50 may commence with a pulse from a particular tap, such as #5, for example, on the delay network 14 of the transmitter (Fig. 1) occurring at the same time as a pulse from a particular tap such as #1 in the output of the timing generator 64. Due to the slippage between the frequencies of the transmitted and locally generated pulses, however, this received pulse from tap #5 on the delay network 14 will soon occur at the same time as a pulse from tap #2 in the output of the timing generator 64, and so on. It has been found that a slip rate in the order of thirty channels per half second is satisfactory to produce the results being described.

As soon as this slippage has reached a point where the output of channel #27 in Fig. 1 (in other words, that channel containing the 3,900 cycle tone produced by the indexing tone generator 24) is correctly routed through channel separator #27 in the receiver, then the action of the timing generator 64 changes. This change results from the presence of a control voltage which is applied to the timing generator 64 from the indexing tone filter 66 (Fig. 2) over the synchronizing connection 67. This control voltage is converted into a D.-C. bias, in a manner now to be described, which acts to cut off the locally generated pulses, and, instead of these latter pulses being utilized for timing purposes, pulses derived from the multiplexed signal itself are employed for the purpose of gating the channel separators 62 in properly timed sequence. The operation of this synchronizing portion of the circuit of Fig. 7 will now be set forth.

It has been stated above that the gate 216 is open (when no signal is being received by the receiver 50) to permit passage therethrough of the pulses 214 constituting the output of the variable delay network 212. That is, the system of Fig. 7, when the gate 216 is thus open, is self-oscillatory, so that a locally-generated pulse traverses the delay line 208 and is then utilized at the output of this delay line to control the production of a further pulse which again traverses the delay line in another cycle of operation.

As soon as a signal is received and the condition above set forth has been attained (where the output of channel #27 at the transmitter is correctly routed through channel separator #27 at the receiver), then the action of the apparatus in Fig. 7 undergoes a change. The indexing tone from the 3,900 cycle filter 66 in Fig. 2 is applied from the conductor 67 to an amplifier 254 and thence to a rectifier 256. The output of this rectifier 256 is a substantially smooth D.-C. bias voltage which serves to control the operation of a keyer 258. This latter device is arranged to regulate the status of the gating circuit 216, and also the status of a further gating circuit 260.

Gating circuit 260 is connected between an inverter 262 and a variable delay network 264. The inverter 262 is adapted to receive negative timing pulses from an output tap on the delay network 208 in the same manner as the variable delay network 212. However, as is shown, the output tap to which the inverter 262 is connected is spaced apart by two L-C sections from the output tap supplying pulses to the delay network 212.

When no signal is being received by the receiver 50, then there is no output from the rectifier 256. Under this condition, keyer 258 acts to maintain the gate 216 open, so that the pulses 214 are permitted to pass through the gate 216 to both the differentiator 218 and the integrator 220. This situation is that which is present when the system is first placed into operation. After a received signal has been present for a sufficient period of time for the individual channels to be properly aligned with one another (less than one-sixtieth of a second) then there is an output from the filter 66 in Fig. 2 which acts to provide a D.-C. bias for the keyer 258. This D.-C. bias causes the keyer 258 to open the gate 260, and to close the gate 216.

The effect of this change in condition is to prevent the locally-generated pulses in the output of the variable delay network 212 from passing to the differentiator 218 and the integrator 220. Instead, pulses from the inverter 262 (which occur at the slip frequency rate) are employed to regulate the passage through the gate 260 of certain of the 240 kilocycle pulses from the phasing unit 58 which are applied to the generator 64 over the conductor 68 (see Fig. 2). These 240 kilocycle pulses are applied to the gate 260 in Fig. 7 over conductor 68 as illustrated, and the 8 kilocycle output of the inverter 262 regulates the action of this gate 260, so that one of the 240 kilocycle pulses is passed through the gate 260 each time that one of the 8 kilocycle pulses 211 from the delay line 208 is present at the inverter input. Thus, every thirtieth pulse from the phasing unit 58 is supplied to the variable delay network 264, the output of which is a negative pulse 228 having a waveform substantially similar to the pulse output of the gate 216 when the apparatus of Fig. 7 is in a self-oscillatory condition.

Under normal operating conditions, therefore, and when a signal is being received by the receiver 50, the gate 216 is closed as a result of the D.-C. bias applied to the keyer 258, and the gate 260 is open. These conditions are maintained as long as the indexing tone from filter 66 continues to be applied through the rectifier 256, or, in other words, as long as the channels in the transmitter and receiver are properly indexed. Should, for any reason, the transmitted signal be momentarily lost by the receiver, then the indexing tone will no longer be present, and the keyer 258 will close the gate 260 and open the gate 216. This permits the slip frequency control circuit 252 to allow the locally generated and the transmitted signals to again drift in frequency with respect to one another until each channel at the receiver is again "in line" with its corresponding transmitter channel. It will, accordingly, be seen that the system of Fig. 7 provides an automatic phasing control to maintain proper synchronization at all times between the operation of the transmitter of Fig. 1 and the receiver of Fig. 2. The manner in which certain of the circuits shown in block diagram in Fig. 7 operate to produce the particular results set forth above will now be described in detail.

Fig. 8 illustrates in detail one preferred circuit based upon the block diagram of Fig. 7. To facilitate cross-reference between these two figures, each group of circuit elements in Fig. 8 which is included within a single block of Fig. 7 has been identified with the same reference numeral. Furthermore, these groups of elements in Fig. 8 are generally arranged insofar as practicable in the same general pattern as the components of the block diagram.

Referring now in detail to Fig. 8, the starting pulse generator 200 includes a gaseous thermionic triode 266, a storage condenser 268, and a charging resistor 270. When the grid of triode 266 is not biased strongly negatively, the tube will conduct whenever a substantial plate voltage is applied to it. Assuming that condenser 268 is initially substantially discharged and that tube 266 is non-conducting, condenser 268 will charge through resistor 270 until its potential reaches the breakdown voltage of the gas tube 266. The latter will then start to conduct, with the current passing from its anode to its cathode and then to ground through resistor 272. This conduction will continue until the potential across condenser 268 is lowered to the extinction voltage of triode 266. This tube will then cease to conduct, the voltage across condenser 268 will rise, and the cycle will be repeated. If a negative potential is applied to the grid of tube 266, however, the tube will remain non-conducting and the pulser, or starting pulse generator, 200 will be inactive. In normal operation, the circuit 200 provides pulses which initiate the operation of the timing generator; the pulser is then rendered inactive and remains inactive until required to restart the system. The circuit constants of the generator 200 are so selected as to produce pulses, having relatively sharp edges, at some suitable rate, preferably below the normal pulsing rate of the system, such as 400 pulses per second.

Integrator 204 converts the pulses applied to it from the generator 200 into triangular pulses for application to the delay line driver 206. During the starting operation, the cathode of pentode 274 receives a positive pulse from the generator 200, although during normal operation, no pulses are applied to its cathode, but instead negative pulses of 4 microseconds duration are applied to its control grid.

The anode circuit of pentode 274 is so connected as to discharge condenser 276 when the pentode is conducting. This condenser 276 is supplied with unidirectional energy through resistors 278 and 280. Between pulses, pentode 274 is conductive to unidirectional current, which passes through the resistor 280, resistor 278, pentode 274 and resistor 272. This resistance chain acts as a voltage divider to provide a predetermined potential across condenser 276. The grid of pentode 274 is held at ground potential by the flow of current from a positive voltage source through resistor 282 in series with rectifier 284. When a positive pulse is applied to the cathode of tube 274, or a corresponding negative pulse to its control grid, tube 274 is rendered non-conductive. The potential across condenser 276 then rises according to the time constant of the circuit including resistor 278. When pentode 274 again becomes conductive at the end of the pulse, the potential across condenser 276 returns relatively slowly to the value which it has between pulses. It might be mentioned that the rectifier 284 and practically all of the other rectifiers shown in the wiring diagram of Fig. 8 may be vacuum tube diodes, but are preferably fixed crystal rectifiers.

The delay line driver 206 is supplied with the potential developed across condenser 276. This potential is applied through the blocking condenser 286 to the control grid of the tetrode 288, the latter being provided with a cathode resistor 290. The value of the potential applied between the screen and the cathode 290 of tetrode 288 is maintained relatively constant by the by-pass condenser 292 in combination with the filter resistor 294. Resistor 296 is a parasitic oscillation suppressor. The anode circuit of tetrode 288 is supplied with unidirectional energy through two plate resistors 298 and 299, the latter being adjustable. The output of tube 288 is taken off directly from the anode as shown.

It will be evident from the description set forth above that this apparatus will tend to produce an exponential rising wave followed by an exponential falling wave. It is desirable to provide means for adjusting the rates of rise and fall of the two portions of this wave so that they are substantially equal. It is further desirable that both the rising and the falling portions of the wave be of substantially linear configuration. In order to produce these results, certain feedback connections are employed between the integrator 204 and the driver 206 which are described below in detail.

As above stated, the purpose of the integrator 204 together with the delay line driver 206 is to produce a generally triangular pulse having a rise time equal to the duration of the pulse applied to the integrator 204, and a similar decay, or fall, time. However, the normal charge and discharge curves of condenser 276 through the resistor networks are exponential rather than linear. For this reason, the feedback connections 300 and 302 are included between the driver 206 and the integrator 204 to linearize the rise and fall of the potential across condenser 276, and thus to equalize the rise and decay times of the delay line pulse. The value of the positive potential applied to the screen of pentode 274 is also made adjustable by means of the potentiometer 304. By a proper selection of values for these circuit components and operating potentials, the resulting output voltage may be made approximately a triangular wave in a manner now to be described.

Feedback connections 300 and 302 are included between the tetrode 288 and the pentode 274 to linearize the rise and fall of the potential across capacitor 276. The voltage fed back from the cathode load impedance 290 of tetrode 288 to the junction between resistors 278 and 280 by way of connection 302 serves to modify the effective plate supply voltage of the pentode 274 during the time when a triangular pulse is being formed. This feedback circuit is effective to linearize the rising slope of the triangular pulse. It will be apparent that as the potential on the anode of tube 288 rises, the potential at the junction at resistors 278 and 280 will rise by approximately the same amount, so that the potential across the resistor 278 remains substantially constant. It follows then that the current through this resistor, and thus the charging current into the capacitor 276, will remain substantially constant. Hence the voltage across the capacitor will rise linearly during the charging period.

The screen grid of pentode 274 is supplied with voltage from the potentiometer 304. The latter sets the normal operating voltage on the screen and thus controls the magnitude of the plate current of the pentode during the time that it is conducting. The setting of the potentiometer thus has an effect on the rate of fall of the triangular pulse, but it has no effect on the rise because the pentode is cut off during this period. The potentiometer 304 is preferably adjusted to that point where the rates of pulse rise and pulse fall are substantially equal. In addition, a negative triangular pulse corresponding in time to the output pulse across the cathode load resistor 290, but of reduced amplitude, is fed back through the connection 300 and condenser 306 to the screen grid of the pentode 274 to control the linearity of the falling portion of the triangular pulse. This is brought about by varying the plate resistance of the pentode 274 in such a way that the rate of discharge, and hence the falling slope of the triangular pulse, remains substantially constant.

As above stated, the generally triangular wave output of the driver circuit 206 is applied to the delay line 208. Before the wave reaches the first output tap on the line, however, it assumes a predetermined wave shape which differs slightly from the shape of the wave appearing across resistor 208. This new wave shape is maintained while the wave traverses the line, and when the wave reaches the output tap 310 (which is 29½ sections removed from the input terminal of the delay line) it still has the same shape which it had when it passed the earlier output terminals but a somewhat reduced amplitude. This generally triangular pulse from the output terminal 310 (211 in Fig. 7) is applied with negative polarity through condenser 312 to the grid of a triode 314. The grid of tube 314 is connected to a positive potential source of 150 volts through grid resistor 316, while its cathode is connected to ground through the resistor 318. Triode 314 acts substantially as a Class A amplifier to produce in its output circuit a pulse of positive polarity which is substantially similar in configuration to that of the input pulse 211 applied to its grid from the delay line 208.

The positive pulse thus produced on the plate of triode 314 is applied through the condenser 320 to the grid of a further triode 322. This triode 322 forms part of the variable delay circuit 212, the function of which is to control the phase of the voltage variation 214 which is applied to the gate 216, as indicated in Fig. 7. Accordingly, the tube 322 is insensitive to that portion of the signal from tube 314 which is below a predetermined level, but produces a response to that portion of this signal which is above such a level. This results from the negative bias on its grid 324 which is set by adjustment of the potentiometer 326. The adjustable portion of the potentiometer 326 is connected as shown to the anode of a diode 328, the cathode of which is joined directly to the grid 324. Unless this diode 328 is of the crystal variety, it should be provided with a high-resistance leakage path. The diode 328 levels the base of the triangular wave supplied by triode 314 at the potential set by potentiometer 326. This potential is normally adjusted to a value somewhat more negative than the cut-off potential of triode 322. Accordingly, when a positive pulse from triode 314 is received on the grid 324, no plate current flows in the tube 322 until the voltage of the received pulse has risen to the cut-off potential of the triode 322. The subsequent rise portion of the pulse is effective in producing an amplified signal at the plate of the triode 322. After this pulse reaches its maximum value, it falls to a level corresponding to the cut-off potential of triode 322, after which no further current flows in the plate circuit of this tube.

It will be evident that the time at which the triode 322 becomes conductive will depend upon the voltage on the plate of diode 328. Furthermore, the amplitude of the output pulse 214 (Fig. 7) is limited by the flow of grid current. Diode 328 prevents a change in the value of the operating grid bias of tube 322, and maintains the original datum level of this bias. The negative pulse output 214 of triode 322, as developed across the load resistor 332, is applied to a combination of elements constituting the gate circuit 216.

As stated above, the keyer 258 (see Fig. 7) acts to maintain the gate 216 open when no signal is being received by the receiver 50 in Fig. 2, and also to keep the gate 260 closed during this same period. These conditions are brought about in the following manner:

The keyer 258 includes a tube 334 which may be a triode, as shown in Fig. 8. Triode 334 is so arranged as to be conductive in the absence of a negative bias voltage applied to its grid 336 from the rectifier circuit 256. The manner in which this negative bias voltage is developed will be brought out below, but for the present it need merely be assumed that the grid 336 is at zero bias and that consequently triode 334 is conductive. The flow of anode current through tube 334 and through the parallel anode resistors 338 and 340 causes the positive voltage on its anode 342 to drop from the potential of its operating source (which may, for example, be +300 volts) to a lower value (which may be in the order of +120 volts).

The anode 342 of the triode 334 is connected to the terminal 344 of a further source of positive potential through two diode rectifiers 346 and 348, each of which forms part of the gate circuit 216. These diodes 346 and 348 are so oriented with respect to the operating potential source of tube 334, and also with respect to the source of positive potential connected to the terminal 344, that, when the anode voltage of tube 334 drops to the value which it assumes during its conducting period, then no current flows through these diodes.

As shown in Fig. 8, the anode of diode 346 is joined to the cathode of diode 348, and each of these electrodes is then connected through the blocking condenser 350 to the anode of triode 322 in the variable delay circuit 212. Diode 346 is provided with an external leak as shown, so that most of the potential difference between terminal 344 and the plate 342 of triode 334 appears as bias across diode 348. The joined anode of diode 346 and cathode of diode 348 are also connected through a further condenser 352 to the parallel combination of (1) a diode 354 in series with a resistor 356, (2) a resistor 358 one terminal of which is connected to a source of positive potential, and (3) a diode 360 in series with a resistor 362 one terminal of which is connected to a further source of positive potential having approximately the same value as that to which both the resistor 358 and the diode 346 are connected.

Assuming that triode 334 is conducting and that there is no output from triode 322, current will flow through diode 354 and resistor 358 in series to establish a small positive voltage on the plate of diode 354 as well as on the cathode of diode 360. The value of this small positive voltage will depend upon the size of the resistor 356 which is connected between the cathode of diode 354 and ground. It may, for example, be in the neighborhood of +2 volts.

Assuming now the conditions set forth above (when diodes 346 and 348 are cut off due to the low positive voltage on the plate 342 of triode 334 when the latter is conductive in the absence of a D.-C. bias from the rectifier circuit 256), then the negative pulse 211 from the delay line tap 310, after passing through the inverter tube 314 and after being delayed by the elements of circuit 212, will be applied from the plate of triode 322 through the blocking condenser 350 and condenser 352 to the cathode of diode 360. This pulse, being of negative polarity, will be transmitted by the diode 360 through the conductor shown in broken lines in Figs. 7 and 8 both to the differentiating circuit 218 and also to the integrating circuit 220. The pulse so applied may have a waveform such as indicated in Fig. 7 by the reference numeral 228. This condition of operation is that which exists when the system is first placed into operation, and when either no incoming signal is present or else when the channels have not been properly synchronized. It therefore follows that no negative bias is produced by the rectifier 256, and hence the gate 216 is open in the manner just set forth so as to pass a pulse through the diode 360.

It will be clear from Figs. 7 and 8, however, that a pulse under the above conditions is also derived from tap 364 on the delay line 208 and applied through the inverter circuit 262 to the gate 260. This gate 260 is closed, however, under the no-signal conditions now being described due to the positive potential present on the cathode 366 of a pentode 368 which is included in the gate circuit. As shown in Fig. 8, pentode 368 has its cathode 366 connected directly to the cathode of triode 334 which forms part of the keyer circuit 258. The cathodes of these tubes 334 and 368 are connected to ground through the capacitor 369. The joined cathodes are furthermore prevented from going below ground potential by the flow of current through a diode 370 in series with a resistor 371, the anode of the diode being grounded and the resistor 371 being connected as shown to a source of negative potential. The anode of pentode 368 receives operating potential through an anode resistor 372.

The keyer tube 334 is conductive under these no-signal conditions, and the potential at the upper end of resistor 371 rises to a positive value which may be, for example, in the neighborhood of +16 volts. This positive potential, which appears on the cathode of tube 334 as well as on the cathode 366 of tube 368, is such as to maintain the latter cut off. This will be more clearly understood when it is considered that the grid 378 of the gate tube 368 is prevented from exceeding a predetermined positive value by the presence of diode 384, the anode of which is connected directly to the grid 378 and the cathode of which is connected to a source of positive potential of relatively small value such, for example, as +7 volts. The pulse from the delay line tap 364, therefore, is prevented from exceeding this positive voltage, and so the tube 368 remains cut off in the presence of such a pulse even when a 240 kilocycle pulse from the phasing unit 58 is fed to the suppressor grid 386 over the conductor 68.

As shown in the drawing, suppressor grid 386 is connected to the cathode of a diode 387, the anode of which is connected to a negative potential source of relatively small value, such, for example, as —15 volts. Consequently, the suppressor grid 386 is prevented from becoming more negative than this potential source, and the latter acts to limit the negative value of the 240 kilocycle pulses applied to the grid 386.

As soon as a negative bias is produced by the rectifier 256 and applied to the grid 336 of triode 334, the potential of the grid 336 falls from a value of, say, +15 volts to a value of, say, —15 volts. This bias results in tube 334 immediately ceasing to conduct, and the potential of its cathode (as well as of cathode 366 of tube 368) rises substantially to ground potential. This permits the simultaneous reception of a positive timing pulse on its grid 378, together with one of the 240 kilocycle pulses from the phasing unit 58 on its grid 386, to cause the tube 368 to conduct so as to pass into its anode circuit a negative pulse such as represented in Fig. 7 by the waveform 388. This pulse 388 is applied as shown in Fig. 7 to the variable delay circuit 264.

As above mentioned, a pulse is derived from tap 364 on the delay line 208 for each pulse derived from tap 310. The pulses appearing at tap 364 pass through an inverter circuit 262 which is shown in Fig. 8 as including a triode 380 which acts to clip and invert the pulses so that they appear on the anode 382 thereof with positive polarity. As illustrated in Fig. 8, the anode 382 of this inverter tube 380 is connected directly to the control grid 378 of the gating tube 368. However, the grid 378 is constrained to potentials less than the cathode return of diode 384. Accordingly, the positive pulse output of the inverter circuit 262 as applied to the grid 378 of pentode 368 is not effective to "open" this tube as long as its cathode voltage is sufficiently positive due to the conduction of tube 334. When the latter is cut off, however, a positive pulse from inverter circuit 262 received on grid 378 will cause tube 368 to conduct.

It will be seen from Fig. 8 that the suppressor grid 386 of the pentode 368 receives the 240 kilocycle output of the phasing unit 58 in Fig. 2 over the conductor 68. Since the pulses received on the control grid 378 of this tube from the inverter circuit 262 occur at an 8 kilocycle rate, however, it will be appreciated that each time the pentode 368 is rendered conductive by the reception of such an 8 kilocycle pulse, it will pass that particular one of the 240 kilocycle pulses then appearing on the suppressor grid 386. Thus every thirtieth pulse from the phasing unit 58 is passed by the gate 260 when the latter is open, this pulse being in effect superimposed upon the delay line pulse received from the inverter circuit 262. The above only occurs, however, when the gate 260 is open, and the latter condition is not present unless the keyer tube 334 is being cut off by a reception of a D.-C. bias from the rectifier 256.

It should be noted in connection with the opening of gate 260 that the cutting off of keyer tube 334 would normally cause the voltage on its anode 342 to rise immediately to a value approximately equal to that of the operating potential source to which the anode is connected through the parallel resistors 338 and 340. When cut-off occurs, however, the two series-connected diodes 346 and 348 become conductive. This flow of current through the diodes 346 and 348 is equivalent to lowering the output impedance of tube 322, and hence the presence of a pulse on its grid 324 is not effective in producing in its anode circuit a pulse of sufficient amplitude to overcome the bias on diode 360. Hence, the pulse output of the variable delay circuit 212 is prevented from passing through the gate circuit 216 to the differentiating circuit 218 and the integrating circuit 220, this condition occurring when a signal is received by the receiver 50 so as to develop a D.-C. bias from the rectifier 256. The output of gate 216 is therefore shown in Figs. 7 and 8 in broken lines to indicate its presence only during the initial operation of the system.

It has been indicated in connection with Fig. 7 that the means for controlling the keyer circuit 258 includes an amplifier 254 which receives the output of the filter 66 in Fig. 2, and also a rectifier 256 which utilizes the output of the amplifier 254 to provide a D.-C. bias which is effective in controlling the operation of the keyer. In Fig. 8 the elements of the amplifier circuit 254 are shown as including a pentode 390 to the control electrode 392 of which the filter output is applied over conductor 67. The output of the amplifier tube 390 is a 3900 cycle signal, and appears across the output resistor 396. This amplified A.-C. signal is fed to the control grid 398 of a further pentode 400.

The grid 398 of pentode 400 is connected to the cathode of a diode 402, the anode of which is returned to a point on the potential divider consisting of resistors 404 and 406 connected in series between ground and a point of negative potential, which may have a value of −150 volts. The grid 398, in combination with the cathode of tube 400, acts in effect as a further diode, so that the negative portions of the input wave from tube 390 are clipped by the diode 402, while the positive portions of the input wave are clipped by the above-mentioned electrodes of tube 400. This acts to limit the magnitude of the output voltage from tube 400. It may, for example, lie in the neighborhood of 20 volts peak-to-peak.

The output voltage from tube 400 is applied to the anode of one diode 408 and to the cathode of a second diode 410 through the blocking condenser 412. The anode of diode 410 is connected to the upper terminal of a load resistor 414, while the lower terminal of resistor 414 is connected to a positive point on the voltage divider network consisting of the series connected resistors 416 and 420. A still further resistor 418 is connected in shunt with the diode 408. The voltage developed across the load resistor 414 is maintained substantially constant by means of a relatively large condenser 422 connected between the anode of diode 410 and ground.

The diode 410 thus acts to rectify the voltage output of the pentode 400 so as to produce a voltage drop across the resistor 414 which is representative of the peak-to-peak value of this output signal. The condenser 422 has been stated to be of relatively large value, and the time constant of this element and resistor 414 is sufficiently long so that the condenser voltage does not drop appreciably between the reception of successive pulses on the grid 398 of tube 400. The bias on diode 408 acts to maintain the reference potential for the network at a level approximately +15 volts above ground. It will accordingly be appreciated that this substantially smooth D.-C. voltage developed on condenser 422 by the periodic conduction of diode 410 is of such a nature as to provide a constant negative basis for the keyer tube 334. This bias maintains the keyer tube cut off during all times when there is a voltage output from the filter 66 in Fig. 2. This, in turn, is present at all times when a properly indexed signal is being received by the receiver 50.

It has been stated that the gate 260 is open under the signal conditions described above, which place a negative bias on grid 336 of keyer tube 334, so as to pass every thirtieth pulse from the phasing unit 58. This pulse is applied to a variable delay circuit 264. As shown in Fig. 8, the variable delay circuit 264 includes a condenser 422*a* which is charged through a resistor 428 from a positive potential source. In the absence of a received pulse, this potential source is grounded through the resistor 428 and two diodes 425 and 427. A blocking condenser 426 is connected as shown between the anode of diode 427 and the anode of pentode 368 included in the gate circuit 260.

Upon the arrival of a negative pulse from the gate circuit 260, the rectifier 427 is rendered non-conductive, while the rectifier 425 passes the negative pulse to the condenser 422*a* to charge it negatively. Immediately upon the termination of this applied negative pulse, the condenser 422*a* begins to draw current through the resistor 428, and its potential continues to rise in a positive direction until the upper terminal of the condenser 422*a* reaches ground potential. At such time, the diodes 425 and 427 again become conductive to hold the voltage across condenser 422*a* substantially at ground potential. In this manner, the voltage applied to the control grid of the pentode 423 will be negative at the beginning of an applied pulse, and will commence to rise after the termination of such pulse. The grid potential of the pentode will continue to so rise in a linear manner for longer than 4 microseconds.

The anode current of the pentode 423 is therefore cut off for longer than 4 microseconds. During the time that the anode current of the pentode 423 is thus cut off, a condenser 428*a* charges through a resistor 428*b* in such a manner that the particular plate of condenser 428*a* which is connected to the resistor 428*b* becomes more positive. This provides a rising integrated pulse, which is applied through the blocking condenser 428*c* to the grid 429 of the first section of a twin triode 424. A feedback connection is provided through the condenser 428*a* for the purpose to be described below.

The diode 433 levels the base of the voltage wave appearing on the grid 429 at the potential set by the potentiometer 432. This potential is normally adjusted to a value somewhat more negative than the cut-off potential of the first, or right-hand, section of the twin triode 424.

The pulse in the plate circuit of the first right section of twin triode 424 accordingly bears a time relation to the pulse applied to the pentode 423 from the gate 260, since the latter pulse cuts off pentode 423 and hence determines the instant when charging of condenser 428*a* begins. The time when an output pulse from the first section of the twin triode 424 commences is a function of the bias on grid 429 and may be adjusted by means of potentiometer 432 in relation to the time when a corresponding pulse is received by pentode 423 from the gate circuit 260.

The first section of the twin triode 424 is provided with a load resistor 430 which is connected to a source of positive potential. The output pulse appears as a negative voltage across this resistor 430, and is transmitted through the blocking condenser 433*a* to appear across the resistor 433*b*.

The negative pulse across resistor 433*b* is applied to the grid of the second section of the twin triode 424, the cathode of which is connected to ground through the resistor 433*c*. A further resistor 433*d* is connected between the anode of the second triode section and the same positive source to which the anode of the first triode section is connected through the resistor 430. The resistor 433*d* therefore acts as a load resistor for the second section of the twin triode 424.

The positive pulse generated across this load resistor is applied through the condenser 428*a* to the load resistor 428*b* of the pentode 423. This pulse from the anode circuit of the second section of the twin triode 424 is so polarized as to add to the voltage generated across resistor 428b. However, it is to be noted that this output pulse from the second section of the twin triode 424, being derived from the upper portion of the pulse across resistor 428b, will only commence to add voltage across this latter resistor after the pulse across the resistor begins to rise. The result of this regenerative feedback through the second section of the twin triode 424 is to cause a steep rise of the pulse applied to the grid of the first section of the twin triode 424 at exactly the time when the latter becomes conductive, thus increasing the effect of this triode. The negative pulse produced across resistor 430 accordingly will have a sharp leading edge, even though it is derived from the sloping wave generated by the flow of current into condenser 422a through the resistor 428. Consequently, the negative pulse across this resistor 430 is suitable for application through the diode 434 and condenser 437 to the differentiating circuit 218 and also to the integrating circuit 220. A further diode 435 is connected as shown between ground and the cathode of diode 434 so as to prevent the cathode of this latter diode from rising appreciably above ground potential. The reason for this arrangement will later become apparent.

It will be noted that interaction between the respective outputs of the gate circuits 216 and 260 is prevented in the following manner. When gate 216 is open and gate 260 is closed, then the negative pulses passed by the diode 360 are prevented from entering the circuit 264 due to the orientation of the diode 434. In a similar manner, when gate 260 is open and gate 216 is closed, the negative pulse output of the circuit 264 is prevented from entering the gate circuit 216 due to the orientation of the diode 360. Since the pulse outputs of the gate circuits 216 and 260 are substantially identical in waveform, they may be applied alternatively to both the differentiating circuit 218 and integrating circuit 220 over the common conductor shown in Fig. 8.

It will be noted that the pulses which are applied both to the differentiating circuit 218 and the integrating circuit 220 through the inverter 262 and the gate 260 begin at a time which is delayed with respect to the appearance of these same pulses at the output tap 364 of the delay line 208. The amount of this time delay, as previously stated, is determinable by adjustment of the potentiometer 432 forming part of the delay network 264.

The differentiating circuit 218 includes a pentode 436 the grid bias of which is established by the grid leak resistor 362 and the two diodes 434 and 435. The grid leak 362 is returned to a source of positive potential as shown and as described in connection with the operation of the diode 360 forming part of the gate circuit 216. It will now be seen that resistor 362 acts to maintain the reference potential at the junction of diodes 434 and 445 to the grid of tube 436 at substantially ground potential. Diodes 434 and 435, as well as the grid and cathode of tube 436, assist in this operation. The signal from the tube 424 is applied through the blocking condenser 437 as a negative pulse which results in a positive pulse across the plate load resistor 438. This positive pulse across resistor 438 is applied through the condenser 439 to one terminal of the grid leak 440, the other terminal of which is connected to a source of negative potential. The time constant of the resistor condenser-combination 439, 440 is so small that the leading edge of the positive pulse developed across the plate load resistor 438 produces a sharply rising and falling positive pulse (230 in Fig. 7) while the trailing edge of the applied pulse produces a sharply falling and rising negative pulse sometime thereafter. The first pulse is applied to the charging circuit 232.

In order to provide regularity of operation of the circuit 234, which controls the production of the delay line timing pulses, it is desirable to charge this circuit 234 at exactly the same instant during each cycle of operation. It is then necessary to discharge it at exactly the same time after each charging. To accomplish this, it was necessary to devise a circuit which operates at a predetermined time to establish a definite potential across the condenser 441, and then to connect the same condenser 441 to a second definite potential which operates at another predetermined time for the purpose of discharging it. The charging circuit 232 is effective in providing such a definite instant of charge.

The charging circuit 232 includes a pentode 442 which is so biased as to be unresponsive to applied negative pulses. The pentode 442, however, does respond to the rising, or positive, portion 230 of the differentiated pulse (Fig. 7). This positive pulse portion causes the pentode 442 to conduct for a very short period of time. During this time, however, it charges the condenser 441 (in the pulse-forming circuit 234).

The integrating circuit 220 constitutes that part of the system which determines the length of the output pulse obtained from the pulse-forming circuit 234. Such an arrangement is necessary because the trailing edge of the original pulse derived from the tap 364 on the delay line 208 was discarded by the operation of the tube 424 in the delay network 264. The new trailing edge of the control pulse from the circuit 234 is established in relation to the new leading edge by generating a voltage variation at a definite time following the generation of the leading edge of the pulse from the delay circuit 264, and employing the voltage variation thus generated to terminate the control pulse from the circuit 234.

It is possible to so adjust the delay circuit 264 that the duration of its output pulse is less than 4 microseconds. Under these conditions, such an output pulse cannot be applied to the integrating circuit 220 so as invariably to produce a voltage variation therefrom 4 microseconds after the beginning of the pulse from the delay circuit 264. It is therefore necessary to provide a pulse-lengthening circuit which will continue to energize the integrating network 220 for at least 4 microseconds, regardless of the duration of the pulse applied to it from the delay network 264. Consequentely, the integrator 220 includes a pulse lengthener which consists essentially of a condenser 443, which is charged through a resistor 444 from a positive source. In the absence of an applied pulse, the positive source is grounded through this resistor 444 and rectifiers 445, 434 and 435. The blocking condenser 437 permits such a mode of operation by isolating these elements from the plate circuit of the tube 424.

The integrating circuit 220 together with the width control circuit 238 constitute an assembly which is substantially identical in both design and operation to the variable delay circuit 264 described above. However, it may be said that upon the arrival of a negative pulse, the rectifier 435 is rendered non-conductive, while the rectifiers 434 and 445 conduct the negative pulse to the condenser 443 to charge it negatively. Immediately upon the termination of this applied negative pulse the condenser 443 begins to draw current through the resistor 444, and its potential continues to rise in a positive direction until the upper terminal of the condenser 443 reaches ground potential. At such time, the rectifiers 445, 434 and 435 become conductive to hold the voltage across condenser 443 substantially at ground potential. In this manner, the voltage applied to the control grid of the pentode 446 will be negative at the beginning of an applied pulse and will commence to rise after the termination of such pulse. The grid potential of the pentode will continue to rise in a linear manner for longer than 4 microseconds. The waveform of the voltage output of the pentode 446 is indicated in Fig. 7 by the reference numeral 236.

The plate current of the pentode 446 is cut off for longer than 4 microseconds. This provides a lengthening, or widening, of the pulse formed by the integrating circuit 220 compared to the pulse received from the delay circuit 264. During the time that the plate current of the pentode 446 is cut off, a condenser 447 charges through resistor 448 in such a manner that the terminal of condenser 447 which is connected to resistor 448 becomes more positive. This provides a rising integrated pulse, which is applied through the blocking condenser 449 to the width control circuit 238. A feedback connection is provided through the condenser 447 for the purposes to be described below.

The diode 451 levels the base of the pulse supplied by the pentode 446 at the potential set by the potentiometer 452. This potential is normally adjusted to a value somewhat more negative than the cut-off potential of triode 450. The pulse in the plate circuit of triode 450 bears a fixed time relation to the pulse applied to the integrating circuit 220, the latter occurring simultaneously with the pulse applied to the differentiating circuit 218. In this manner, the time when an output pulse from triode 450 commences may be adjusted in relation to the time when the corresponding pulse is applied to the differentiator 218. In the embodiment being illustrated, the adjustment is such that the output of triode 450 is delayed for 4 microseconds after the pulse applied to the differentiator 218.

Triode 450 is provided with a load resistor 453 which is connected to a source of positive potential. The output pulse appears as a negative voltage across this resistor 453, and is tranmitted through the blocking condenser 454 to appear across the resistor 455.

While the leading edge of the pulse thus generated (as exemplified by the voltage variation 240 in Fig. 7) might be suitable for application to the discharge circuit 242, it is preferable to provide some means of emphasizing this leading edge so as to assure the proper discharge of the condenser 441 exactly 4 microseconds after the condenser is charged by conduction of pentode 442. Consequently, the negative pulse across resistor 455 is applied to the grid of a triode 456, the cathode of which is connected to a positive voltage source of small value. Resistor 457 is connected to a positive source to apply anode potential to triode 456 and to act as a load resistor. The positive pulse generated across this load resistor 457 is applied through the condenser 447 to the load resistor 448 of pentode 446. The pulse from the anode circuit of triode 456 is so polarized as to add to the voltage generated across resistor 448. However, it is to be noted that this output pulse from triode 456, being derived from the upper portion of the pulse across resistor 448, will only commence to add voltage across resistor 448 at a time 4 microseconds after the pulse across resistor 448 begins to rise. The result of this regenerative feedback through triode 456 is to cause a steep rise of the pulse applied to the grid of triode 450 at exactly the time the latter becomes conductive, thus increasing the effect of this tube. A negative pulse thus produced across resistor 455 will have a sharp leading edge even though it is derived from the sloping wave generated by the integrating circuit 443 and 444. The resulting negative pulse across the resistor 455 is applied to the discharge circuit 242.

The discharge circuit 242 includes a triode 458 and a further triode 459. The grid potential of the triode 458 is maintained substantially at ground by the operation of the rectifier 460 except during the application of a negative pulse through the blocking condenser 461. The grid leak 462 is returned to a positive source for this purpose, while the cathode of triode 458 is also connected to a positive potential source of low value. Triode 458 acts to produce a positive pulse across its load resistor 463 which is likewise connected to a positive potential source. The maximum positive voltage developed across resistor 463 is limited by the rectifier 464, the cathode of which is connected to a positive source. The resulting positive pulse, having a sharply rising leading edge and a flat top portion is applied to the grid of the discharge triode 459. The potential source connected to resistor 465 provides not only the plate voltage for the triode 459, but also the operating potential for pentode 442, this operating energy being stored in the pulse-forming condenser 441. It should be noted that there is no time when both the triode 459 and the pentode 442 are simultaneously conductive.

In summary, it will be seen that the negative potential applied across condenser 441 by the operation of the pentode 442 will be removed substantially instantaneously, and to a definite level, at a time 4 microseconds thereafter by the operation of the triode 459 in response to the sharp leading edge of the delayed pulse generated in the width control circuit 238. This negative voltage variation from the pulse-forming circuit 234, which is representative of the charge on condenser 441, is applied to the phase-inverting network 244.

It is to be noted that the time duration of the pulse 224 (see Fig. 7) developed across condenser 441 is unaffected by adjustment of the potential divider 432 which controls the phasing of the pulses. Similarly, it will be evident that this phase position is entirely unaffected by adjustment of the pulse duration through manipulation of the potential divider 452.

The phase inverter circuit 244 includes a triode 466 provided with a cathode load 467, 468 and a plate load 469 so as to generate two simultaneous pulses of opposite polarity. Negative pulses applied through the blocking condenser 470 are applied across the grid leak 471 and the output resistor 468. Operating bias is established by the flow of anode-cathode current through resistor 467. Plate voltage is provided from a positive source through load resistor 469. The negative output pulse 250 from the cathode is applied to the grid of pentode 274 of the integrating circuit 204, while the positive output pulse 246 developed across resistor 469 is applied to the starting pulse control circuit 248.

The negative pulse for application to the grid of the integrating tube 274 is applied across the grid leak 282 through the blocking condenser 470*a*, the grid of pentode 274 being maintained normally at ground potential by the rectifier 284. The operation of the integrating circuit 204 has been fully described in connection with the operation of the starting generator 200, and hence will not be repeated. It will be noted from Fig. 8, however, that the pulses from the starting generator 200 are applied over the dotted connection to the cathode of tube 274, and produce an output pulse from this tube in the same manner as do the negative pulses received on the grid of the tube from the phase inverter circuit 244 through the blocking condenser 470*a*.

To provide for rendering the starting pulse generator 200 inactive during normal operation of the system, the starting pulse control circuit 248 includes a triode 471 to which the positive pulses appearing across resistor 469 are applied through the blocking condenser 472, these pulses appearing across grid leak resistor 473 and hence on the control grid of triode 471. To simplify the direct current relations in the plate circuit of triode 471, the plate of the tube is returned to ground through resistor 474 and the time constant circuit 475, while the grid and cathode are returned to negative potentials. The cathode is grounded through the by-pass condenser 476, while the bias resistor 477 is provided with current through resistor 478 as well as through tube 471. This bias arrangement is such that triode 471 is normally non-conductive. However, the tube begins to conduct when a positive pulse is applied to its control grid, thus producing an output variation across resistor 474 which is negative with respect to ground. This negative pulse is applied through a resistor 479 to the grid of the starting pulse control tube 266. Condensers 480 store this negative potential, which discharges slowly through the resistors 474 and 475. The discharge time is made longer than 125 microseconds, which means that during normal operation of the generator a sufficient negative potential may be maintained on the grid of triode 266 to prevent the generation of pulses by the starting pulse generator 200. This arrangement permits the pulser 200 to generate pulses at a 400 cycle rate until the main oscillating system goes into operation to establish and maintain a sufficiently negative bias to prevent the further operation of the pulser.

*Operating waveforms*

Fig. 9 shows the wave shapes existing in the various portions of the system of Figs. 7 and 8. The actual voltage values, however, are not given in Fig. 9, inasmuch as they depend to a greater or lesser degree on the values employed for the various components of the circuit. For that reason, these waveforms are given principally as an aid in understanding the operation of the various component parts shown by the blocks of Fig. 7, and are not to be understood as limiting the disclosed system to any particular set of values for such components.

In curve A of Fig. 9 is shown the shape of the pulse on the grid of the pentode 274 of the integrator 204 during normal operation. Curve B shows the pulse fed through condenser 286 to the grid of the driver tube 288. It is to be noted that curve B is derived from curve A by the operation of the integrator 204, including condenser 276 in cooperation with the feedback provided through the conductors 300 and 302. Curve C shows the triangular pulse fed to the delay line 208 from the plate of tube 288.

Curves A, B and C of Fig. 9 are represented on a time scale starting at $t=0$. The remaining curves of Fig. 9 are drawn on a time scale starting at $t=125$ microseconds. They accordingly represent the same pulse shown in curve C after it has traversed the delay line 208, or else the immediately preceding pulse which serves to initiate the pulse shown in curve A.

Curve D shows the shape of the pulse derived from the output tap 310 of the delay line 208. The modification of the shape of this pulse from that of curve C occurs almost entirely in the first portion of the delay line 208 up to the first output tap. Curve D, therefore, represents the shape of the pulses available at each one of the output taps of the line. The pulse of curve D is applied to the grid of tube 314 forming part of the variable delay network 212, the tube 314 acting to reverse the polarity of the pulse (identified by the reference numeral 211 in Fig. 7) so that it appears on the grid 324 of the triode 322 with positive polarity. By so adjusting the negative operating bias on grid 324 of tube 322 by means of potentiometer 326, the tube 322 will operate as a limiter to produce an output voltage variation such as represented by curve E in Fig. 9 and as indicated by the reference numeral 214 in Fig. 7. This wave, representing the output of tube 322, is passed substantially without change by the diode 360 when the gate 216 is open, so that it appears on the grid of pentode 436 in the differentiating circuit 218, and also on the grid of pentode 446 in the integrating circuit 220, with a substantially similar waveform 228.

When gate 216 is closed and gate 260 is open, however, the pulse 211 from tap 364 on delay line 208 (which is similar to the pulse of curve D which is applied to the variable delay network 212) is fed to the inverter circuit 262, where it is reversed in phase and applied to the grid of a pentode 368 forming part of the gate circuit 260. It appears on this grid 378 of pentode 368 with positive polarity.

When the gate 260 is open by virtue of the keyer tube 334 being rendered non-conductive by a negative bias being applied to its grid, then the simultaneous occurrence of a pulse from the inverter tube 262 on grid 378, and one of the 240 kilocycle pulses from the phasing unit 58 on the grid 386, will produce an output voltage pulse from tube 368 such as represented by the waveform of curve F in Fig. 9. This output of tube 368, is applied with negative polarity to the grid of the driver tube 423 forming part of the variable delay circuit 264. It will be noted that the output of the variable delay network 264 is substantially the same as the output of the gate 216, so that these outputs may be applied alternatively (according to the status of the remainder of the system) to both the differentiating circuit 218 and the integrating circuit 220.

Curve G shows the plate voltage of pentode 436 as applied to the differentiating network consisting of condenser 439 and resistor 440. Curve H shows the voltage across resistor 440 as applied to the grid of the charging tube 442. Because the latter is operating with sufficient negative potential on its grid to keep it normally cut off, it only responds to the rising portion of curve G, as indicated by curve H. The portion below its cut-off level is indicated by broken lines in the latter curve to indicate that such voltage is ineffective in controlling the operation of tube 442.

Curve I shows the voltage applied to the grid of tube 446 in the integrating circuit 220. This voltage is delayed with respect to the pulse derived from tap 310 on the delay line, and is modified by a pulse-lengthener circuit consisting of the condenser 443, resistor 444, rectifiers 445, 434 and 435, and condenser 437. The cut-off grid voltage of tube 446 is indicated in curve I as a broken line. Curve J shows the plate current of tube 446. Curve K shows the voltage at the junction between the anode of tube 446 and condenser 447. This condenser 447 will start to charge as soon as the plate current of tube 446 begins to fall. As soon as the tube reaches cut off, the rate of charge of condenser 447 will be such that its voltage will rise substantially linearly. In the absence of tube 456, this linear curve will continue until the tube 446 again begins to draw plate current, at which time the condenser 447 would begin to discharge instead of charging.

Referring now to curve L, which shows the voltage on the grid of tube 450, it will be noted that the voltage rises substantially along a straight line until the cut-off grid bias of tube 450 is reached. This cut-off level is indicated in curve L by a broken line. As soon as tube 450 begins to conduct, a voltage is applied to the tube 456, the plate voltage of which rises to make the other plate of condenser 447 positive. As shown in curve K, this results in a rapid rise in the voltage at the terminals of condenser 447. This rise continues until the grid of tube 450 begins to draw current, as a result of which tube 450 is no longer effective as an amplifier. Tube 456, the grid of which has already been driven considerably negative, is thus held at the same voltage level, and substantially no further energy is fed back to condenser 447. Only enough energy is conducted to permit a rise in the plate voltage of tube 446 at a slow rate, condensers 447 and 449 charging in parallel through resistor 448.

This mode of operation explains the difference between the shape of curves K and L. As soon as the plate current of tube 446 commences, condenser 447 begins to discharge, and the voltage on the grid of tube 450 starts to drop. This results in the beginning of a positive signal across load resistor 453, which is applied to the grid of tube 456 to increase its plate current. This in turn produces a negative voltage which is applied to condenser 447. In this manner both the plate circuit of tube 446, and the cooperating feedback relations of tubes 450 and 456, contribute to the rapid fall of the voltage on the grid of tube 450 so that it is cut off rapidly.

Curve M shows the voltage on the grid of tube 458. It is to be noted that the voltage falls sharply at a time 4 microseconds after the rising pulse shown in curve H. The length of the pulse shown in curve M is unimportant, and is determined by the time when plate current begins to flow in tube 446.

Curve N shows the potentials across condenser 441 as applied to the input of the tube 466 included in the phase inverter circuit 244. The falling portion 222 of the pulse 224 is established by the operation of tube 442 under the influence of the rising pulse shown in curve H. The condenser 441 is then left floating and unable to either charge or discharge. At a time 4 microseconds later, it is discharged to produce the rising pulse portion 226 by the operation of tube 459 under the influence of the plate current wave of tube 458, corresponding to the grid wave shown in curve M. The pulse shown in curve N is applied to the phase inverter 244, and from the latter to the integrator 204, where it appears in the form shown in curve A and identified by the numeral 250 in Fig. 7.

*Channel separators*

Referring now to Fig. 10, there is shown a block diagram of two of the channel separators which are generally identified in Fig. 2 by the reference numeral 62. It is the function of each one of these channel separators 62 to select one intelligence channel from the composite multiplexed signal output of the correction network 52. As hereinabove stated, each one of these channel separators 62 receives not only this composite multiplexed signal, but also timing pulses from a tap on the timing generator 64.

For convenience of description, the two channels selected for illustration in Fig. 10 are designated as channels #N and #$N-1$. The reason for selecting two adjacent channels will hereinafter become apparent, one factor being that each channel receives not only a timing pulse from the generator 64, but also a regulating, or control, pulse from the immediately preceding channel in the manner set forth below.

Referring first to channel separator #N, this assembly is shown in Fig. 10 as receiving a timing pulse from tap #N on the generator 64 through an equalizing circuit 500 which acts to compensate for the attenuation of the timing pulses as they traverse the delay network forming part of the timing generator 64. In other words, it is desired that the timing pulses applied to each of the channel separators 62 be substantially identical in amplitude. This pulse from the equalizing circuit 500 is applied both to a first inverter 502, located in what may be termed the signal portion of channel separator #N, and also to a second inverter 504 located in what may be termed the regulatory portion of the channel separator. Each of these inverters 502 and 504 acts in general to reverse the phase of the timing impulse from the generator 64, so that it appears in the output of each inverter with positive polarity. The pulse waveform is also altered by these inverter circuits in a manner to be set forth in connection with a description of Fig. 11.

The positive impulse from the inverter 502 is applied to a gate circuit 506 which also receives the composite multiplexed signal over a conductor 508. As above brought out, the multiplexed signal is continuously applied to the gate 506, the latter being normally closed. However, when a positive timing pulse from the inverter 502 is applied to the gate 506, then the gate is opened to permit passage therethrough of that particular one of the channel pulses in the composite multiplexed signal which appears at the gate 506 simultaneously with the occurrence of the timing impulse. Thus, the signal appearing in the output of the gate 506 is representative of the intelligence present in the appropriate one of the thirty channels of the communication system.

The output of the gate 506 is fed to a "hold" circuit 510 which operates, in a manner to be later described, to maintain the signal voltage output of the gate 506 at a constant level for approximately 121 microseconds. This raises the output power level to a point where reproduction is readily brought about by one of the speakers 74 after the signal has passed through an amplifier 512 and one of the filters 72.

It is essential that the "hold" circuit 510 be properly controlled so that the intelligence signal energy from the gate 506 will not be retained in the hold circuit for such a length of time as to extend into the period reserved for the next intelligence signal in that same channel. Means are accordingly provided for regulating the operation of the hold circuit 510 so as to cause it to return to its normal, or de-energized, condition prior to the arrival of the next timing pulse from tap #N on the generator 64. The means for obtaining this control, or regulatory, pulse includes an inverter 514 which forms part of channel separator #*N*—1, the designation #*N*—1 serving to indicate that such channel is the one immediately preceding channel #N just described, insofar as the successive appearance of a timing pulse at the output taps of the timing generator 64 is concerned. It will be noted from Fig. 10 that the inverter 514 is similarly connected with respect to the other elements of channel separator #*N*—1 as is the inverter 504 with respect to the remaining elements of channel separator #N. That is, the inverter 514 receives a timing pulse from generator tap #*N*—1 through the equalizing circuit 516, this same timing pulse being also applied to an inverter 518 which has a function similar in all respects to that of inverter 502.

The inverter 514 reverses the phase of the timing pulse from tap #*N*—1 of the timing generator 64 and this pulse is then applied with altered waveform to a discharge circuit 520. The function of this discharge circuit 520 is to provide a regulatory pulse for application over a conductor 522 to the hold circuit 510 forming part of channel separator #N. This regulatory, or control, pulse applied over conductor 522 acts to de-energize the hold circuit 510 in such a manner that the circuit is placed in condition for the reception of a new intelligence signal gated by the next timing impulse from tap #N of the timing generator 64.

Inasmuch as each one of the channel separators 62 is substantially identical and functions in a similar manner, only two of these circuits have been shown in Fig. 10. However, the "hold" circuit of any selected channel separator, such as #*N*—1, for example, will receive a control, or regulatory, pulse from the discharge circuit of the next preceding channel separator, which in this illustration would be #*N*—2. In a similar manner, the discharge circuit of channel #N provides a control pulse for application to the "hold" circuit of the next succeeding channel separator, which would be designated as #*N*+1.

Fig. 11 shows the circuit elements comprising certain of the blocks in Fig. 10 which are helpful to an understanding of the operation of the channel separators 62. Referring first to channel #N, it has already been stated that the timing pulse from tap #N of generator 64 is of negative polarity. It may have a waveform such as exemplified by the reference numeral 524. This pulse is applied (after being acted upon if necessary by the equalizing circuit 500), through a resistor 526 to the grid 528 of a triode 530. The grid 528 has a relatively large capacitance to ground, which is indicated in broken lines in the drawing and identified by the reference numeral 532. A diode 534 shunts the resistor 526, and, under conditions to be described, provides a low-impedance path between grid 528 and the timing generator 64. The cathode of triode 530 is connected to a source of negative potential through resistor 536, while the anode of the tube is connected to a positive potential source through the plate load resistor 538.

The capacitance 532 between grid 528 and ground is, as stated, of relatively large value. This capacitance is charged during operation of the circuit to develop, across the resistor 526, a potential difference which may be in the neighborhood of 22 volts, depending upon the values of the various circuit components. The diode 534, which shunts the resistor 526, is so connected that it remains cut off (after equilibrium has been established) until the timing pulse 524 extends sufficiently far in a negative direction so that the negative voltage appearing on the cathode of diode 534 exceeds the negative voltage value to which the tube capacitance 532 is charged. When this point is reached, diode 534 becomes conductive to effectively short-circuit the resistor 526. The resulting voltage on the grid 528 may be somewhat as represented by the waveform 540, it being seen that only the peak portion of the pulse 524 from the timing generator 64 appears on the grid 528.

The output of tube 530 as developed across the load resistor 538 is applied to the suppressor grid 542 of a pentode 544 forming part of the "gate" circuit 506. This suppressor grid 542 is connected to ground through the series combination of a diode 546 and the parallel resistors 548 and 549. The anode of diode 546 is connected directly to the grid 542, and also to the source of positive operating potential for tube 530 through its plate load resistor 538.

As mentioned above in connection with a description of the gate circuit 506 in Fig. 10, it is essential that this gate be closed at all times except when it is opened by the application of a timing impulse thereto from the generator 64. Hence, the pentode 542 in Fig. 11 must be normally non-conductive until it is opened by a pulse from the triode 530. To bring about these conditions, the tube 530 is conductive (during the time intervals between successive pulses 540) to maintain the anode voltage of the tube at some predetermined negative value, which may, for example, be in the neighborhood of —20 volts. This will be clear when it is considered that the triode 530 forms a very low-impedance path when conducting, with the cathode of the triode being connected to a negative potential source (such as —45 volts) through the cathode resistor 536 rather than to ground. Hence, the cathode voltage of the tube will depart from the value of this negative potential source substantially only by the amount of the voltage drop developed across resistor 536.

Upon the appearance of a pulse 540 on grid 528, however, the anode voltage of tube 530 will suddenly rise. The amount of this rise is limited by the action of the diode 546 in the gate circuit 506, so that the maximum positive value of the resulting pulse 550 in the output of tube 530 will be in the neighborhood of +15 volts, or 35 volts peak-to-peak. This pulse 550 appears on the suppressor grid 542 of tube 544, although its waveform is modified in accordance with the value of a simultaneously occurring intelligence signal in a manner now to be described.

The composite multiplexed signal from the conductor 60 (Fig. 10) is applied to the control grid 552 of pentode 544 over the conductor 508. The screen grid 554 of this tube is connected to a source of positive potential through an adjustable resistor (or potentiometer) 556. Cathode 558 of tube 544 is connected to ground through the two parallel resistors 548 and 549, and is also connected directly to the cathode of the diode 546. The anode 561 of tube 544 receives a positive operating potential through two series-connected resistors 562 and 564, the junction point of these resistors being grounded for A.-C. by condenser 566.

The pentode 544 is thus gated open by the positive pulse 550 so as to pass to its anode circuit whichever intelligence signal simultaneously appears on its control grid 522. However, it has been found that appreciable distortion will be introduced in the output of the tube unless the gating voltage on grid 542 can be made to vary as a function of variations in the voltage appearing on the tube cathode 558.

The means for bringing about such a correlation in tube potentials includes the diode 546. Since the voltage on the anode of the diode 546 is substantially the same as the voltage on its cathode under normal operating conditions, it will be seen that the voltage on the diode cathode (which is similar to the voltage on the cathode 558 of pentode 544 and is representative of variations in the intelligence signal appearing on the control grid 552) will also appear on the suppressor grid 542 substantially without change. Hence, the "gating" voltage of tube 544 will in effect be superimposed on this varying "cathode" voltage, and will thus vary as a function of variations in the amplitude of the intelligence signal.

It has also been found that the division of current between the screen grid and the plate of pentode 544, at a constant suppressor voltage relative to the cathode, is a function of current in the triode section of this tube. Thus some curvature is introduced into its cathode current-plate current characteristic which must be corrected if amplitude distortion of the intelligence signal is to be avoided. This correction is brought about by intentionally predistorting to a selected degree the grid voltage-cathode current transfer characteristic of the tube. Since this intentional distortion is an opposite sense to the cathode current-plate current curvature, the two types of nonlinearity may be caused largely to cancel one another, resulting in a compensated overall characteristic which has substantially less undesired curvature than the uncompensated characteristic alone. Further details of such a correction circuit are set forth in connection with the description of a typical modulator 18 in Fig. 3*a*, since the linearity requirements for modulation and demodulation are quite similar. It may be broadly said, however, that the compensating effect is achieved in part by adjusting the voltage dropping resistor 556 so as to select a proper value for the positive voltage on the screen grid 554.

The output of pentode 544 as it appears on the plate 561 thereof will therefore be a pulse of negative polarity which has an amplitude representative of the intelligence contained in the particular intelligence channel gated by the timing pulse 550. It may have a waveform such as represented by the reference numeral 558. This varying voltage is applied through a diode 560 to charge a condenser 562 forming part of the "hold" circuit 510. Diode 560 is arranged with its cathode connected to the anode 561 of tube 544, and its anode connected to that plate of condenser 562 on which the negative charge is developed by application thereto of the negative pulse 558. The values of the circuit elements are so chosen that each output pulse 558 from tube 544 places a charge on condenser 562, this charge being fully developed during the duration of the pulse 558. When the anode current of tube 544 is cut off upon the disappearance of the timing pulse 550, then the anode voltage of tube 544 rises immediately to a base level 564, at which level it remains during substantially the entire cut-off time. Because of the orientation of the diode 560, however, the negative charge on condenser 562 does not diminish during the time tube 544 is cut off, and instead is held constant at the peak level 566 of the pulse 558.

This negative voltage on condenser 562 is retained for a sufficient period of time so that the audio filter 72 (Fig. 2), to which the output of the hold circuit 510 is applied through the amplifier 512, will be able readily to derive the audio envelope of the intelligence signal present in channel #N. However, as above brought out, it is necessary that this charge on condenser 562 be withdrawn prior to the arrival of the next timing pulse 524 from tap #N on the timing generator 64, as otherwise the intelligence present in the signal channel gated by the circuit 506 might not be properly reproduced. In order to bring about a properly timed discharge, or resetting, of the condenser 562 in preparation for the reception of a new intelligence signal voltage, means are provided for returning the charge on the condenser to the voltage represented by the base level 564. This means includes a regulatory pulse derived from the discharge circuit 520 forming part of the preceding channel separator #*N*−1. The manner in which this discharge circuit 520 operates is as follows:

Channel #*N*−1 includes an inverter circuit 514 which may be identical to the inverter circuit 502 included in channel #N (see Fig. 10). A timing pulse 568 is received by this inverter circuit 514 from tap #*N*−1 on the timing generator 64 through the equalizing circuit 516. This timing pulse 568 is also applied, as shown, to the inverter circuit 518 of channel #*N*−1, corresponding in all major respects to the inverter 502 of channel #N.

The timing pulse 568 in channel #*N*−1 is separated in time from the pulse 524 in channel #N by a period of 4.16 microseconds. In other words, it follows the timing pulse 524 by an interval equal to approximately 121 microseconds, the period of the 8 kilocycle timing pulses being 125 microseconds. If this pulse 568 is employed to discharge the condenser 562, therefore, the charge on the latter will be retained for this 121 microsecond period, and will be returned to the base level 564 a few microseconds prior to the application of the next succeeding timing pulse 524 to channel #N.

The negative pulse 568 is accordingly applied through a resistor 569 to the grid 570 of a triode 572 which corresponds to the triode 530 forming part of the inverter 502. The resistor 569 has the same function as resistor 526, and is shunted by a diode 573 which corresponds to the diode 534. The grid-to-ground capacity of the triode 572 is indicated in broken lines by the reference numeral 574. However, instead of a voltage drop being developed across the resistor 569 due to the charging of tube capacitance 574 (as is the case with triode 530) a voltage-divider network is formed by the resistor 576 and the diode 578 each of which is connected in series with the resistor 569 between ground and a source of positive potential. The voltage drop developed across resistor 569 in this voltage-divider network acts to produce on the grid 570 of triode 572 a voltage waveform similar to that indicated by the reference numeral 540 in the inverter circuit 502.

The anode 580 of triode 572 is connected to a source of positive potential through the plate load resistor 582. The cathode of triode 572, however, is connected to ground through the cathode resistor 584 instead of to a source of negative potential as is the case with the cathode of triode 530. Consequently, although an output pulse 586 is produced by the triode 572 which corresponds in waveform to the pulse 550 in the output of triode 530, nevertheless, this output pulse 586 varies between positive levels, and does not reach a negative value as is the case with the pulse 550. The pulse 586 is applied to the grid 588 of a further triode 590 forming part of the discharge circuit 520.

The grid 588 of triode 590 is maintained at an operating level of approximately 150 volts by means of the diode 592 which is connected between grid 588 and a source of positive potential 594. Neglecting the voltage drop across the cathode resistor 596 of diode 592, therefore, the voltage on the anode of diode 592 (or, in other words, on grid 588) will be substantially that of the positive potential source 594. The latter may, for example, be +150 volts. The anode 598 of triode 590 is connected to a higher source of positive potential through a filter resistor 600. A filter condenser 602 is connected between plate 598 and ground. The cathode 604 of triode 590 is connected by means of the lead 522 to that plate of condenser 562 in the hold circuit 510 on which a negative charge is developed representative of the intelligence signal, in the manner previously set forth.

In spite of the positive voltage established on grid 588 by the conduction of diode 592 during the interval of pulse 586, tube 590 will eventually be cut off, since the condenser 562 continues to accumulate a positive charge as long as the tube 590 draws current. This rising potential on condenser 562 is indicated in the drawing by the positive excursion 606 in the waveform of voltage on the anode 561 of tube 544. This positive voltage excursion 606 on condenser 562 causes the voltage on cathode 604 of triode 590 (which is directly connected to condenser 562) to rise above the positive potential on grid 588, which is stabilized by the flow of current through diode 592. As soon as the positive voltage on cathode 604 reaches a point where it exceeds the cut-off bias of triode 590, this tube ceases to conduct.

The triode 590 remains in a non-conductive condition during the entire interval between the reception of the pulses 586 by the grid 588, since during this period between the pulses 586 the plate potential of the triode 572, and hence the potential of grid 588 of triode 590, falls to a positive level at which the cut-off bias of triode 590 is maintained, in spite of the negative charge placed on cathode 604 due to the presence of the modulation voltage on condenser 562.

The voltage on condenser 562 remains at the base level 564 for only a very short period of time following the conduction of tube 590, however, since a new timing pulse 524 from the generator 64 results in a new negative modulating pulse 588 being applied to condenser 562, this modulating pulse having a value which may vary between the modulation limits 566 and 608.

Summarizing the above, therefore, it will be seen that when the suppressor grid 542 of pentode 544 receives a positive timing pulse 550 from the inverter circuit 502, the pentode 544 produces an output pulse 558 which extends in a negative direction to a certain modulation level. This negative pulse 558 establishes a charge on condenser 562 which remains on the condenser due to the unidirectional conduction characteristics of the diode 560. At a time approximately 121 microseconds after the production of pulse 558, another pulse 586 from the inverter circuit 514 causes the triode 590 in the discharge circuit 520 to conduct. This results in the cathode 604 of triode 590 becoming momentarily positive, as represented by the excursion 606 in the voltage waveform on the anode 561 of tube 544. As soon as the triode 590 is again cut off after passage of the pulse 586, the voltage on condenser 562 would normally remain at the base level 564. However, at this time a new intelligence voltage pulse 550 is applied to the grid 542 of tube 544 so as to drop the tube plate voltage to a new intelligence signal level. Thus, another cycle of operation is initiated.

It should be noted that the diode 560 should be a high-vacuum tube having reasonably low leakage characteristics. Consequently, a crystal diode is not usually suitable for use in this portion of the circuit, although crystals may advantageously be employed for the diodes 534, 546, 573, 578 and 592. The voltage output from across condenser 562 is applied to the amplifier 512 (Fig. 10), and thence to the audio filter 72 in the manner above set forth.

*Multi-channel correction*

The preceding description has been predicated on the use of a band-limiting network having a response characteristic such as is illustrated, for example, in Fig. 3*e*. That is, the cut-off of the filter is roughly in the neighborhood of 260 kilocycles, with its output being down about 8 db at 150 kilocycles. A filter of this nature has the effect upon an input pulse such that the base of the pulse is spread out to produce crosstalk in each of the two immediately adjacent channels in the manner shown in Fig. 4*d*.

Consider now the case where the band-limiting network has a narrower passband. For example, let it be assumed that the response characteristic of the filter be of a nature such that an applied pulse will have its configuration altered in the manner shown in Fig. 12*a*, that is, its base is spread out to such an extent that it not only overlaps into each of the immediately adjacent channels, but also into the channels both twice and three times removed from the channel in question. It is obvious from a consideration of Fig. 12*a* that the crosstalk present both in the two channels immediately preceding the channel in question, as well as in the two channels immediately following, will be above the level of audibility, and will accordingly prevent an effective reproduction of the transmitted intelligence unless means are taken for neutralizing, or bucking out, the crosstalk voltage.

Fig. 12*a* accordingly shows, for such a filter, the approximate amounts of crosstalks introduced from a representative channel #N into the three channels #*N*—1, #*N*—2 and #*N*—3 which precede it, as well as into the three channels $\#N+1$, $\#N+2$ and $\#N+3$ which follow it. For the purpose of this illustration, the amplitude of the voltage in channel #N is taken as 100%. The amount of crosstalk present in both channel $\#N-1$ and also in channel $\#N+1$ will, under these conditions, be in the neighborhood of 30% of the voltage in channel #N. In a similar manner, the crosstalk voltage introduced into both channels $\#N-2$ and $\#N+2$ from channel #N will be in the neighborhood of 10%. Both these percentages are well above the level of audibility. The corresponding crosstalk voltages in channels $\#N-3$ and $\#N+3$, respectively, are in the neighborhood of .5%, and thus will normally cause no crosstalk problem since they are below the noise level.

In Fig. 12*b* is shown the manner in which the voltage in each signal channel is composed not only of the original intelligence signal voltage, but also includes the crosstalk voltages introduced therein from several channels both following the one in question and likewise preceding it. Selecting a representative channel at random such, for example, as channel $\#N+2$, it will be seen that this channel includes not only the intelligence signal voltage $\#N+2$ but also crosstalk voltages from channels $\#N-1$, $\#N+1$, $\#N+3$, $\#N+4$ and $\#N+5$. In order to permit an effective reproduction of the intelligence signal $\#N+2$, it is necessary to eliminate from this channel all of the other crosstalk voltages, so that only the intelligence signal itself remains. The means for bringing about such a correction is illustrated in Fig. 13.

In considering the operation of the circuit of Fig. 13, it should be borne in mind that during the description of Figs. 5 and 6 consideration was given to the crosstalk introduced from channel #N into both the immediately preceding channel as well as the immediately following channel. In the description of Fig. 13 which follows, however, a situation exists where crosstalk is introduced into channel #N from each of the channels $\#N+1$, $\#N+2$, $\#N+3$, $\#N-1$, $\#N-2$ and $\#N-3$. The point from which the problem is viewed, therefore, is not the same in these two sets of figures, and results in a reversal of the meaning of the terms "following channel" and "preceding channel." This should be borne in mind as the following description proceeds.

It will be observed from Fig. 12*a* (and also from Fig. 12*b*) that channel #N includes crosstalk from channel $\#N-3$, $\#N-2$, $\#N-1$, $\#N+1$, $\#N+2$ and $\#N+3$. The first three of these are the preceding channels, while the latter three are the following channels. It is desired to adjust the various controls in Fig. 13 so as to completely eliminate from channel #N all of the crosstalk introduced thereinto from the six mentioned channels.

The system of Fig. 13 accordingly includes three cascaded delay networks 700, 702 and 704, each of which is similar to the delay network 104 in Fig. 5 except that it provides a time delay in one direction of 4.16 microseconds, equal to the width of one channel in the multiplexed signal. An input signal appearing at the terminal 706 will thus be delayed the width of a single channel by the network 700, and is then fed back by way of the potentiometer 708 to the input terminal 706 with its polarity reversed and with an amplitude determined by the potentiometer adjustment. When the signal in channel $\#N-1$ is modulated and the potentiometer 708 properly adjusted, crosstalk from channel $\#N-1$ into channel #N is substantially completely neutralized. However, this adjustment of potentiometer 708 introduces into channel #N an additional amount of crosstalk from channels $\#N-3$, $\#N-2$, #N, $\#N+1$ and $\#N+2$. It also introduces into channel #N a new crosstalk voltage from channel $\#N-4$.

The delay network 700, in combination with the delay network 702, provides a total time delay equal to the width of two channels, or in other words, 8.32 microseconds. A correcting voltage having this time delay is made to appear at the input terminal 706 by proper adjustment of the potentiometer 710. Accordingly, channel $\#N-2$ is now modulated, and the potentiometer 710 so adjusted that the crosstalk in channel $\#N-2$ is eliminated. However, this action introduces into channel #N additional amounts of crosstalk from channels $\#N-4$, $\#N-3$, $\#N-1$, #N and $\#N+1$. A new crosstalk voltage is also made to appear in channel #N. from channel $\#N-5$.

In a similar manner, channel $\#N-3$ is modulated and the potentiometer 712 adjusted so as to produce at point 706 a signal of desired amplitude which is delayed in time by three signal channels as the result of its passage through the three channel delay networks 700, 702 and 704. This adjustment of potentiometer 712, however, introduces additional amounts of crosstalk from channels $\#N-4$, $\#N-2$, $\#N-1$, #N and $\#N-5$. A new crosstalk voltage is also introduced from channel $\#N-6$.

The above cycle is repeated until the crosstalk from channels $\#N-3$, $\#N-2$, $\#N-1$ is reduced to an unobjectionable level. When this is accomplished, the only appreciable crosstalk voltages remaining in channel #N are from the following channels $\#N+1$, $\#N+2$ and $\#N+3$.

The illustration of Fig. 13 includes four further delay networks 714, 716, 718 and 720, each of which provides a time delay equal to 4.16 microseconds. These networks may therefore be of a nature similar to that of the network 116 in Fig. 5. The delay network 714 is provided with a by-pass connection including a potentiometer 722, while the remaining networks 716, 718 and 720 are similarly provided with by-pass connections including potentiometers 724, 726 and 728, respectively. It will be noted that each of these potentiometers performs a function similar to that performed by the adjustable resistor 122 in Fig. 5.

When it is desired to eliminate from channel #N the crosstalk introduced thereinto from channel $\#N+1$, the potentiometer 722 is adjusted so that the amplitude of the crosstalk voltage bypassing the delay network 714 is equal to the crosstalk voltage in the signal output of delay network 714, and also that these two crosstalk voltages are opposite in polarity. This expedient eliminates from channel #N the crosstalk voltage from channel $+N+1$, but introduces further crosstalk from channels $\#N+2$, $\#N+3$ and $\#N+4$. Assuming for the sake of simplicity that the original crosstalk voltage in $\#N+1$ from channel $\#N+2$ is equal to $\frac{1}{3}$ of the total voltage present in channel #N, and that the crosstalk voltages in channel $\#N+1$ from channels $\#N+3$ and $\#N+4$ are equal to $\frac{1}{10}$ and $\frac{1}{200}$, respectively, of this total channel voltage, then the crosstalk added to channel #N by the cancellation of channel $\#N+1$ through the adjustment of the potentiometer 722 will be equal to $$-\frac{1}{3}([N+1]+.45[N+2]+.07[N+3]+.005[N+4])$$

The fraction ⅓ represents the attenuation factor of the potentiometer 722, resulting in a reduction of each crosstalk voltage by approximately 66% of its original amount.

The above operation results in an elimination from channel #N of the crosstalk voltage introduced thereinto from the following channel #N+1. In order to eliminate the crosstalk voltage from channel $\#N+2$, this channel is modulated and the potentiometer 724 adjusted so that no crosstalk voltage from channel $\#N+2$ appears in the signal of channel #N. However, such an adjustment of the potentiometer 724, while cancelling the crosstalk voltage from channel $\#N+2$, adds to channel #N crosstalk voltages from channels $\#N+3$, $\#N+4$ and $\#N+5$. The total amount of this crosstalk voltage added to channel #5 as a result of adjustment of potentiometer 724 may be expressed by the following equation $$+\frac{1}{90}([N+2]+.45[N+3]+.07[N+4]+.005[N+5])$$

In a similar manner, channel $\#N+3$ may be modulated and the potentiometer 726 adjusted so that no crosstalk from this channel appears in channel #N. However, additional crosstalk is introduced into channel #N by this mode of operation from channels $\#N+4$, $\#N+5$ and $\#N+6$, the equation being $$+\frac{133}{5400}([N+3]+.45[N+4]+.07[N+5]+.005[N+6])$$

Likewise, modulation of channel $\#N+4$ and adjustment of potentiometer 728 to eliminate the crossstalk from this channel into channel #N adds an additional crosstalk voltage to channel #N which, however, is considerably below the level of audibility and hence produces no objectionable results. Consequently, all the crosstalk voltages from the following channels $\#N+1$, $\#N+2$ and $\#N+3$ have now been eliminated from channel #N, and since the operations previously described eliminated from channel #N all the crosstalk voltages from channels $\#N-1$, $\#N-2$ and $N\#-3$, it will be apparent that only the intelligence signal voltage now remains in channel #N. Hence, an undistorted reproduction of the intelligence contained in channel #N by the audio reproducer 72 (see Fig. 2) may be readily accomplished.

It is obvious that the number of channel correctors employed is not limited to the particular arrangement shown in Fig. 13. While it is true that the difficulty of completely eliminating the crosstalk in any one particular channel increases as the bandwidth of the transmitter filter is decreased, nonetheless it is within the scope of the present disclosure to operate with such a narrow bandwidth that the transient response of the filter causes each channel pulse to spread out over a greater number of channels than is shown, for example, in Fig. 12*a*. It is obvious that the greater the number of channels into which crosstalk voltage is introduced from any particular representative channel, the greater will be the number of single-channel delay networks required in the corrector system of Fig. 13. It will thus be clear that the number of these networks which are desirable at the receiver will depend upon the characteristics of the band-limiting network which is included in the transmitter-receiver system.

It may be said in summary that the present disclosure provides receiving terminal equipment which completely removes for practical purposes the mutual interference between signal channels which is controllably introduced at the sending terminal. In addition, this receiving terminal equipment is simple in design, readily adjustable, and remains stable over long operating periods. The ability of the compensating apparatus at the receiver to thus remove the mutual channel interference is based upon a knowledge of the relative amplitude of the output of the sending terminal, at time intervals corresponding to adjacent channels on either side of the interfering channel, in terms of the output of such interfering channel. In other words, for any channel combination in which mutual interference results, it is always known that the interference of one band with another is a fixed percentage of the peak amplitude of the interfering signal, this percentage of interference being determined by the transient response of the particular filter through which the signal is passed.

It is shown in Fig. 4(*c*) that the output of a particular band-limiting network at the transmitter may include crosstalk introduced by each channel pulse into both the immediately preceding channel and the immediately following channel. It will be recognized from the location of the points at which each channel is sampled at the receiver that the energy in any particular channel is detected only at the peak of the pulse spread produced by the filtering action, the detectors being gated by the reference signal transmitted along with the intelligence. Moreover, it is apparent that interference by channel #N into both channels $\#N-1$ and $\#N+1$ does exist. At the sampling times of channels $\#N-1$ and $\#N+1$, therefore, it is desirable that this interference be eliminated.

It has been shown in connection with the description of Fig. 6 that the corrector network of Fig. 5 operates to cause the signal of any particular band or channel, such as #N, for example, to be substantially zero at the two instants spaced by the band interval from the peak of the band modulation. That is, interference from channel #N is substantially zero at the gating intervals of bands $\#N-1$ and $\#N+1$. As a result of the reduction of the energy in this one selected band to zero at the gating time of both the immediately preceding and the immediately following channels, mutual interference is substantially eliminated. The delay network of Fig. 13 accomplishes a similar result for filters having a transient response such that the energy of any particular pulse is spread over such a time interval as to extend appreciably into more than one channel preceding the channel in question, as well as into a plurality of following channels.

A block diagram of a further type of corrector network which may be used to eliminate the "multi-channel" interference shown in Fig. 12(*a*) is illustrated in Fig. 14(*b*). It may consist of a series of delay networks or units 730, 732, 734 and 736, driven from one end, with each delay unit having a delay interval equal to the channel interval, which, in the example being described, is equal to 4.16 microseconds. From the junctions of these networks, signals are respectively fed through a plurality of unilateral attenuators and polarity inverters 738, 740 and 742. Two additional attenuators and polarity inverters 744 and 746 are respectively connected to the input of the delay network 730 and to the output of the delay network 736, as illustrated. The individual outputs of these devices are then added to produce a resultant voltage which is applied to the channel separators 62 (Fig. 2) over conductor 60.

By a proper adjustment of the attenuators and polarity inverters 738 through 746, the signal in any particular channel is employed to cancel its own interference with all other channels. This may be perceived by visualizing that, as the signal of any one channel passes through the corrector network of Fig. 14(*b*), the total output of the network is equal to the amplitude of the signal at that instant, as shown in Fig. 14(*a*), multiplied by the corresponding attenuator gain. These outputs are tabled in Fig. 14(*c*) for successive channel gating intervals. By equating the outputs to zero at the adjacent channel sampling times, the settings or adjustments for the attensators 738 through 746 are calculable. The attenuator settings are also readily found experimentally when the receiving terminal equipment is initially set up.

For a complete cancellation of interference, an infinite number of delay units, such as 730 for example, and attenuators, such as 738 for example, would be required. However, the cancellation process can be made to converge rapidly for many practical types of transient responses, so that, in practice, for as much as 30% interference in immediately adjacent channels, only six delay units are normally required to reduce the crosstalk in all channels to negligible values. As an illustration, the table of Fig. 14(*c*) indicates a residual output at the gating times of channels $\#N+3$ and $\#N-3$. This output will ordinarily be below the threshold of audibility, but it may be reduced as much further as desired by employing additional delay units.

It will be appreciated that the present invention embraces the use of a plurality of correction networks connected in cascade. Such an arrangement permits the residual crosstalk remaining in the output of any particular corrector to be attenuated to any desired degree, depending on the number of cascaded networks employed.

Although the preceding description has been based in part upon the employment of a band-limiting filter having amplitude vs. frequency characteristics such as shown in Fig. 3(*e*), and a transient response such as shown in Fig. 4(d), nevertheless other types of filter networks having other transient responses may be utilized in place thereof. For example, in Fig. 15(*a*) is shown the amplitude vs. frequency response of another filter network through which the 30-channel 240 kilocycle pulse train system herein described has been successfully operated. Fig. 15(*b*) shows the transient response of this same filter. It has been found in practice that all crosstalk introduced by a filter possessing these characteristics may be reduced to 45 db below the output signal level by including a corrector network, of the type shown in Fig. 14(*b*), but consisting of ten one-channel delay units and their associated attenuators.

It will be noted that the transmission characteristics of the band-limiting filter assembly at the transmitter, in combination with the characteristics of the corrector assembly at the receiver, determine the signal-to-noise ratio of the reproduced intelligence. These characteristics indicate that the bandwidth of a 30-channel transmission system incorporating a filter having the responses shown in Fig. 15 need not exceed 120 kilocycles. Furthermore, these characteristics indicate that no signal energy at frequencies above approximately 120 kilocycles is required for transmission of the complete signal. This compares favorably with the requirements of single-side-band AM transmission, yet retains the best features of pulse systems. If desired, a low-pass filter may advantageously be used as part of the receiver 50 (Fig. 2) to eliminate any high-frequency noise which may have been added to the signal by the transmission system. This filter, of course, need be only slightly wider than the filter 34 at the sending terminal in order for its effect upon the system transient response to be negligible. It will be clear that the amount of transmission loss at frequencies above 120 kilocycles is immaterial insofar as the operation of the disclosed system is concerned.

Although the invention has been described in connection with a multiplex signalling system, nonetheless it obviously is not limited thereto. The invention as applied to such a method of multiplexing, however, is summarized below in a manner which emphasizes the principal steps:

(1) Sampling the intelligence signal at a rate equal to at least twice the highest modulation frequency, (2) Passing the pulse train thus formed through a low pass filter having a bandwidth approximately equal to the intelligence signal bandwidth, (3) Combining the filter output with a predetermined amount of an unmodulated reference signal having a frequency which is preferably a submultiple of the sampling frequency, (4) Filtering off the unmodulated reference signal and frequency-multiplying it to equal the sampling rate, (5) Applying correctors to the intelligence signal so as to cancel crosstalk at each sampling instant, and (6) Applying the corrected intelligence signal at appropriate times to a demodulator in the output of which a modulation detection filter may be used to recover the original intelligence. It is assumed that some suitable means is included for eliminating the reference signal from such recovered intelligence.

If desired, a relay or other transmission medium with a poor transient response may be used with the disclosed system by accounting for the change in pulse shape introduced by the relay when making the initial adjustments in the corrector network at the receiving terminal.

Having thus described my invention, I claim:

1. In a system for reproducing at a remote point an intelligence signal which has been sampled at a transmitting point at a rate equal to at least twice the highest intelligence signal frequency to thereby produce a pulse train which is then filtered so as to restrict its bandwidth, and which filtered pulse train is combined with an unmodulated pulse pedestal reference signal having a frequency which is higher than the pulse repetition frequency and which at the same time is within the frequency band of the filtered pulse train, the combination of a receiver for detecting the transmitted signal, a frequency-selective filter for developing from the detected signal the unmodulated pulse pedestal reference signal, a frequency-multiplier receiving the output of the frequency-selective filter, means for combining the detected signal with the output of the frequency multiplier, means independent of the said reference signal for synchronizing the operation of the transmitter and receiver, and a demodulator receiving the energies thus combined and operating under the control of the said synchronizing means to recover the intelligence contained in said signal.

2. In a system for reproducing at a remote point an intelligence signal which has been sampled at a transmitting point at a rate equal to at least twice the highest intelligence signal frequency to thereby produce a pulse train which is then filtered so as to restrict its bandwidth, and which filtered pulse train is combined with an unmodulated pulse pedestal reference signal having a frequency which is higher than the pulse repetition frequency and which at the same time is within the frequency band of the filtered pulse train, the combination of a receiver for detecting the transmitted signal, a frequency-selective filter for developing from the detected signal the unmodulated pulse pedestal reference signal, a frequency-multiplier receiving the output of the frequency-selective filter, a correction network, means for applying the detected signal to said correction network so as to materially reduce interference between the pulses of said train substantially only at points corresponding to those at which sampling is performed at the transmitter, a circuit for combining the output of the correction network with the output of the frequency-multiplier, means independent of the said pulse pedestal reference signal for synchronizing the operation of the transmitter and receiver, and a demodulator receiving the energies thus combined and operating under the control of the said synchronizing means and substantially only at points where interference between pulses has been materially reduced to recover the intelligence contained in said signal.

3. The combination of claim 2, in which said correction network includes at least two time-delay units each of which has an effective delay period equal to the interval between successive pulses of said train.

4. In a system of communication, the combination of means for cyclically sampling an intelligence signal, means for filtering the pulse train thus obtained so as to restrict its bandwidth approximately to that of the intelligence signal, means for developing a cyclically varying reference voltage having a frequency which lies within the frequency band of the filtered pulse train and which at the same time is higher than the pulse repetition rate, a circuit for combining said reference voltage with said filtered pulse train, means for modulating a carrier wave by the combined energy, means for transmitting the modulated carrier wave, means for receiving the modulated carrier wave, means independent of the said reference voltage for synchronizing the operation of the transmitter and receiver, means for deriving from the received wave the said reference voltage, means for multiplying the frequency of the derived reference voltage to equal the pulse repetition frequency, and demodulating means operating under the control of the said synchronizing means and in response to the application thereto of both the frequency-multiplied reference voltage and the received wave from which such reference voltage has been derived for recovering the intelligence contained in such received wave.

5. In a system of communication, the combination of means for cyclically sampling an intelligence signal, means for filtering the pulse train thus obtained so as to restrict its bandwidth approximately to that of the intelligence signal, means for developing a cyclically varying reference voltage having a frequency which lies within the frequency band of the filtered pulse train and which at the same time is higher than the pulse repetition rate, a circuit for combining said reference voltage with said filtered pulse train, means for modulating a carrier wave by the combined energy, means for transmitting the modulated carrier wave, means for receiving the modulated carrier wave, means independent of the said reference voltage for synchronizing the operation of the transmitter and receiver, means for deriving from the received wave the said reference voltage, means for multiplying the frequency of the derived reference voltage to equal the pulse repetition frequency, means for correcting the received wave so as to materially reduce interference between the pulses of said train substantially only at points corresponding to those at which sampling is performed at the transmitter, a circuit for combining the corrected wave with the frequency-multiplied reference voltage, and demodulating means operating under control of the said synchronizing means, in response to the reception of such combined corrected wave and the frequency-multiplied reference voltage, and substantially only at points where interference between pulses has been materially reduced, for recovering the intelligence contained in the combined energy.

6. In a system of communication, the combination of means for generating an intelligence-modulated pulse train, means for filtering the pulse train so as to restrict its bandwidth, means for modulating a carrier wave by the filtered pulse train, means for transmitting the modulated carrier wave, means for receiving the modulated carrier wave, means for developing from the received wave an unmodulated reference signal, means for correcting the received wave so as to materially reduce interference between the pulses thereof substantially only at points corresponding to those at which sampling is performed at the transmitter, a circuit for combining the corrected wave with the developed reference signal, and demodulating means operating substantially only at points where interference between pulses has been materially reduced for recovering the transmitted intelligence.

7. In a multi-channel signal communication system designed to receive a transmitted signal produced by generating an intelligence signal in each of a plurality of channels, cyclically sampling the intelligence signal in each channel to form a pulse train, interleaving the pulse trains thus formed into a single composite wave, filtering the composite wave so as to reduce its frequency band to a value representing the sum of the individual intelligence signal frequency bands, and applying the filtered composite wave to modulate a carrier wave for transmission, the combination of means for detecting the transmitted signal to obtain the said composite wave, means, including a time-delay network, for correcting the composite wave thus obtained so as to materially reduce interference between the pulses in said composite wave substantially only at points corresponding to those at which sampling is performed at the transmitter, a circuit for separating the corrected composite wave into its constituent pulse trains, and means for demodulating the individual pulse trains only at the points therein where interference has been materially reduced by said correcting means.

8. In a multi-channel signal communication system adapted to receive a transmitted signal produced by generating an intelligence signal in each of a plurality of channels, cyclically sampling the intelligence signal in each channel to form a pulse train, interleaving the pulse trains thus formed into a single composite wave, filtering the composite wave so as to reduce its frequency band to a value representing the sum of the individual intelligence signal frequency bands, developing a reference wave having a frequency which is a function of the sampling frequency and which at the same time lies within the frequency band of the filtered composite wave, adding the reference wave thus developed to the filtered composite wave, and applying the resulting energy to modulate a carrier for transmission, the combination which includes means for detecting the transmitted signal to obtain the said composite wave, means for deriving from the detected composite wave the said reference wave, a frequency multiplier, a circuit for applying the derived reference wave to the said frequency multiplier so as to obtain an output wave having a frequency equal to the repetition frequency of the pulses in said composite wave, means for correcting the composite wave so as to materially reduce interference between pulses in said composite wave substantially only at points corresponding to those at which sampling is performed at the transmitter, a circuit for combining the corrected composite wave with the wave output of the frequency multiplier, a circuit for separating the composite wave into its constituent pulse trains, and means for demodulating the individual pulse trains only at points therein where interference has been materially reduced by said correcting means.

9. In a multi-channel communication system, the combination of means for generating an intelligence signal in each one of a plurality of channels, means for cyclically sampling the intelligence signal in each channel to form a pulse train, a circuit for interleaving the pulse trains thus formed into a single composite wave, means for filtering the composite wave so as to restrict its frequency band approximately to a value representing the sum of the individual intelligence signal frequency bands, a source of carrier energy, means for modulating said carrier energy by the filtered composite wave, means for transmitting the modulated carrier energy, means for receiving the modulated carrier energy, means for detecting the received energy so as to obtain the said composite wave, means for correcting the composite wave thus obtained so as to materially reduce interference between the pulses in said composite wave substantially only at points corresponding to those at which sampling is performed at the transmitter, means for separating the composite wave into its constituent pulse trains, and means for demodulating the individual pulse trains only at the points where interference has been materially reduced by said correcting means.

10. In an intelligence-receiving system for receiving a composite wave produced by transmitting apparatus which includes a first timing generator having a predetermined frequency of operation for producing a train of pulses for each of a plurality of channels, means for amplitude-modulating each train of pulses with a signal to be transmitted, a circuit for interleaving the pulse trains into a composite wave, and means for transmitting said composite wave, said intelligence receiving system comprising, in combination, means for receiving the composite wave, a second timing generator, including an initially operative but normally de-energized starting pulse generator having a frequency of operation which differs to a predetermined extent with respect to the frequency of operation of said first timing generator at the transmitter, said second timing generator producing a train of gating pulses for each of said plurality of channels, a plurality of channel separators corresponding in number to said signal channels, said channel separators operating in response to the concurrent reception of a gating pulse from said second timing generator and a pulse contained in said received composite wave, and means for regulating the frequency of operation of the said second timing generator so that its frequency is identical to that of said first timing generator, said last-named means including a circuit responsive to the reception of pulses contained in said composite wave for de-energizing said starting pulse generator and maintaining the latter so de-energized during normal operation of said system.

11. In a communication system, a first timing generator having a fixed frequency of operation for producing a pulse train for each of a plurality of signal channels, means for modulating each of said pulse trains by a signal, a circuit for interleaving said pulse trains into a composite wave, a second timing generator, including an initially operative but normally de-energized starting pulse generator having a predetermined frequency of operation which is different from the fixed frequency of operation of said first generator, said second generator also producing a pulse train for each of said plurality of signal channels, a plurality of demodulators equal in number to the said signal channels, means for applying both said composite wave and one of the pulse trains from said second generator respectively to each of said demodulators to recover said signal, and means for regulating the frequency of operation of said second timing generator so that it is identical to that of the said first timing generator, said last-named means including a circuit responsive to the reception of pulses contained in said composite wave for de-energizing said starting pulse generator and maintaining the latter so de-energized during normal operation of said system.

12. In a multi-channel communication system, the combination of means for producing a train of pulses for each of a selected number of channels, means for amplitude-modulating each train of pulses, means for interleaving the pulse trains to form a composite wave, means for transmitting the composite wave, means for receiving the composite wave, means for generating a series of timing pulses having a frequency equal to the repetition frequency of the pulses in said composite wave, a plurality of energy-storage devices respectively associated with said channels, means for applying one pulse in said timing pulse series which is associated with one particular channel, together with said received composite wave, to charge the energy-storage device of that particular channel to a value dependent upon the modulation of the concurrently applied pulse in said composite wave, and means for applying that pulse in said timing pulse series which immediately precedes in time the pulse which is associated with the said particular channel to discharge the energy-storage device of said particular channel.

13. In a multi-channel communication system, the combination of means for producing a train of pulses for each of a selected number of channels, means for amplitude-modulating each train of pulses, means for interleaving the pulse trains to form a composite wave, means for transmitting the composite wave, means for receiving the composite wave, means for generating a series of timing pulses having a frequency equal to the repetition frequency of the pulses in said composite wave, a plurality of energy-storage devices respectively associated with said channels, means for applying one pulse in said timing pulse series which is associated with one particular channel, together with said received composite wave, to charge the energy-storage device of that particular channel to a value dependent upon the modulation of the concurrently applied pulse in said composite wave, and means for applying another pulse in said timing pulse series to discharge the energy-storage device of said particular channel.

14. A multi-channel transmission system comprising: a plurality of sources of intelligence signals; means for cyclically pulse sampling said intelligence signals at a predetermined frequency substantially higher than the highest intelligence-signal frequency to be transmitted; means for inter-leaving said pulse samplings to produce a composite train of pulses having a recurrence frequency equal to the number of different intelligence signals being sampled multiplied by the sampling frequency; a frequency-band-limiting network having a pass band which is at least as wide as the sum of the bandwidths of the plurality of intelligence signals to be transmitted but which is substantially narrower than a band whose width is equal to the said pulse recurrence frequency of said composite pulse train; means for passing said composite pulse train through said band-limiting network; means for developing an unmodulated reference wave of predetermined amplitude at a frequency, lying within said pass band of said network, which is $n$ times said sampling frequency, where $n$ is a predetermined number larger than one; means for combining said reference wave with the output of said band-limiting network; means for transmitting said combined signal wave; a receiver for detecting said transmitted signal wave; means for deriving from the received signal wave said unmodulated reference wave; means for multiplying the frequency of said derived reference wave to produce a wave having a frequency equal to said pulse recurrence frequency; a correction network for correcting the received wave to materially reduce interference between the signals of said wave at points corresponding substantially to those at which sampling is performed at the transmitter; means for combining said corrected wave with the output of said frequency multiplier; means for separating said combined corrected wave into individual pulse trains; and means for demodulating said individual pulse trains to recover the intelligence contained in the received wave.

15. Apparatus as claimed in claim 14 characterized by the fact that said means for cyclically pulse sampling said intelligence signals comprises means for cyclically pulse sampling said intelligence signals at a frequency which is equal to approximately twice the highest intelligence-signal frequency to be transmitted.

16. Apparatus as claimed in claim 15 characterized by the fact that said band-limiting network comprises circuit components of such value and so connected as to establish a pass band which is approximately as wide as a band whose width is between one-half and one times the pulse recurrence frequency of said composite pulse train.

17. Apparatus as claimed in claim 16 characterized by the fact that said means for developing said unmodulated reference wave comprises means for developing an unmodulated reference wave at a frequency which is approximately one-half the pulse recurrence frequency of said composite pulse train.

18. A multi-channel transmission system comprising: a plurality of sources of intelligence signals; means for cyclically pulse sampling each of said intelligence signals at a predetermined frequency substantially higher than the highest intelligence-signal frequency to be transmitted; means for interleaving said pulse samplings to produce a composite train of pulses having a recurrence frequency equal to the number of different intelligence signals being sampled multiplied by the sampling frequency; a frequency-band-limiting network having a pass band which is at least as wide as the sum of the bandwidths of the plurality of intelligence signals to be transmitted but which is substantially narrower than a band whose width is equal to the said pulse recurrence frequency of said composite pulse train; means for passing said composite pulse train through said band-limiting network; means for developing an unmodulated reference wave of predetermined amplitude at a frequency, lying within said pass band of said network, which is $n$ times said sampling frequency, where $n$ is a predetermined number larger than one; means for combining said reference wave with the output of said band-limiting network; means for transmitting said combined signal wave; a receiver for detecting said transmitted signal wave; a frequency-selective filter for deriving from the detected signal wave said unmodulated reference wave; a frequency multiplier to which the output of said frequency-selective filter is applied; a correction network; means for applying said detected signals to said correction network to materially reduce interference between signals of said wave at points corresponding substantially to those at which sampling is performed at the transmitter; means combining the output of said correction network with the output of said frequency multiplier to produce a combined corrected wave; means independent of said derived reference wave for sychronizing the operation of said transmitter and receiver; means, operating under the control of said synchronizing means and of said derived reference wave, for separating said combined corrected wave into individual pulse trains; and means for demodulating said individual pulse trains.

19. Apparatus as claimed in claim 18 characterized by the fact that said means for cyclically pulse sampling said intelligence signals comprises means for cyclically pulse sampling said intelligence signals at a frequency which is equal to approximately twice the highest intelligence-signal frequency to be transmitted.

20. Apparatus as claimed in claim 19 characterized by the fact that said band-limiting network comprises circuit components of such value and so connected as to establish a pass band which is approximately as wide as a band whose width is between one-half and one times the pulse recurrence frequency of said composite pulse train.

21. Apparatus as claimed in claim 20 characterized by the fact that said means for developing said unmodulated reference wave comprises means for developing an unmodulated reference wave at a frequency which is approximately one-half the pulse recurrence frequency of said composite pulse train.

22. A multi-channel transmission system comprising: a plurality of sources of intelligence signals; means for cyclically pulse sampling each of said intelligence signals at a predetermined frequency substantially higher than the highest intelligence-signal frequency to be transmitted; means for interleaving said pulse samplings to produce a composite train of pulses having a recurrence frequency equal to the number of different intelligence signals being sampled multiplied by the sampling frequency; a frequency-band-limiting network having a pass band which is at least as wide as the sum of the bandwidths of the plurality of intelligence signals to be transmitted but which is substantially narrower than a band whose width is equal to the said pulse recurrence frequency of said composite pulse train; means for passing said composite pulse train through said band-limiting network; means for developing an unmodulated reference wave of predetermined amplitude at a frequency, lying within said pass band of said network, which is $n$ times said sampling frequency, where $n$ is a predetermined number larger than one; means for combining said reference wave with the output of said band-limiting network; means for transmitting said combined signal wave; a receiver for detecting said transmited signal wave; means for deriving from the received signal wave said reference wave; means for multiplying the frequency of said derived reference wave to produce a wave having a frequency equal to said pulse recurrence frequency; means independent of said reference wave for synchronizing the operation of said transmitter and receiver; a correction network for correcting said received wave to reduce materially interference between signals of said wave at points corresponding substantially to those at which sampling is performed at the transmitter; means operating under control of said synchronizing means and of said frequency-multiplied reference wave, for separating said corrected wave into individual pulse trains; and means for demodulating said individual pulse trains to recover the intelligence contained in the received wave.

23. Apparatus as claimed in claim 22 characterized by the fact that said means for cyclically pulse sampling said intelligence signals comprises means for cyclically pulse sampling said intelligence signals at a frequency which is equal to approximately twice the highest intelligence-signal frequency to be transmitted.

24. Apparatus as claimed in claim 23 characterized by the fact that said band-limiting network comprises circuit components of such value and so connected as to establish a pass band which is approximately as wide as a band whose width is between one-half and one times the pulse recurrence frequency of said composite pulse train.

25. Apparatus as claimed in claim 24 characterized by the fact that said means for developing said unmodulated reference wave comprises means for developing an unmodulated reference wave at a frequency which is approximately one-half the pulse recurrence frequency of said composite pulse train.

References Cited in the file of this patent

UNITED STATES PATENTS

| Number | Name | Date |
|---|---|---|
| 2,273,163 | Wilson | Feb. 17, 1942 |
| 2,418,116 | Grieg | Apr. 1, 1947 |
| 2,428,118 | Labin | Sept. 30, 1947 |
| 2,429,608 | Chatterjea et al. | Oct. 28, 1947 |
| 2,429,613 | Deloraine | Oct. 28, 1947 |
| 2,444,063 | Pfleger | June 29, 1948 |
| 2,497,411 | Krumhansl | Feb. 14, 1950 |
| 2,508,538 | Posthumus | May 23, 1950 |

FOREIGN PATENTS

| Number | Country | Date |
|---|---|---|
| 555,993 | Great Britain | Sept. 15, 1943 |
| 596,700 | Great Britain | Jan. 8, 1948 |
| 605,130 | Great Britain | June 29, 1948 |
| 610,774 | Great Britain | Oct. 20, 1948 |